United States Patent [19]
Taniguchi

[11] Patent Number: 6,130,764
[45] Date of Patent: Oct. 10, 2000

[54] TRANSMISSION APPARATUS IN RING NETWORK

[75] Inventor: Atsuki Taniguchi, Kawasaki, Japan

[73] Assignee: Fujitsu Limited, Kawasaki, Japan

[21] Appl. No.: 09/034,439

[22] Filed: Mar. 4, 1998

[30] Foreign Application Priority Data

Oct. 20, 1997 [JP] Japan ................................... 9-287486

[51] Int. Cl.⁷ ................................................. H04J 14/02
[52] U.S. Cl. ........................... 359/119; 359/110; 370/535
[58] Field of Search .................................. 359/109, 110, 359/115, 117, 118, 119, 124, 125, 128, 135, 139; 370/221, 222, 223, 224, 535, 906, 907

[56] References Cited

U.S. PATENT DOCUMENTS

| | | | |
|---|---|---|---|
| 5,369,515 | 11/1994 | Majima .................................... | 359/125 |
| 5,625,478 | 4/1997 | Doerr et al. .............................. | 359/125 |
| 5,663,818 | 9/1997 | Yamatoto et al. ........................ | 359/118 |
| 5,764,821 | 6/1998 | Glance ....................................... | 385/14 |
| 5,923,449 | 7/1999 | Doerr et al. .............................. | 359/125 |
| 6,038,046 | 3/2000 | Kaneko et al. .......................... | 359/130 |

FOREIGN PATENT DOCUMENTS 9214438  8/1998  Japan .

*Primary Examiner*—Ricky Ngo
*Attorney, Agent, or Firm*—Helfgott & Karas, P.C.

[57] ABSTRACT

In a transmission apparatus in a ring network, provided are a demultiplexing section for demultiplexing multiplexed transmission signals and outputting thus demultiplexed signals; a branching and inserting section adapted to cause, of the demultiplexed transmission signals, a transmission signal of a desired channel to branch out into another line and insert a signal from another line as a transmission signal into the channel from which the transmission signal branches out; and a multiplexing and transmitting section for multiplexing the transmission signals from the branching and inserting section and transmitting thus multiplexed signal as a multiplexed transmission signal to a line which becomes a relaying destination of transmission; wherein the branching and inserting section comprises a transmission route setting mechanism for setting a transmission route of each set of transmission signals such that each set of the transmission signals are transmitted by one of a plurality of kinds of transmission systems, thereby constructing a ring network having a plurality of transmission systems different from each other.

11 Claims, 40 Drawing Sheets

TRANSMISSION APPARATUS IN RING NETWORK

BACKGROUND OF THE INVENTION

1. Field of the Invention

This invention relates to a transmission apparatus in a ring network.

2. Description of Related Art

Recently, with SDH (Synchronous Digital Hierarchy) technology being standardized, SDH networks have been introduced in many countries. In North America, SONET (Synchronous Optical Network) in compliance with the SDH technology is in the process of being introduced.

As such an SDH network, a ring network in which a plurality of SDH transmission apparatus are connected together like a ring is noticed as a network which can flexibly respond to the increasing scale of networks which constitute the current optical transmission systems.

As transmission apparatus for constructing such a ring network, known are those which can transmit a multiplexed signal on the order of 2.4 Gb/s (48-channel signal) and those which can transmit a multiplexed signal on the order of 10 Gb/s (192-channel signal), for example.

Meanwhile, as a signal transmission system employed in the above-mentioned ring network (ring type), known are two systems [UPSR (Uni-directional Path Switched Ring) system and BLSR (Bi-directional Line Switched Ring) system] incorporating therein means against line fault.

Here, the UPSR system (hereinafter simply referred to as UPSR) is mainly used, for example, in a local network or the like where all the information is once centralized at a single exchange. For example, in a ring network 100 shown in FIG. 34 in which four transmission apparatus 101 to 104 are connected together like a ring through two optical fibers 105-1 and 105-2, a multiplexed transmission signal (optical signal) is transmitted as follows.

For example, as shown in FIG. 35(a), in a normal state where no line fault occurs, when a transmission signal (signal of channel "1") from another line 101a connected to the transmission apparatus 101 is relayed and transmitted to the transmission apparatus 103 through the ring network 100, a line 101b passing through the transmission apparatus 102 and a line 101c passing through the transmission apparatus 104 are used together, so that the transmission signal is redundantly transmitted.

Here, the two optical fibers 105-1 and 105-2 connecting the transmission apparatus 101 to 104 together are set such that their respective optical signals, as multiplexed transmission signals transmitted through the ring network 100, are directed opposite to each other.

The optical fiber 105-1 is used for propagating the optical signal in the direction of arrow WE over the ring network 100; whereas the optical fiber 105-2 is used for propagating the optical signal in the direction of arrow EW over the ring network 100.

Also, the transmission apparatus 103 is equipped with a path switch 103A which selects, of the transmission signals respectively inputted via the two lines 101b and 101c, the one with a better quality having less errors and the like, for example, and relays thus selected signal to another line 103b [see FIGS. 35(a) and 35(b)].

Here, in the case where a fault occurs in the line 103a between the transmission apparatus 103 and 104, of the transmission signals transmitted from the transmission apparatus 101 to the transmission apparatus 103, the transmission signal transmitted through the transmission apparatus 104 is not inputted, whereas only the transmission signal transmitted through the transmission apparatus 102 is inputted.

Namely, as shown in FIG. 35(b), even in the case where a line fault occurs anywhere on the ring network 100 upon transmission of the transmission signal from the transmission apparatus 101, the path switch 103A of the transmission apparatus 103 can select the transmission signal passing through the transmission apparatus 102 on the faultless side and relay thus selected signal to another line 103b. As a result of such a redundant network configuration, the UPSR can improve the reliability of networks.

Each of all the transmission apparatus 101 to 104 constituting the ring network 100 has, with respect to each other, such a function as that of the transmission apparatus 101 upon signal transmission, and the function identical to that of the path switch 103A included in the transmission apparatus 103.

Further, in this UPSR, as shown in FIG. 36, a phase adjusting section 103B is disposed upstream the path switch 103A. As the phase of two transmission signals is adjusted by the phase adjusting section 103B before the transmission signal is selected by the path switch 103A, switching (uninterrupted switching) can be effected without hitting the signals.

Also, as shown in FIG. 37, a UPSR ring network 100-1 constituted by transmission apparatus 101-1 to 104-1, a UPSR ring network 100-2 constituted by transmission apparatus 101-2 to 104-2, and a UPSR ring network 100-3 constituted by transmission apparatus 101-3 to 104-3 can be connected together to form a large-scale UPSR ring network (virtual ring) 100-4 constituted by the transmission apparatus 101-1 to 104-1, 101-2 to 104-2, and 101-3 to 104-3. Accordingly, the UPSR characteristically has a high degree of freedom in design when constructing networks.

Meanwhile, the BLSR system (hereinafter simply referred to as BLSR), which is employed in communication networks between big cities or the like where there are a large amount of communications between stations, transmits multiplexed signals in systems shown in FIGS. 38(a) and 38(b), for example.

Namely, as shown in FIG. 38(a), in a normal state where no line fault occurs, when a transmission signal from another line 101a connected to the transmission apparatus 101 is transmitted to the transmission apparatus 103 through the ring network 100, unlike the above-mentioned UPSR, a backup channel is secured within the same route without using a signal from another route as backup line.

Specifically, the transmission signal to be relayed and transmitted from the transmission apparatus 101 to the transmission apparatus 103 can be transmitted through only a route passing through the transmission apparatus 104 while securing a backup channel. Consequently, the line 101b connected to the transmission apparatus 102 can be set so as to transmit another transmission signal.

For example, the transmission signal to be relayed and transmitted to the transmission apparatus 102 can be transmitted through the line 101b together with the transmission signal for the transmission apparatus 103.

Here, in the case where a fault occurs in the line 103a between the transmission apparatus 103 and 104 as shown in FIG. 38(b), unlike the above-mentioned UPSR in which the faultless path is selected by the path switch 103A in the transmission apparatus 103 on the receiving side, APS (Automatic Protection Switch) protocol is used in the BLSR so as to perform line loop back, thereby enabling relief.

Namely, as shown in FIG. 39, when the transmission apparatus 103 detects an occurrence of fault in the line 103a, it performs a protection action, whereby the signal inputted from the transmission apparatus 101 through the optical fiber 105-2 is turned around within the transmission apparatus 104 (bridging processing) so as to be outputted to the transmission apparatus 103 through the optical fiber 105-1. That is, the transmission apparatus 104 operates as a switching node.

In the above-mentioned transmission apparatus 104, when a transmission signal is transmitted to the transmission apparatus 103 through the long path, transmission line fall information (SF-RING; Signal Fall) is assigned, as a request, to K1 and K2 bytes of SOH (Section Overhead) of the SDH frame constituting the transmission signal.

In the case where a fault occurs in the line 103a, the transmission signal transmitted to the transmission apparatus 101 is transmitted to the transmission apparatus 103 through a route, as a long path (bypass route), passing through the transmission apparatus 101 and 102 (loop back) The transmission apparatus 101 and 102, as these intermediate nodes, are in the state of full pass-through, whereby K bytes and protection channel signals pass therethrough as they are.

When the transmission signal is inputted into the transmission apparatus 103 via the long path, as this signal is subjected to a switching operation, the signal from the long path can be selected (switching operation) instead of the signal from the short path (signal from the transmission apparatus 104), so as to be relayed to another line 103b. Namely, the transmission apparatus 103 also operates as a switching node.

Thus, by performing the loop back using APS protocol, the BLSR improves the reliability of networks while yielding a line utilization efficiency higher than that of the above-mentioned UPSR.

As the transmission capacity is currently increasing, various kinds of needs for the use of thus increased capacity are expected to emerge. Namely, in order to satisfy such needs, required is a transmission apparatus which can construct, in response to a request of a person constructing a network, a ring network having a plurality of transmission systems different from each other.

Namely, demanded is a transmission apparatus which, while employing the same transmission apparatus as a constituent of ring networks, can construct not only a ring network which can operate as UPSR, but also a ring network which can operate as BLSR.

For example, as shown in FIG. 40, by connecting together a ring network 111 as UPSR, a ring network 112 as BLSR, and a ring network 113 as UPSR, such transmission apparatus 110 can efficiently construct a network which can operate, as a whole, as a UPSR ring network 114, while keeping a performance of BLSR in the ring network 112. Accordingly, the degree of freedom in design when constructing networks can be expected to improve.

SUMMARY OF THE INVENTION

In view of the foregoing problems, it is an object of the present invention to provide a transmission apparatus which can construct a ring network having a plurality of transmission systems different from each other.

Therefore, the present invention provides a transmission apparatus in a ring network in which a plurality of transmission apparatus each accommodating therein a line are connected together like a ring, allowing a plurality of channels of signals to be transmitted between the transmission apparatus as being multiplexed, the transmission apparatus comprising a demultiplexing section for demultiplexing multiplexed transmission signals from first and second lines constituting the ring network and outputting a plurality of sets of transmission signals constituted by signals of a plurality of channels; a branching and inserting section adapted to cause, of the plurality of sets of transmission signals demultiplexed by the demultiplexing section, a transmission signal of a desired channel to branch out into another line and insert a signal from another line as a transmission signal into the channel from which the transmission signal branches out; and a multiplexing and transmitting section for multiplexing the plurality of sets of transmission signals from the branching and inserting section and transmitting thus multiplexed signal as a multiplexed transmission signal to the first or second line becoming a relaying destination of transmission; wherein the branching and inserting section comprises a transmission route setting mechanism for setting a transmission route of each of the sets of transmission signals such that each set of the transmission signals are transmitted by one of a plurality of kinds of transmission systems.

The transmission route setting mechanism may comprise a plurality of route setting switches which set, according to the transmission system to be employed, a route of each set of the transmission signals demultiplexed by the demultiplexing section. In this case, the transmission route setting mechanism may comprise a switch setting section for setting states of the plurality of route setting switches such that each set of the transmission signals are transmitted by a desired transmission system in the plurality of kinds of transmission systems.

The transmission route setting mechanism may be configured such that each set of the transmission signals are relieved from a line fault occurring in the ring network by a line relief system corresponding to the transmission system employed for transmitting the transmission signals.

The transmission route setting mechanism may be configured so as to set the transmission route such that the plurality of sets of transmission signals are transmitted by means of one of a transmission system based on a uni-directional path switched ring and a transmission system based on a bi-directional line switched ring.

The transmission apparatus may be connected through n optical fibers to another transmission apparatus constituting the ring network, while the transmission route setting mechanism may be configured so as to set the transmission route such that at least one set of the plurality of sets of transmission signals can be transmitted by a transmission system in which a plurality of channels of signals can be transmitted through the n optical fibers.

The transmission apparatus may accommodate, under command thereof, a lower-layer multiplexing transmission apparatus for enabling multiplex transmission of a transmission signal having a preset channel in one of the plurality of transmission systems.

The demultiplexing section may be configured so as to demultiplex, in a time-division manner, a multiplexed transmission signal from the first or second line; whereas the multiplexing and transmitting section may be configured to perform time-division multiplex transmission of a transmission signal to be transmitted to the second or first line.

The demultiplexing section may comprise a first channel-interchanging switch for interchanging channels of the plurality of sets of demultiplexed transmission signals; whereas the multiplexing and transmitting section may comprise, at a stage prior to multiplexing channels of a plurality of sets of transmission signals from the branching and inserting section, a second channel-interchanging switch for interchanging the channels of the plurality of sets of demultiplexed transmission signals.

The transmission route setting mechanism may be configured so as to set the transmission route such that one of a transmission system capable of transmitting a plurality of channels of signals through two optical fibers and a transmission system capable of transmitting a plurality of channels of signals through four optical fibers.

Also, the present invention provides a transmission apparatus in a ring network in which a plurality of transmission apparatus are connected together like a ring through an optical fiber, the transmission apparatus comprising a plurality of transmitting sections adapted to send and receive a transmission signal according to transmission systems different from each other; a transmission signal/wavelength-division multiplexing optical signal interface section for interfacing the transmission signal in each transmitting section with an optical signal having an optical wavelength for wavelength-division multiplexed transmission set for each transmission signal in each of the transmitting sections; and a wavelength-division multiplexing and demultiplexing section for transmitting through the optical fiber the optical signal corresponding to the transmission signal in each transmitting section from the transmission signal/wavelength-division multiplexing optical signal interface section by multiplexing the optical signal in an optical wavelength division manner and demultiplexing, in an optical wavelength division manner, the optical signal transmitted through the optical fiber into optical signals having respective optical wavelengths which are set for the respective transmission signals in the transmitting sections.

Thus, in accordance with the present invention, the transmission route setting mechanism can set a transmission route of each set of demultiplexed plurality of sets of transmission signals such that each set of the transmission signals can be transmitted by one of a plurality of kinds of transmission systems. Accordingly, while the same transmission apparatus can be used as constituents of a ring network, it can be set to a transmission apparatus operable as UPSR, thus allowing a uni-directional path switched ring or bi-directional line switched ring to be constructed. Therefore, the present invention is advantageous in that it can dramatically improve the degree of freedom in design for constructing a ring network.

DESCRIPTION OF THE PREFERRED EMBODIMENTS

In the following, embodiments of the present invention will be explained with reference to the accompanying drawings.

(a) Explanation of First Embodiment

Figure 1:
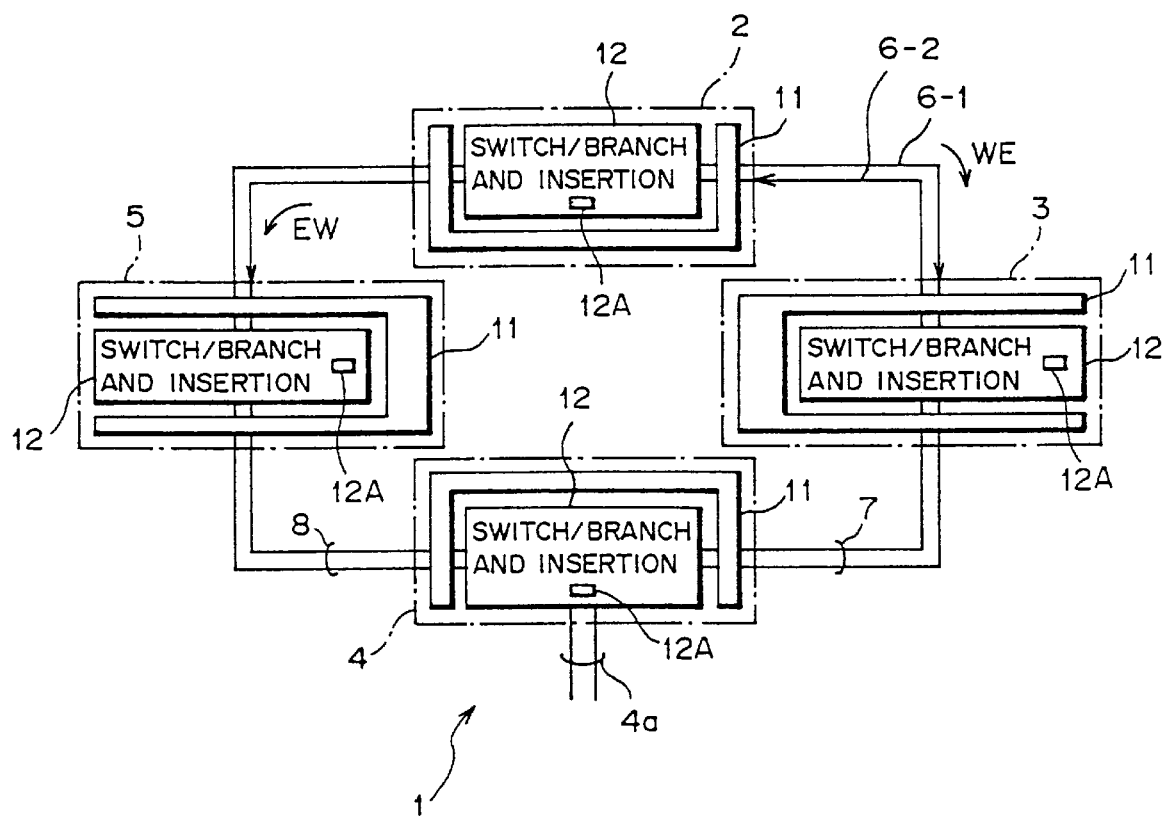
FIG. 1 is a block diagram showing a ring network in a first embodiment of the present invention.

FIG. 1 is a block diagram showing a ring network in a first embodiment of the present invention. In a ring network 1 shown in FIG. 1, four transmission apparatus 2 to 5 each accommodating a local line and the like therein are connected together via two optical fibers 6-1 and 6-2, whereby a plurality of channels of signals can be transmitted between the transmission apparatus 2 to 5 as being multiplexed. For example, each of the transmission apparatus 2 to 5 accommodates 192 channels of lines therein.

By employing one of transmission systems of BLSR and UPSR as a transmission system (ring type), each of the transmission apparatus 2 to 5 shown in FIG. 1 can transmit transmission signals as being multiplexed. Each transmission apparatus comprises a time-division multiplexing and demultiplexing section 11 for multiplexing and demultiplexing transmission signals, and a switch/branching and inserting section 12.

The time-division multiplexing and demultiplexing section 11 demultiplexes, per a plurality of sets of channel signals in a time-division manner, multiplexed transmission signals from lines (first and second lines) on the ring network 1 to which its own transmission apparatus 2 to 5 is connected; and multiplexes, in a time-division manner, a plurality of sets of transmission signals to be sent to the lines (second and first lines) on the ring network 1.

For example, the time-division multiplexing and demultiplexing section 11 in the transmission apparatus 4 demultiplexes, in a time-division manner, per a plurality of sets (e.g., four sets, each constituted by 48 channels) of channel signals, multiplexed signals from lines 7 and 8 respectively connected to the transmission apparatus 3 and 5 constituting the ring network 1; and multiplexes, in a time-division manner, the four sets of transmission signals to be sent to the line 7 or 8.

The switch/branching and inserting section 12 is adapted to cause, of the plurality of sets of transmission signals demultiplexed by the time-division multiplexing and demultiplexing section 11, a desired channel of transmission signals to branch out into another line, and insert the signals from another line accommodated in its own transmission apparatus 2 to 5 into the channel from which the transmission signals branch out as transmission signals for this channel, thereby functioning as a branching and inserting section.

The switch/branching and inserting section 12 is equipped with a transmission route setting mechanism 12A for setting a transmission route of each set of transmission signals demultiplexed by the time-division multiplexing and demultiplexing section 11 such that each set of the transmission signals are transmitted by one of the BLSR and UPSR transmission systems.

As a result, the transmission apparatus 2 to 5 constituting the ring network 1 can functionally transmit 192 channels of multiplexed transmission signals by one of transmission systems of BLSR and UPSR.

In other words, according to the setting of the switch/branching and inserting section 12, which will be explained later, the ring network 1 shown in FIG. 1 can be constructed not only as the UPSR shown in the above-mentioned FIGS. 35(a) and 35(b) but also as the BLSR shown in the above-mentioned FIGS. 38(a) and 38(b).

The optical fibers 6-1 and 6-2 are used for propagating optical signals on the ring network 1 clockwise and counterclockwise, respectively, in FIG. 1. Here, the propagating direction of the optical fiber 6-1 is simply indicated as "WE" which is the direction from west to east, whereas the propagating direction of the optical fiber 6-2 is simply indicated as "EW" which is the direction from east to west.

Figure 2:
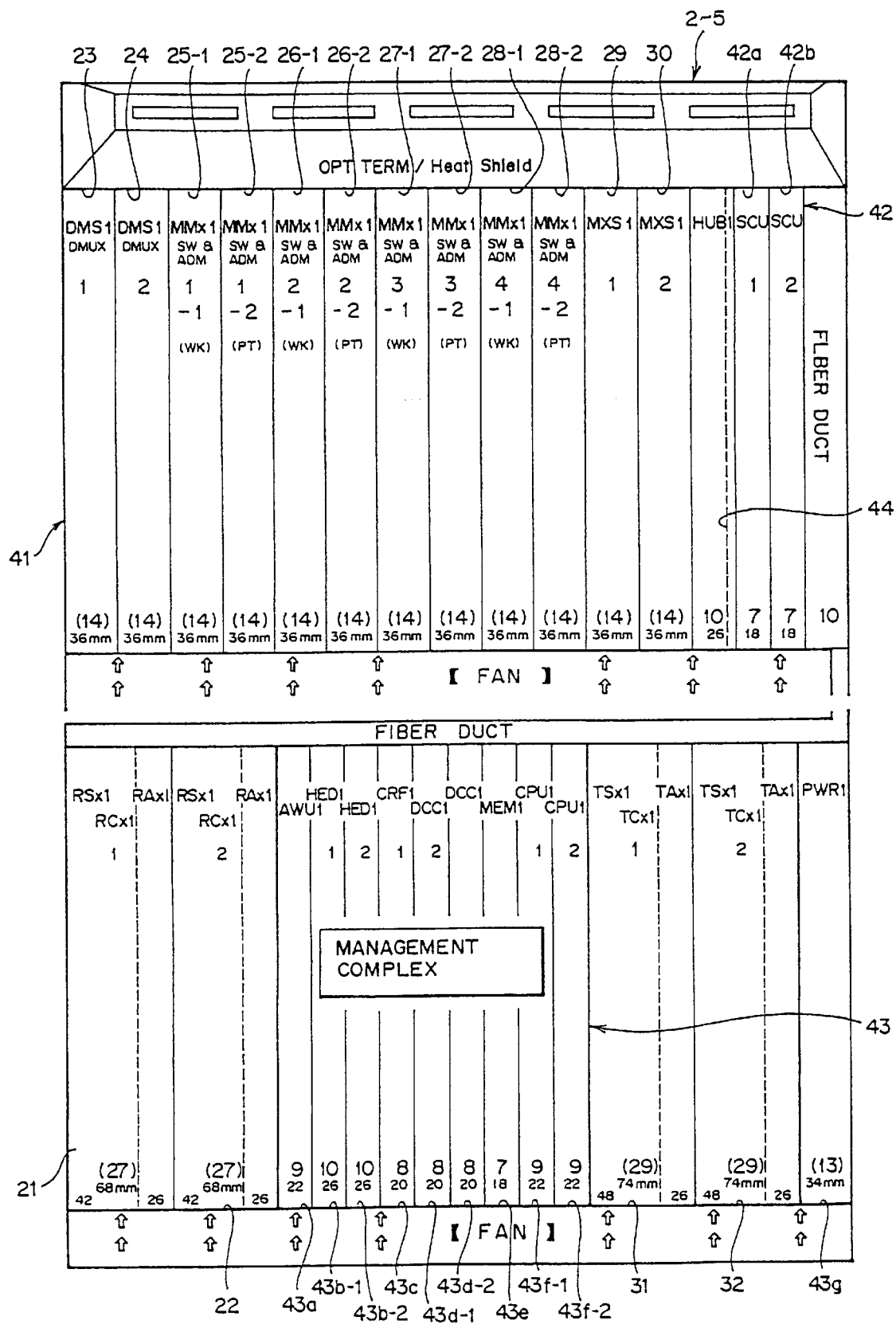
FIG. 2 is a view showing a detailed configuration of a transmission apparatus constituting a ring network.

In detail, each of the transmission apparatus 2 to 5 constituting the ring network 1 has, as shown in FIG. 2, a shelf structure 10 comprising a transport complex 41 providing a function of a main signal processing system for signals transmitted over the ring network 1, a synchronization complex 42 for providing a timing synchronizing function, and a management complex 43 for providing a system monitoring and controlling function.

Though the following explanation will be focused on the configuration of the transmission apparatus 4 for convenience of explanation, the other transmission apparatus 2, 3, and 5 are configured similarly to the transmission apparatus 4 as well.

The transport complex 41 of the transmission apparatus 4 comprises receiving sections (RCx1) 21 and 22; demultiplexing circuit sections (DMS1) 23 and 24; working branching and inserting circuit sections (MMx1) 25-1 to 28-1; protection branching and inserting circuit sections (MMx1) 25-2 to 28-2; multiplexing circuit sections (MXS1) 29 and 30; and transmitting sections (TCx1) 31 and 32. Specifically, in terms of its function, the transport complex 41 is configured as shown in FIG. 3.

Figure 3:
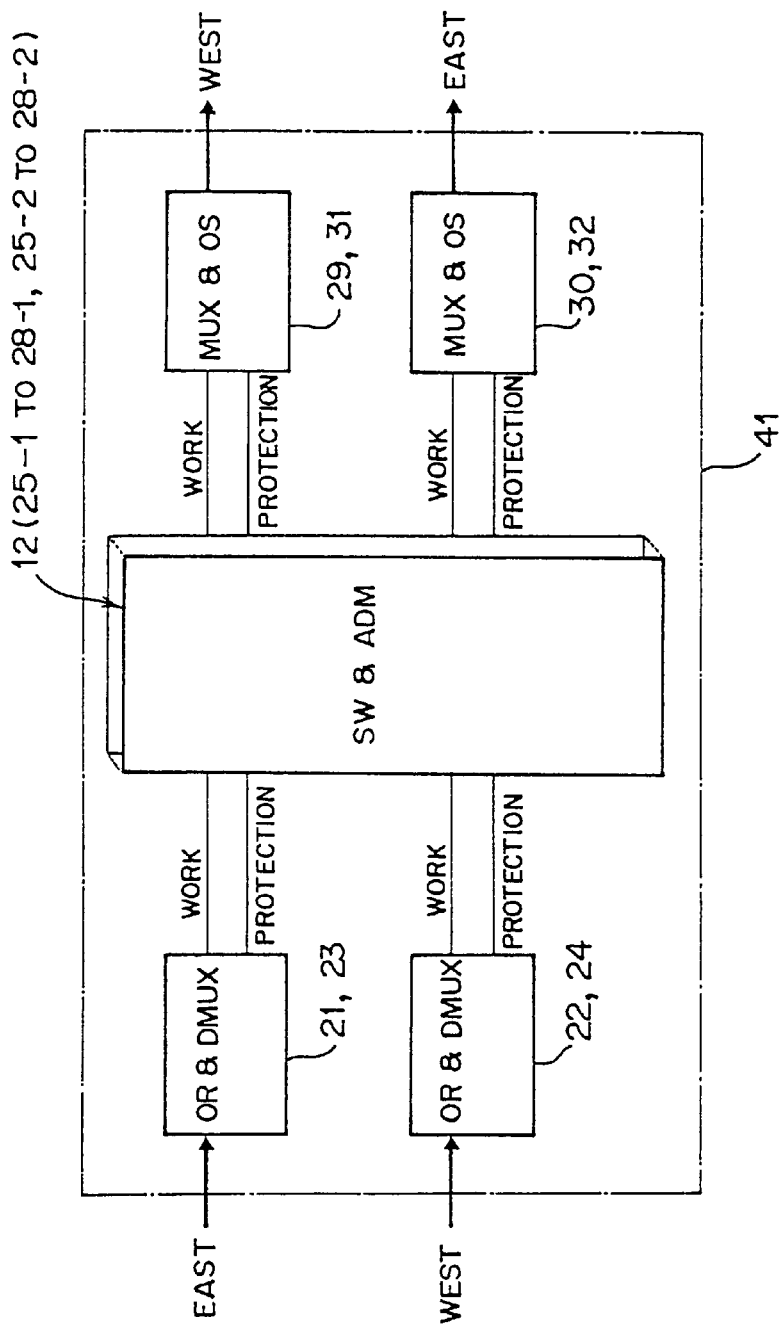
FIG. 3 is a block diagram showing a configuration of a major part of a transport complex in the transmission apparatus in accordance with the first embodiment.

As shown in FIG. 3, the receiving section 21 receives optical signals, as transmission signals from the line 7 (first line; transmission signals along the west-to-east direction), through the optical fiber 6-1 and converts them into electric signals; whereas the receiving section 22 receives optical signals, as transmission signals from the line 8 (transmission signals along the east-to-west direction), through the optical fiber 6-2 and converts them into electric signals.

The demultiplexing circuit section (DMS1) 23 demultiplexes, in a time-division manner, the multiplexed transmission signals received by the receiving section 21; whereas the demultiplexing circuit section (DMS1) 24 demultiplexes, in a time-division manner, the multiplexed transmission signals received by the receiving section 22.

In other words, in a normal state, each of the demultiplexing circuits 23 and 24 demultiplexes, in a time-division manner, multiplexed transmission signals, to which 192 channels are assigned, into 48 channels of signal sets which are preset according to a transmission system; and distributes and outputs thus demultiplexed transmission signals into predetermined branching and inserting circuit sections 25-1 to 28-1.

Namely, the demultiplexing circuit sections 23 and 24 functions as a demultiplexing section for demultiplexing multiplexed transmission signals from the lines 7 and 8 constituting the ring network 1 and outputting a plurality of sets of transmission signals constituted by a plurality of channels of signals.

Specifically, 48 channels in total of signal sets of channels "1" to "24" and "97" to "120" and 48 channels in total of signal sets of channels "25" to "148" and "121" to "144" demultiplexed by both of the demultiplexing circuits 23 and 24 are respectively outputted to the branching and inserting circuits 25-1 and 26-1.

Similarly, 48 channels in total of signal sets of channels "49" to "72" and "145" to "168" and 48 channels in total of signal sets of channels "73" to "96" and "169" to "192" demultiplexed by both of the demultiplexing circuits 23 and 24 are outputted to the branching and inserting circuits 27-1 and 28-1, respectively.

The branching and inserting circuit sections 25-1 to 28-1 can cause, of the transmission signals (48 channels of signal sets) inputted therein as being demultiplexed by the demultiplexing circuit sections 23 and 24, a desired channel of transmission signals to branch out into another line 4a such as a local line; and can insert signals from another line 4a into the channel from which the transmission signal branches out as a transmission signal of this channel. The branching and inserting circuit sections 25-1 to 28-1 (and branching and inserting circuit sections 25-2 to 28-2 which will be explained later) constitute the switch/branching and inserting section 12.

Namely, in the transmission apparatus 4 (or similarly in the transmission apparatus 2,3, and 5) in accordance with the first embodiment, according to the setting of each of the branching and inserting circuit sections 25-1 to 28-1, 192 channels of signals in the ring network 1 can be transmitted by one transmission system of BLSR and UPSR. Such setting of each branching and inserting circuit section 25-1 to 28-1 is effected by the management complex 43, which will be explained later.

Thus, the branching and inserting circuit sections 25-1 to 28-1 function as the transmission route setting mechanism 12A for setting the transmission route of each set of transmission signals from the demultiplexing circuit sections 23 and 24 such that each set of transmission signals from the demultiplexing circuit sections 23 and 24 are transmitted by one of transmission systems of BLSR and UPSR.

Figure 4:
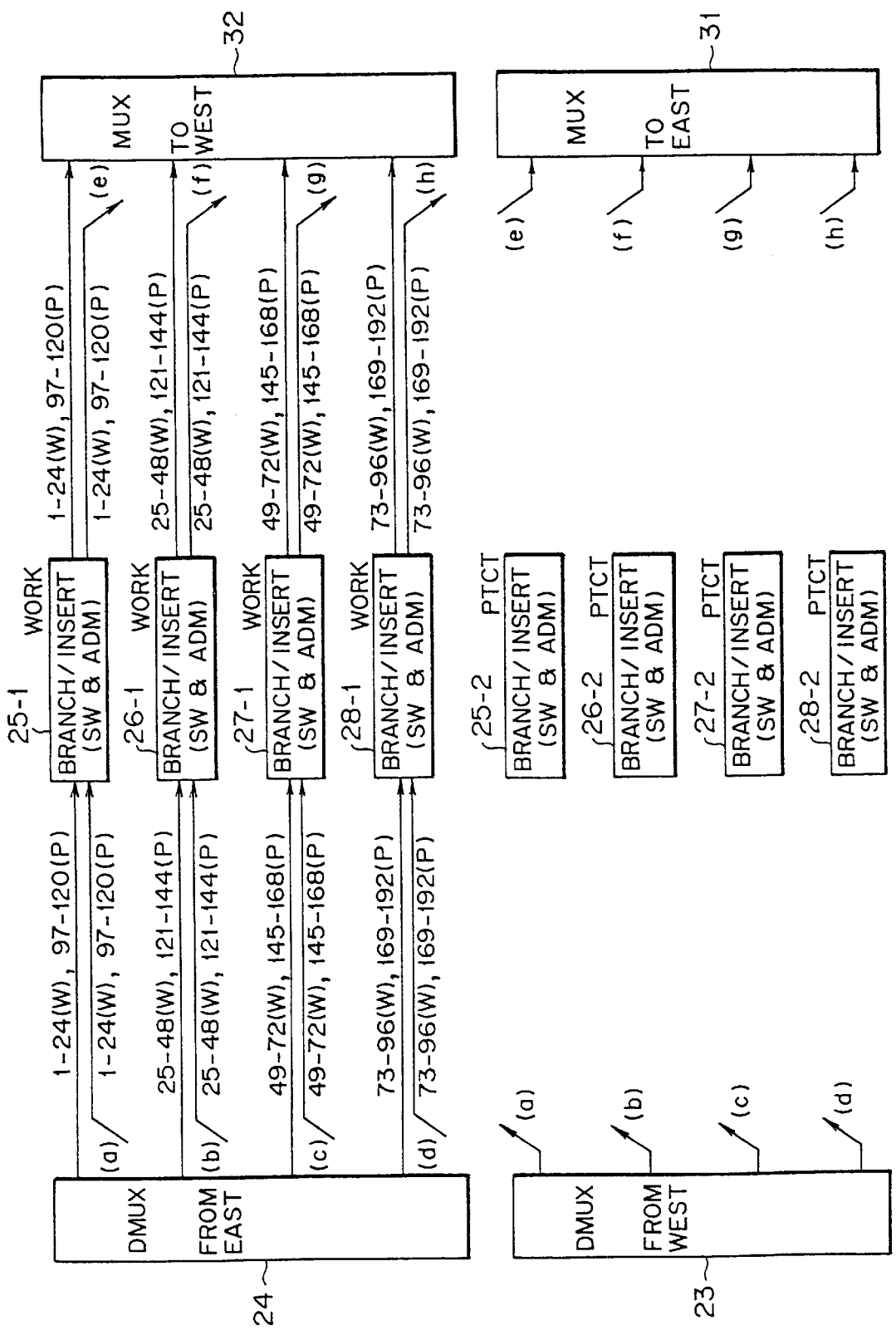
FIG. 4 is a view showing a channel setting for each branching and inserting circuit section when a ring network based on BLSR is constructed by means of the transmission apparatus in accordance with the first embodiment.

Here, in the case where the transmission signals are transmitted by the transmission system based on BLSR according to the setting of the branching and inserting circuits 25-1 to 28-1, work channels (referred to as "W" in the drawing) and protection channels (referred to as "P" in the drawing) are set as shown in FIG. 4.

Here, for 10-Gb/s signals such as STS-192, 192 channels can be set as the number of channels to be set per optical fiber. In the transmission system based on BLSR, 96 channels (channel "1" to "96") of the first half can be set to work channels, whereas the remaining 96 channels (channel "96" to "192") can be set to protection channels.

For example, in the case where the transmission signals are transmitted by the transmission system based on BLSR, in the branching and inserting circuit section 25-1, from both of the optical fibers 6-1 and 6-2, the channels "1" to "24" are set to work channels, whereas the channels "97" to "120" are set to protection channels.

In a manner similar to that of the branching and inserting circuit section 25-1, 24 work channels and 24 protection channels are set to transmission signals from both of the optical fibers 6-1 and 6-2 concerning 48 channels of signals assigned to each of the other branching and inserting circuit sections 26-1 to 28-1 as work channels.

Figure 5:
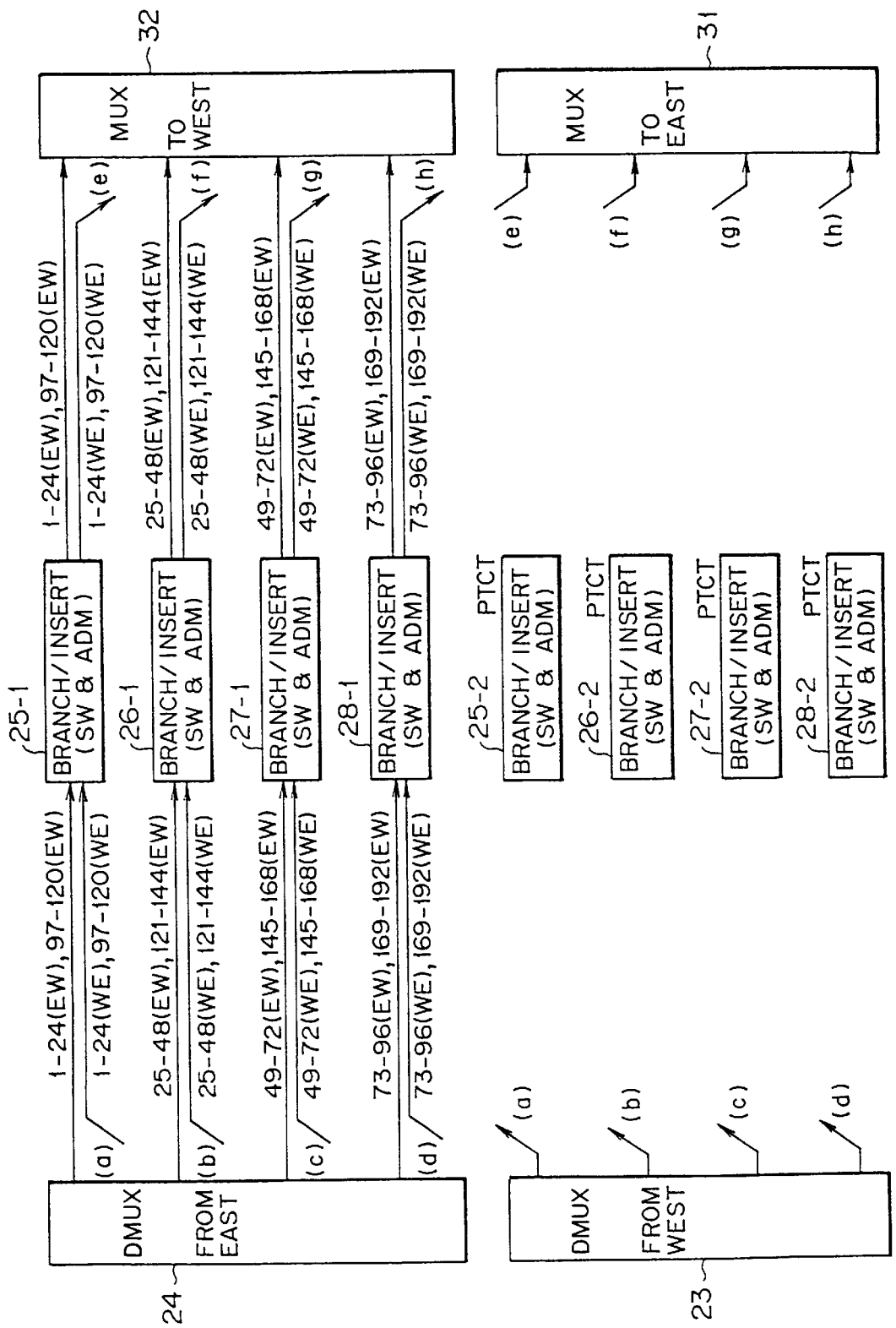
FIG. 5 is a view showing a channel setting for each branching and inserting circuit section when a ring network based on UPSR is constructed by means of the transmission apparatus in accordance with the first embodiment.

Here, in the case where the transmission signals are transmitted by the transmission system based on UPSR according to the setting of the branching and inserting circuit sections 25-1 to 28-1, channels are assigned to the transmission signals to be transmitted in the branching and inserting circuit sections 25-1 to 28-1 as shown in FIG. 5.

Namely, assigned to the branching and inserting circuit section 25-1 are channels "1" to "24" and channels "97" to "120" (48 channels in total) from both of the optical fibers 6-1 and 6-2.

Similarly, 48 channels of signals are assigned to each of the other branching and inserting circuit sections 26-1 to 28-1. The transmission signals whose channels are assigned to the discrete branching and inserting circuit sections 25-1 to 28-1 are outputted to the multiplexing circuit sections 29 and 30 corresponding to the lines 7 and 8 on the output side.

Figure 6:
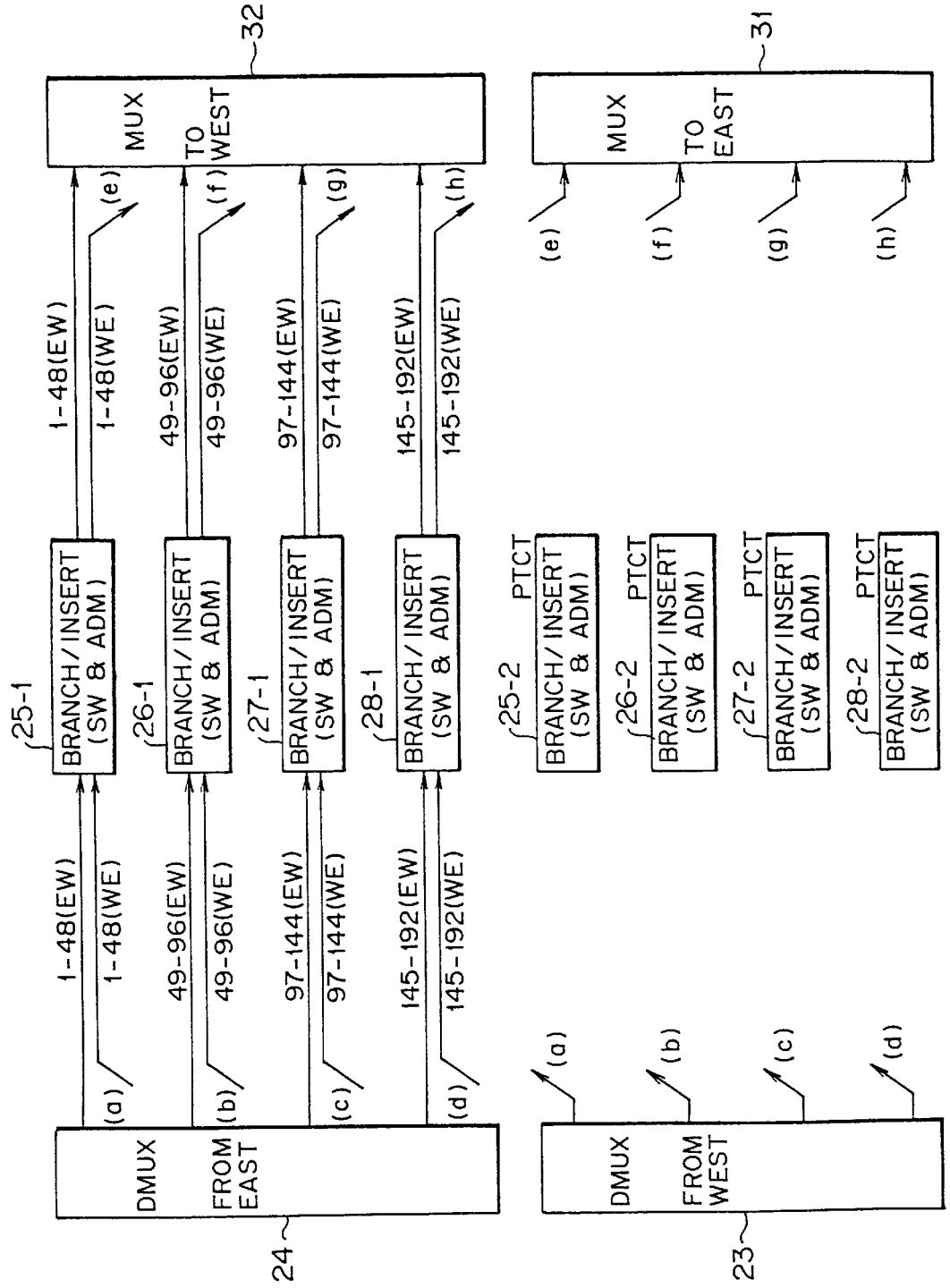
FIG. 6 is a view for explaining a channel setting for each branching and inserting circuit section when a ring network based on UPSR is constructed by means of the transmission apparatus in accordance with the first embodiment.

Consequently, in the case where the transmission signals are transmitted by UPSR in the branching and inserting circuit sections 25-1 to 28-1, when the channels are assigned not as shown in FIG. 6 but as shown in FIG. 5, channels can be assigned to the branching and inserting circuit sections 25-1 to 28-1 in common with the above-mentioned case of BLSR-based transmission.

On the other hand, the branching and inserting circuit sections 25-2 to 28-2 of a protection system change into a work system respectively when faults occur in the branching and inserting circuit sections 25-1 to 28-1, thereby effecting branching and inserting processing of the same channels of signal sets as those of their corresponding branching and inserting circuit sections 25-1 to 28-1.

Figure 7:
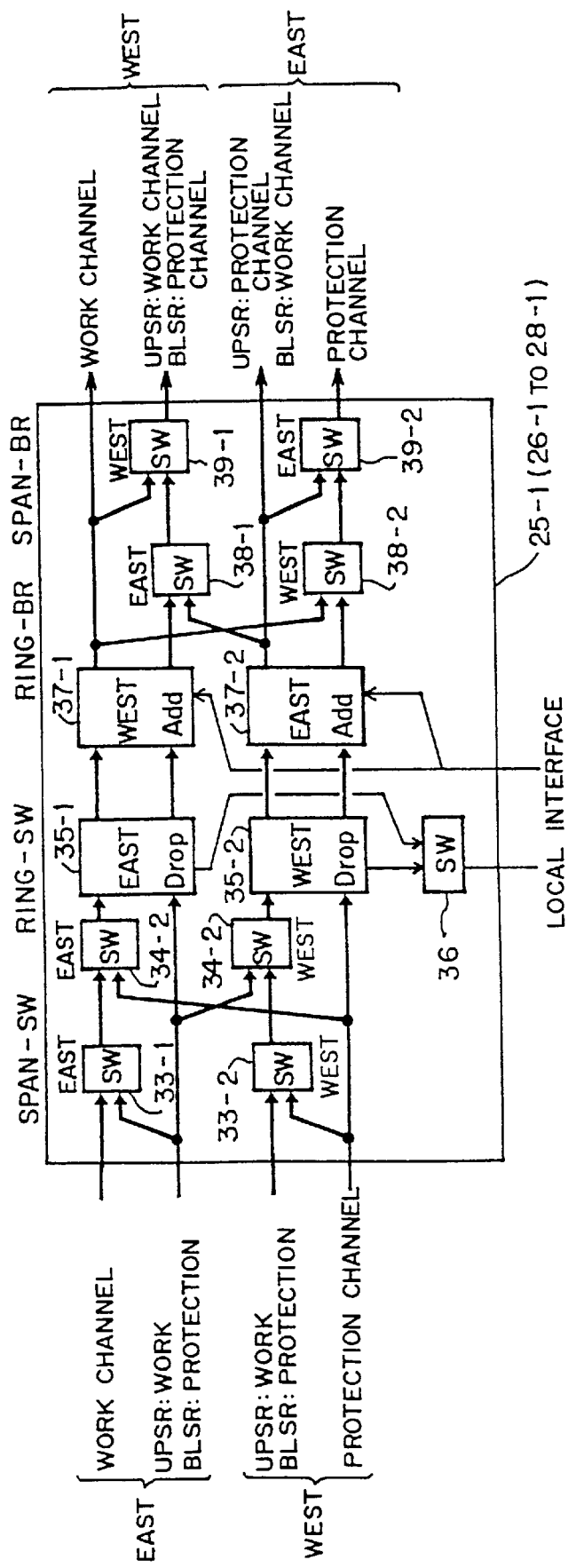
FIG. 7 is a block diagram showing the branching and inserting circuit section in the transmission apparatus in accordance with the first embodiment.

Meanwhile, each of the branching and inserting circuit sections 25-1 to 28-1 and 25-2 to 28-2 comprises, as shown in FIG. 7 in detail, span-switching switches (SPAN-SW) 33-1 and 33-2, ring-switching switches (RING-SW) 34-1 and 34-2, branching sections (Drop) 35-1 and 35-2, a path switch (Path-SW) 36, inserting sections (Add) 37-1 and 37-2, ring-bridging switches (RING-BR) 38-1 and 38-2, and span-bridging switches (SPAN-BR) 39-1 and 39-2.

The states of the above-mentioned switches 33-1, 33-2, 34-1, 34-2, 36, 38-1, 38-2, 39-1, and 39-2 are set by the management complex 43.

Though the following explanation will be focused on the branching and inserting circuit section 25-1, the other branching and inserting circuit sections 26-1 to 28-1 and 25-2 to 28-2 are configured similarly to the branching and inserting circuit section 25-1.

Here, the span-switching switches 33-1 and 33-2, ring-switching switches 34-1 and 34-2, ring-bridging switches 38-1 and 38-2, and span-bridging switches 39-1 and 39-2 are adapted to operate when BLSR is employed as the transmission system; whereas the path switch (Path-SW) 36 is adapted to operate when UPSR is employed as the transmission system.

Accordingly, the above-mentioned switches 33-1, 33-2, 34-1, 34-2, 36, 38-1, 38-2, 39-1, and 39-2 operate as route-setting switches for setting the route of each set of transmission signals demultiplexed by the demultiplexing circuit sections 23 and 24.

The span-switching switches 33-1 and 33-2 and span-bridging switches 39-1 and 39-2 are adapted to operate in the case where a four-fiber ring network in which the transmission apparatus are connected together via four optical fibers is constructed. In the first embodiment, they are set so as to select work channels in either case where the transmission system employs UPSR or BLSR.

In the case where the transmission apparatus 4 functions as a switching node employing BLSR, the ring-switching switches 34-1 and 34-2 select signals via their opposite routes and output thus selected signals to the branching sections 35-1 and 35-2. They are set to a through state when the transmission apparatus 4 functions as a switching node employing UPSR.

Specifically, the ring-switching switch 34-1 normally selects work channel signals (channels "1" to "24") in the transmission signals EW (transmission signals from the optical fiber 6-2); whereas, when the transmission apparatus 4 functions as a switching node (see numerals 103 and 104 in FIG. 39), the ring-switching switch 34-1 changes over to selectively outputting the protection channel signals (channels "97" to "120") in the transmission signals WE (from the optical fiber 6-1).

Similarly, the ring-switching switch 34-2 normally selects work channel signals (channels "1" to "24") in the transmission signals WE from the optical fiber 6-1; whereas, when the transmission apparatus 4 functions as a switching node, the ring-switching switch 34-2 changes over to selectively outputting the protection channel signals (channels "97" to "120") in the transmission signals EW from the optical fiber 6-2.

The branching sections 35-1 and 35-2 cause, of the transmission signals inputted therein, signals of channels to be sent to another line (e.g., local interface) 4a to branch out.

Namely, the branching section (EAST Drop) 35-1 causes, of the transmission signals EW (channels "1" to "24" and "97" to "120"), a desired channel of signals to be sent to another line 4a to partially branch out so as to be outputted to the path switch 36, while outputting the remaining channel signals to the inserting section 37-1.

Similarly, the branching section (WEST Drop) 35-2 causes, of the transmission signals WE (channels "1" to "24" and "97" to "120"), a desired channel of signals to be sent to another line 4a to partially branch out so as to be outputted to the path switch 36, while outputting the remaining channel signals to the inserting section 37-1.

In the case where the transmission apparatus 4 functions as a switching node employing UPSR, the path switch 36 selects, of two sets of signals belonging to the same channel that have branched out at the two branching sections 35-1 and 35-2 so as to be directed opposite to each other, the one having a higher quality (less errors or the like) and send thus selected set of signals to the line 4a. By contrast, it is set to a through state when the transmission apparatus 4 employs BLSR.

The inserting sections 37-1 and 37-2 inserts the signals from another line 4a into the transmission signals from the branching sections 35-1 and 35-2 so as to be outputted with the latter signals. Employed as the channels of the signals to be inserted from the line 4a are the channels from which signals have been caused to branch out in the branching sections 35-1 and 35-2.

Namely, the inserting section (WEST Add) 37-1 inserts the signals from another line 4a as transmission signals into, of the transmission signals EW (channels "1" to "24" and "97" to "120"), the channel from which a signal has branched out in the branching section 35-1.

Similarly, the inserting section (EAST Add) 37-2 inserts the signals from another line 4a as transmission signals into, of the transmission signals WE (channels "1" to "24" and "97" to "120"), the channel from which a signal has branched out in the branching section 35-2.

In the case where the transmission apparatus 4 functions as a switching node employing BLSR, the ring-bridging switches 38-1 and 38-2 turn around signals toward their opposite routes. In the case where the transmission apparatus 4 employs UPSR, by contrast, these switches are set to a through state.

Specifically, when the transmission apparatus 4 functions as a switching node employing BLSR, the ring-bridging switch 38-1 turns around and outputs the work channel signals (channels "1" to "24") in the transmission signals WE (transmission signals from the optical fiber 6-1) as the protection channel signals (channels "97" to "120") in the opposite route (transmission signals EW).

Similarly, when the transmission apparatus 4 functions as a switching node employing BLSR, the ring-bridging switch 38-2 turns around and outputs the work channel signals (channels "1" to "24") in the transmission signals EW (transmission signals from the optical fiber 6-2) as the protection channel signals (channels "97" to "120") in the opposite route (transmission signals WE).

Consequently, while the branching and inserting circuit section 25-1 branches and inserts the transmission signals with respect to another line 4a, as the management complex 43 sets the states of individual switches 33-1, 33-2, 34-1, 34-2, 38-1, 38-2, 39-1, and 39-2, the assigned channels of signals (channels "1" to "24" and "97" to "120") can be transmitted by UPSR or BLSR.

On the other hand, the multiplexing circuit section (MXS1) 29 multiplexes (in a time-division manner) again the transmission signals (transmission signals WE) which are demultiplexed by the demultiplexing circuit section 23 and then are subjected to the signal branching and inserting processing at the branching and inserting circuit sections 25-1 to 28-1; whereas the multiplexing circuit section (MXS1) 30 multiplexes (in a time-division manner) again the transmission signals (transmission signals EW) which are demultiplexed by the demultiplexing circuit section 24 and then are subjected to the signal branching and inserting processing at the branching and inserting circuit sections 25-1 to 28-1.

In other words, each of the multiplexing circuit sections 29 and 30 normally multiplexes the signals subjected the signal branching and inserting processing, 48 channels each, at the branching and inserting circuit sections 25-1 to 28-1, thereby outputting thus multiplexed signals as 192 channels of multiplexed transmission signals to their corresponding transmitting sections 31 and 32.

Namely, the demultiplexing circuit sections 23 and 24 and the multiplexing circuit sections 29 and 30 function as the time-division multiplexing and demultiplexing section 11 (see FIG. 1) for multiplexing and demultiplexing the transmission signals.

The transmitting section (TCx1) 31 converts the multiplexed transmission signals (electric signals) from the multiplexing circuit section 29 into optical signals and outputs these optical signals, as multiplexed transmission signals, through the optical fiber 6-1; whereas the transmitting section (TCx1) 32 converts the multiplexed transmission signals (electric signals) from the multiplexing circuit section 30 into optical signals and outputs these optical signals, as multiplexed transmission signals, through the optical fiber 6-2.

Accordingly, the multiplexing circuit sections 28 and 29 and transmitting sections 31 and 32 function as a multiplexing and transmitting section for multiplexing the transmission signals from a plurality of branching and inserting circuit sections 25-1 to 28-1 (25-2 to 28-2) and transmitting the resulting multiplexed transmission signal to the above-mentioned second or first line, which becomes a relaying destination for transmission.

As mentioned above, the synchronization complex 42 provides a timing synchronizing function for the whole system of the transmission apparatus 4. It comprises SC circuit sections 42a and 42b for collecting reference clock, distributing timing, processing synchronization messages, and the like.

As mentioned above, the management complex 43 provides a monitoring and controlling function for the whole system of the transmission apparatus 4. It comprises an AWU1 circuit section 43a, HED1 circuit sections 43b-1 and 43b-2, a CRF1 circuit section 43c, DCC1 circuit sections 43d-1 and 43d-2, a MEM1 circuit section 43e, CPU circuit sections 43f-1 and 43f-2, and a PWR circuit 43g as a power supply.

Namely, the CPU circuit sections 43f-1 and 43f-2 mainly perform software processing while accessing to the MEM1 circuit section 43e, thereby allowing the states of individual switches 33-1, 33-2, 34-1, 34-2, 36, 38-1, 38-2, 39-1, and 39-2 in the branching and inserting circuit sections 25-1 to 28-1 (25-2 to 28-2) to be set, for example.

Thus, the management complex 43 can set the states of the individual switches 33-1, 33-2, 34-1, 34-2, 36, 38-1, 38-2, 39-1, and 39-2, thereby functioning as a switch setting section.

The HED1 circuit sections 43b-1 and 43b-2 perform interface processing (polling control and overhead interface processing) with respect to the transport complex 41 and are connected via an optical fiber 46 (see FIG. 8) to a HUB1 circuit section 44 which multiplexes and demultiplexes overhead information in the transmission signal frame.

Consequently, all of the monitoring and controlling information, overhead information, and the like can be exchanged with respect to the transport complex 41 and management complex 42 as being linked by optical signals. As such an optical link, a frame (ATM cell for payload) of STS-3c (Synchronous Transport Signal-Level 3c) with a transmission speed on the order of 155.52 Mb/s can be used, for example.

Figure 8:
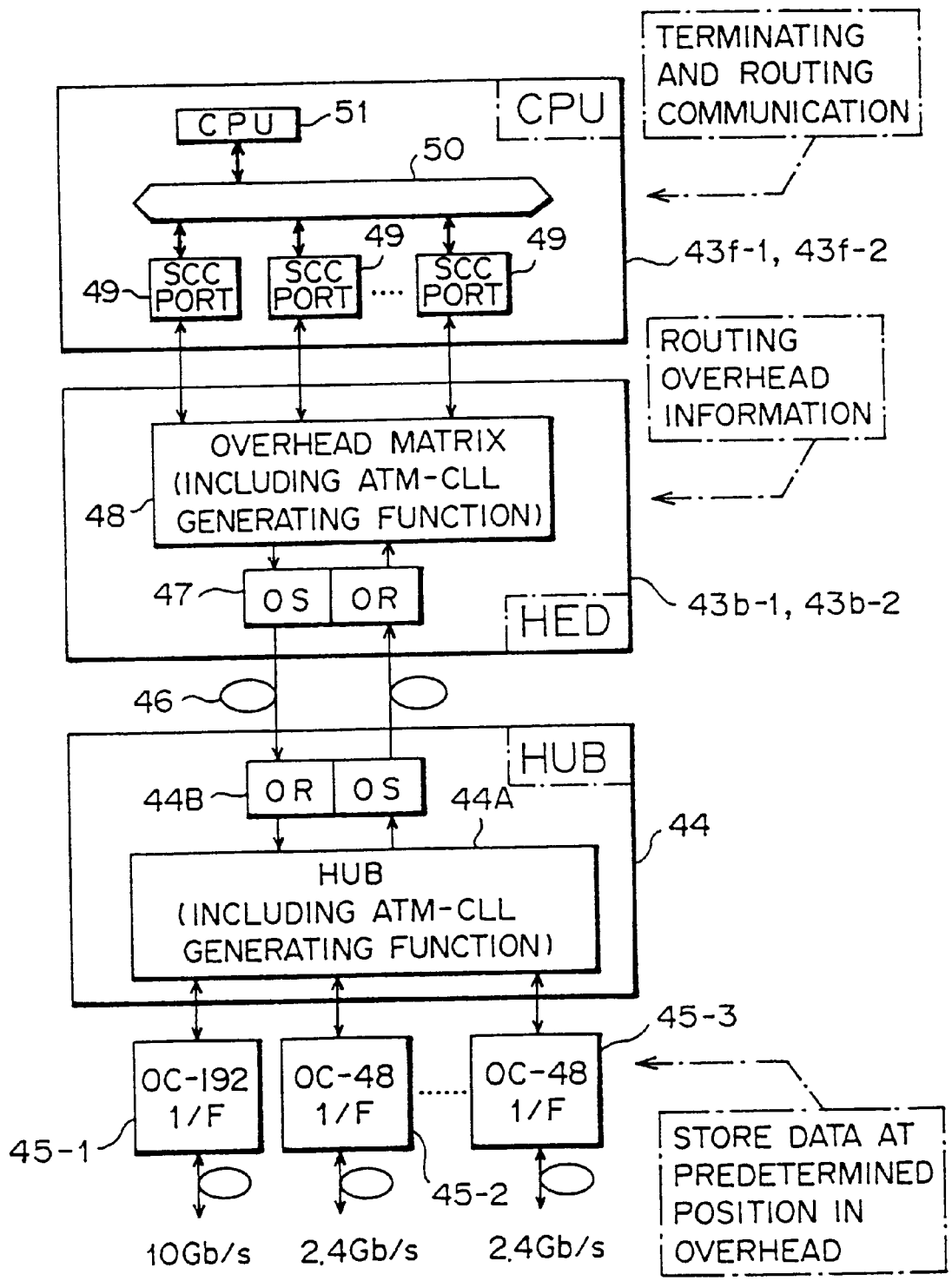
FIG. 8 is a block diagram showing a configuration of a major part of a management complex in the transmission apparatus in accordance with the first embodiment.

As shown in FIG. 8, the overhead information included in a transmission signal frame from a line accommodated in the transmission apparatus 4 is sent to the CPU circuit sections 43f-1 and 43f-2 by way of the HUB1 circuit section 44 and HED1 circuit sections 43b-1 and 43b-2.

The HUB1 circuit section 44 comprises a HUB section 44A for multiplexing into the above-mentioned STS-3c frame the overhead information from interface sections 45-1 to 45-3 which terminate the transmission signal, and an optical receiver/optical sender (OR/OS) 44B functioning as an electric/optical interface with respect to the optical fiber 46 to the HED1 circuit sections 43b-1 and 43b-2.

Namely, the HUB section 44A of the HUB1 circuit section 44 multiplexes the overhead information from the interface sections 45-1 to 45-3, which terminate OC-192 (Optical Carrier-Level 192; 10 Gb/s), OC-48 (Optical Carrier-Level 48; 2.4 Gb/s), and the like, as a transmission signal frame employed in a line accommodated in the transmission apparatus 4; whereas the optical receiver/ optical sender 44B converts thus multiplexed overhead information into optical signals which are outputted to the HED1 circuit sections 43b-1 and 43b-2.

Each of the HED1 circuit sections 43b-1 and 43b-2 comprises an optical receiver/optical sender (OR/OS) 47 functioning as an electric/optical interface with respect to the optical fiber 46 to the HED1 circuit sections 43b-1 and 43b-2; and an overhead matrix section 48 for generating ATM (Asynchronous Transfer Mode) cells from the multiplexed overhead information from the HUB1 circuit section 44 and effecting routing control for outputting thus generated ATM cells to any of a plurality of SCC ports 49 on the side of the CPU circuit sections 43f-1 and 43f-2.

A CPU 51 connected to the SCC ports 49 via a bus 50 can recognize the overhead information contained in the transmission signal frame and thus can monitor and control the system.

For example, by recognizing APS bytes (K1 and K2) in the overhead information, the CPU 51 sets and controls the states of the switches 33-1, 33-2, 34-1, 34-2, 38-1, 38-2, 39-1, and 39-2 in each of the branching and inserting circuit sections 25-1 to 28-1 (25-2 to 28-2) so that the transmission apparatus 4 can transmit transmission signals as BLSR.

The overhead information assigned to the transmission signal frame to be transmitted from the transmission apparatus 4 via the lines 7 and 8 is reported, via the HED1 circuit sections 43b-1 and 43b-2 and HUB1 circuit section 44, to the interface sections 45-1 to 45-3 terminating the corresponding transmission signal frame from the CPU circuit sections 43f-1 and 43f-2.

Consequently, each interface section 45-1 to 45-3 can construct a transmission signal frame in which the overhead information reported by the CPU circuit sections 43f-1 and 43f-2 are recorded at a predetermined byte position, and transmit thus constructed transmission signal frame via the lines 7 and 8.

The HUB section 44A of the HUB1 circuit section 44 also has a function of generating ATM cells from the overhead information inputted from the CPU circuit sections 43f-1 and 43f-2 via the HED1 circuit sections 43b-1 and 43b-2 and controlling the routing thereof so as to direct the ATM cells to desired interface sections 45-1 to 45-3.

Consequently, in the case where the transmission apparatus 4 employs the BLSR-based transmission system, via the HED1 circuit sections 43b-1 and 43b-2, HUB1 circuit section 44, and discrete interface sections 45-1 to 45-3, the CPU circuit sections 43f-1 and 43f-2 in the management complex 43 of the transmission apparatus 4 can set K1 and K2, as APS bytes, in the transmission signal frame to be transmitted to the lines 7 and 8.

Figure 9:
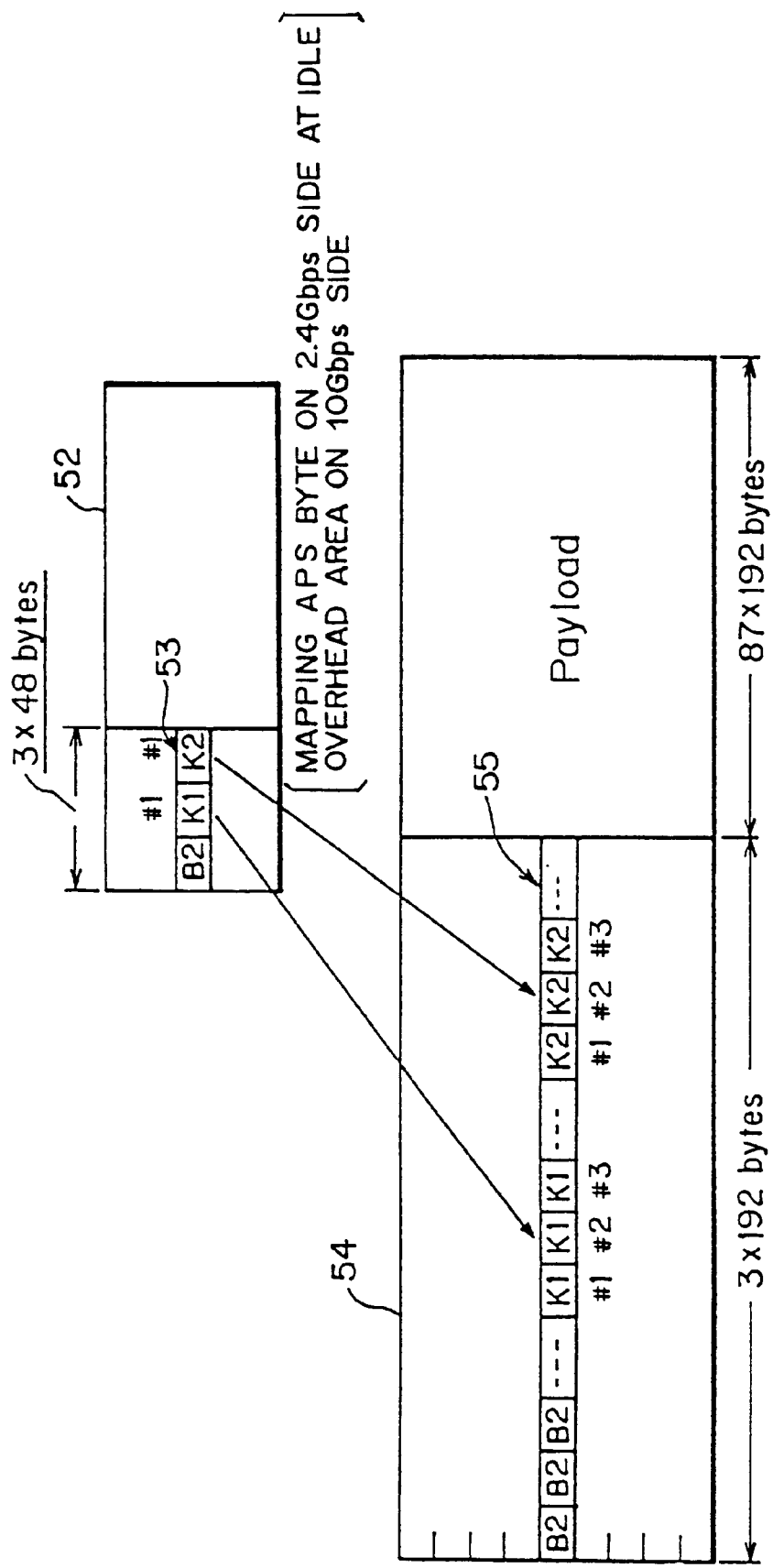
FIG. 9 is a view for explaining a technique for mapping APS bytes into a transmission frame when a ring network is constructed according to BLSR in the first embodiment.

In the case where the transmission apparatus 4 employs the BLSR-based transmission system, as shown in FIG.9, when channel signals from another line (2.4 Gb/s) 4a are to be inserted into the 10-Gb/s lines 7 and 8, the CPU circuit sections 43f-1 and 43f-2 perform a control operation such that APS bytes 53 constituting a 2.4-Gb/s transmission signal frame 52 is mapped at an idle overhead area 55 in a 10-Gb/s transmission signal frame 54.

In the following, with the foregoing configuration, operations of the transmission apparatus 2 to 5 in the ring network 1 in accordance with the first embodiment of the present invention will be explained.

Figure 10:
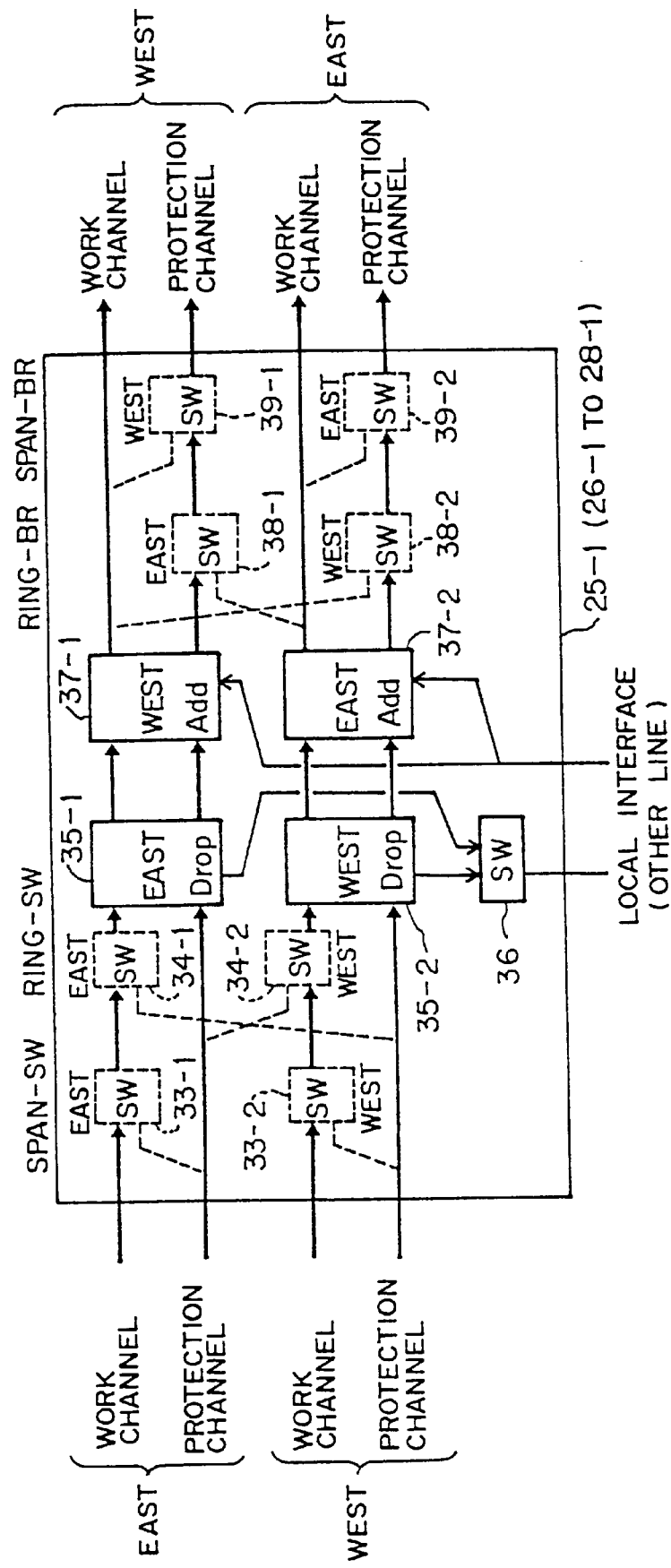
FIGS. 10 to 13 are block diagrams for explaining switch settings in the branching and inserting circuit section in the transmission apparatus when a ring network is constructed in the first embodiment.
Figure 11:
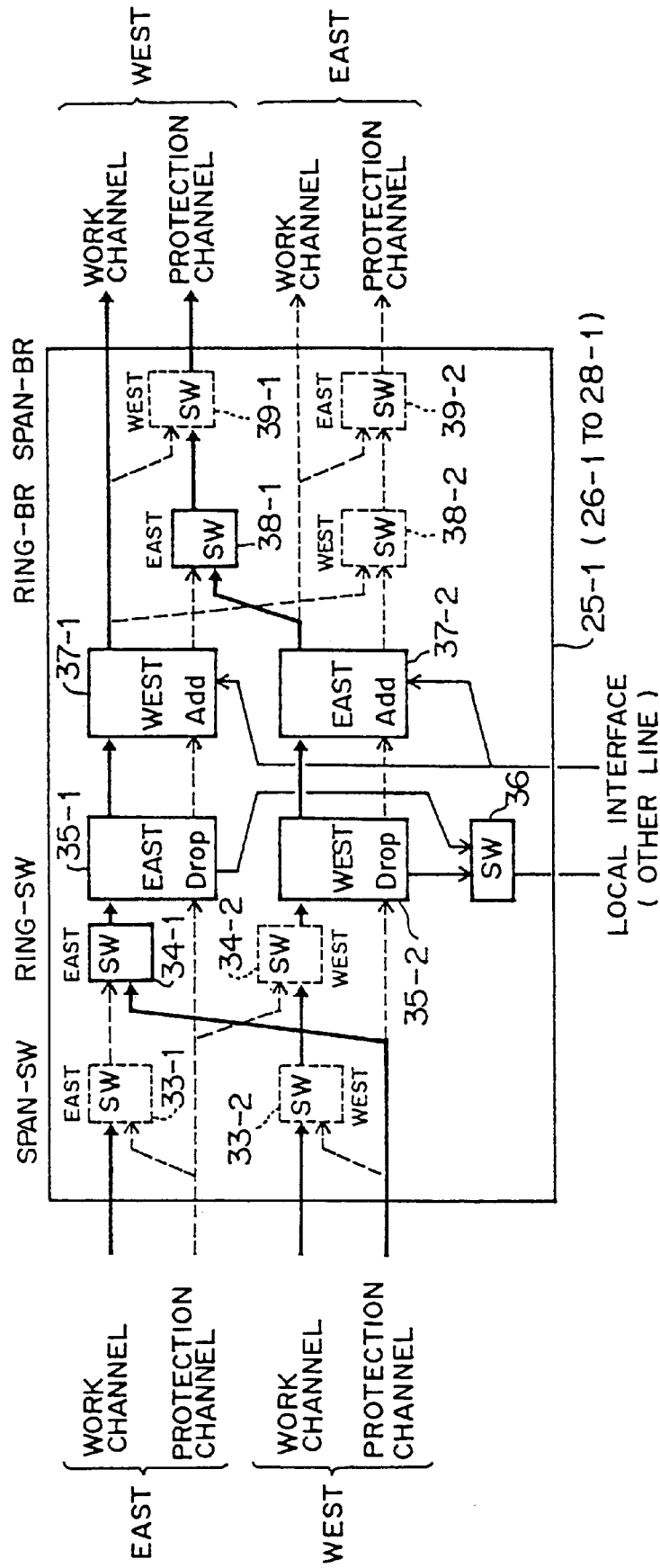
Figure 12:
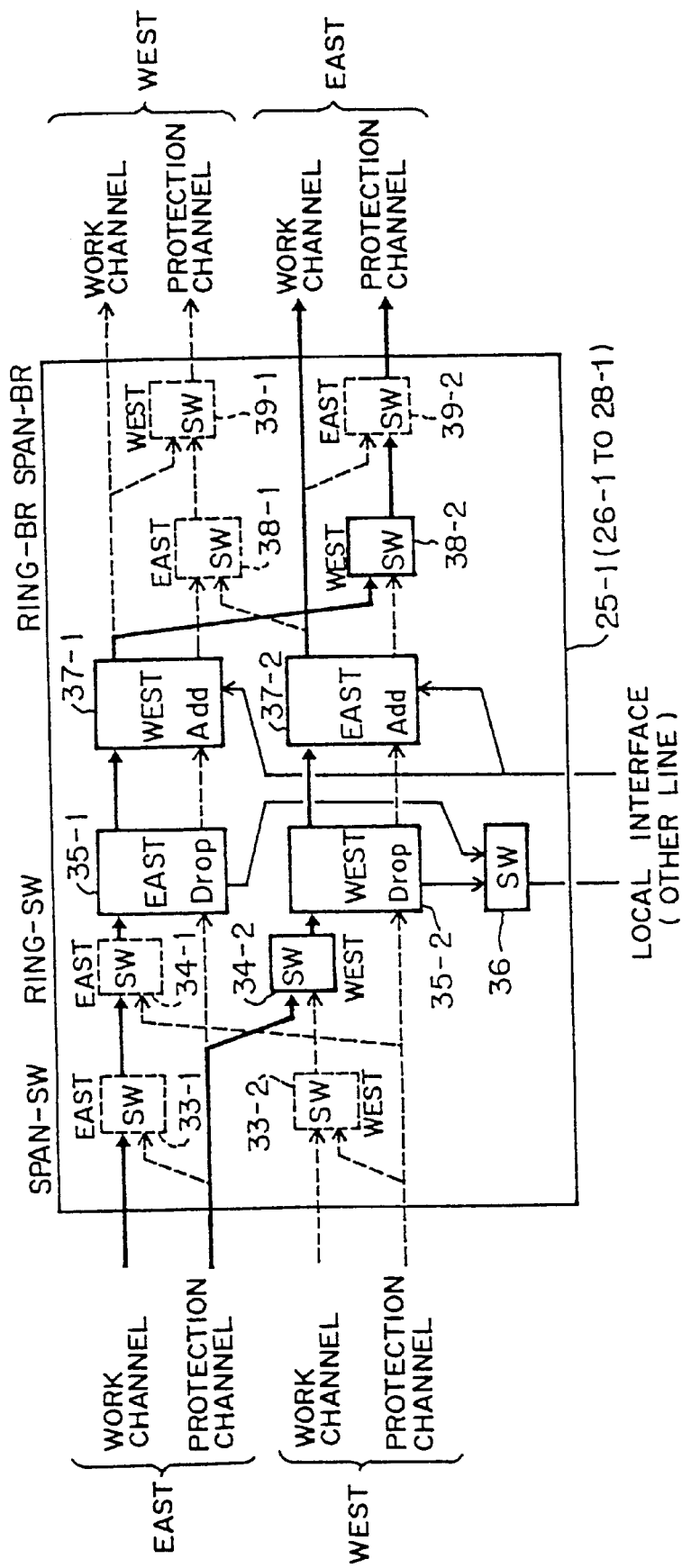
Figure 38A:
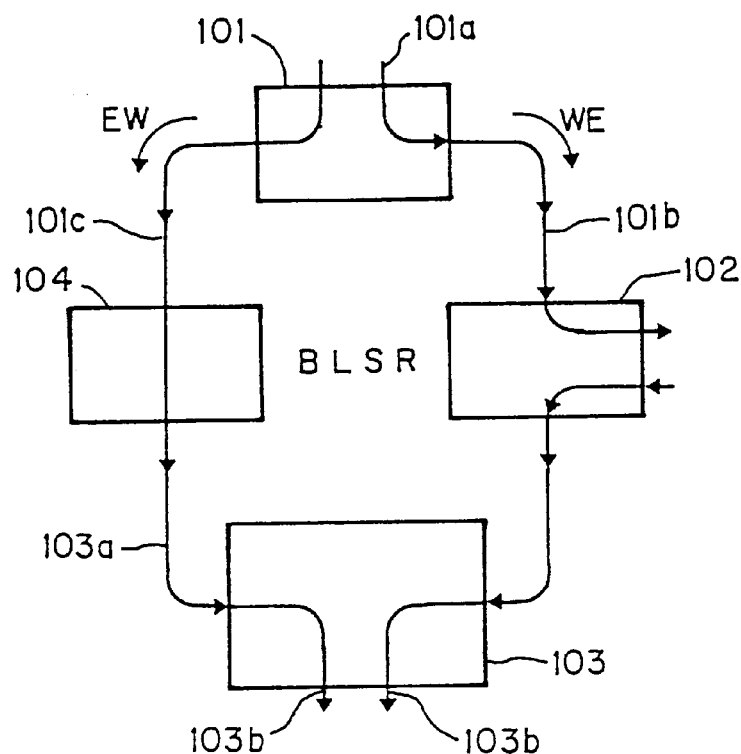
FIGS. 38(a) and 38(b) are block diagrams for explaining operations of a ring network based on a BLSR system.
Figure 38B:
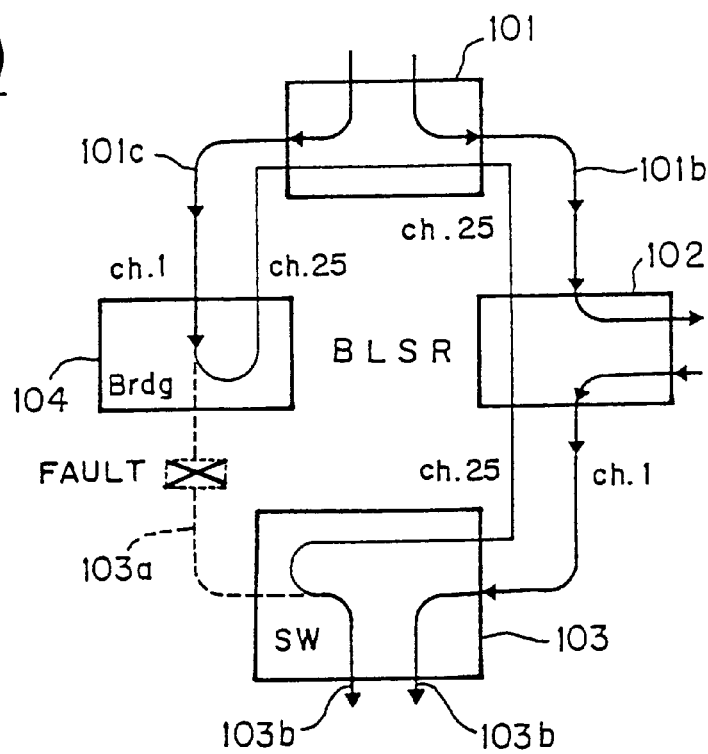

Namely, in the management complex 43 of each of the transmission apparatus 2 to 5, when the states of the individual switches 33-1, 33-2, 34-1, 34-2, 38-1, 38-2, 39-1, and 39-2 in the branching and inserting circuit sections 25-1 to 28-1 (or branching and inserting circuit sections 25-2 to 28-2) are controlled to set as shown in FIGS. 10 to 12, transmission signals can be transmitted in a BLSR system such as that shown in FIG. 38(a) or 38(b).

Namely, in the normal state (faultless time) of lines (optical fibers 6-1 and 6-2) or in the case where the transmission apparatus 2 to 5 function as nodes in a full passthrough state, as the above-mentioned switches 33-1, 33-2, 34-1, 34-2, 38-1, 38-2, 39-1, 39-2 are set in the management complex 43, signals of the channels assigned to the working branching and inserting circuit sections 25-1 to 28-1 are transmitted as they are through the branching sections 35-1 and 35-2 and inserting sections 37-1 and 37-2 as shown in FIG. 10.

For example, in the branching and inserting circuit section 25-1 of the transmission apparatus 4, according to the setting effected by the management complex 43, of the transmission signals EW transmitted from the transmission apparatus 5 through the optical fiber 6-2, the signals of the work channels "1" to "24" and protection signals "97" to "120" (see FIG. 4) can be relayed and transmitted to the transmission apparatus 3 via the optical fiber 6-2 as transmission signals EW after necessary signals are branched and inserted in the branching section 35-1 and inserting section 37-1.

Similarly, in the branching and inserting circuit section 25-1 of the transmission apparatus 4, of the transmission signals WE transmitted from the transmission apparatus 3 through the optical fiber 6-1, the signals of the work channels "1" to "24" and protection signals "97" to "120" (see FIG. 4) can be relayed and transmitted to the transmission apparatus 5 via the optical fiber 6-1 as transmission signals WE after necessary signals are branched and inserted in the branching section 35-2 and inserting section 37-2.

Figure 39:
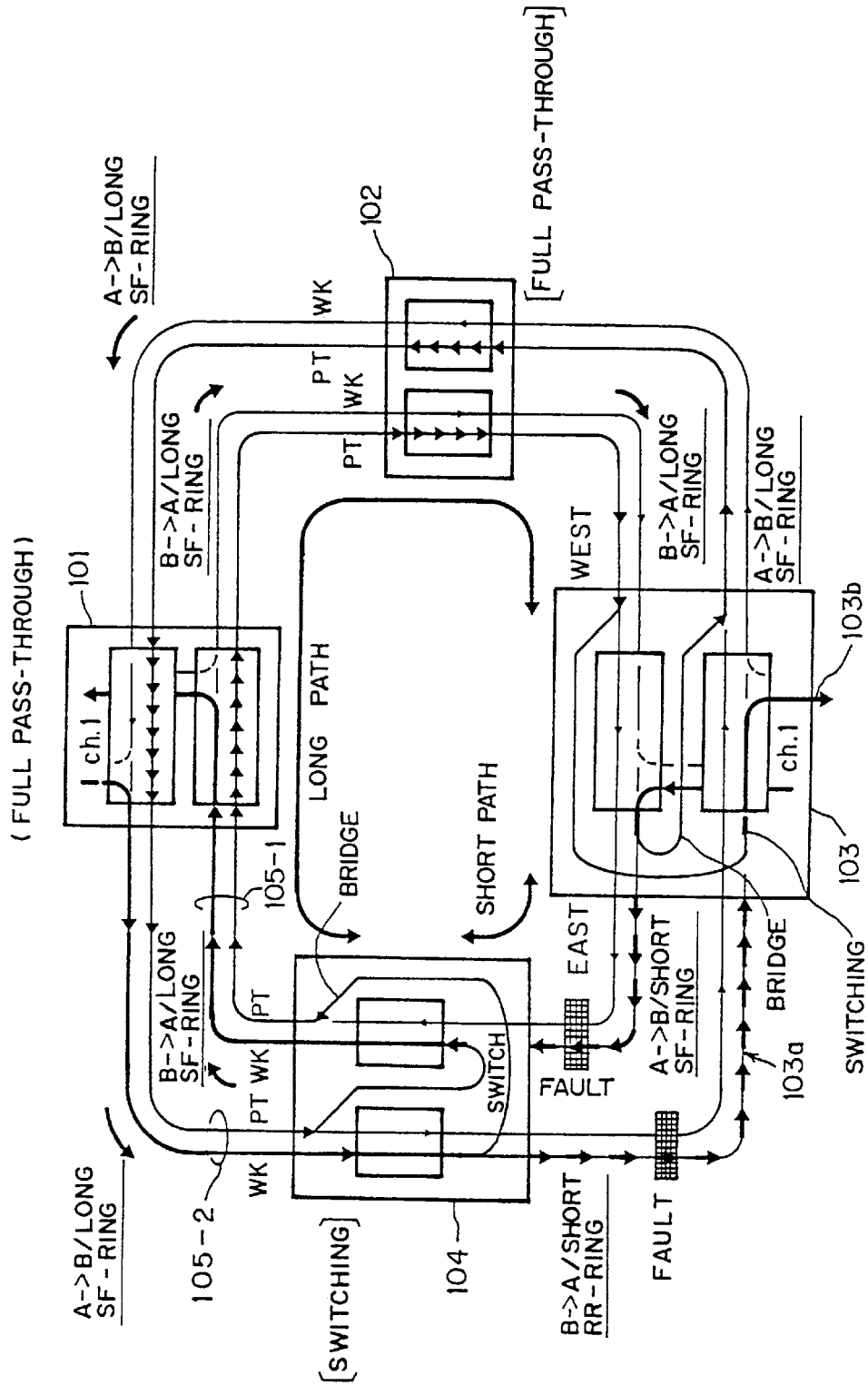
FIG. 39 is a block diagram for explaining an operation of the ring network based on the BLSR system when a fault occurs.
Figure 40:
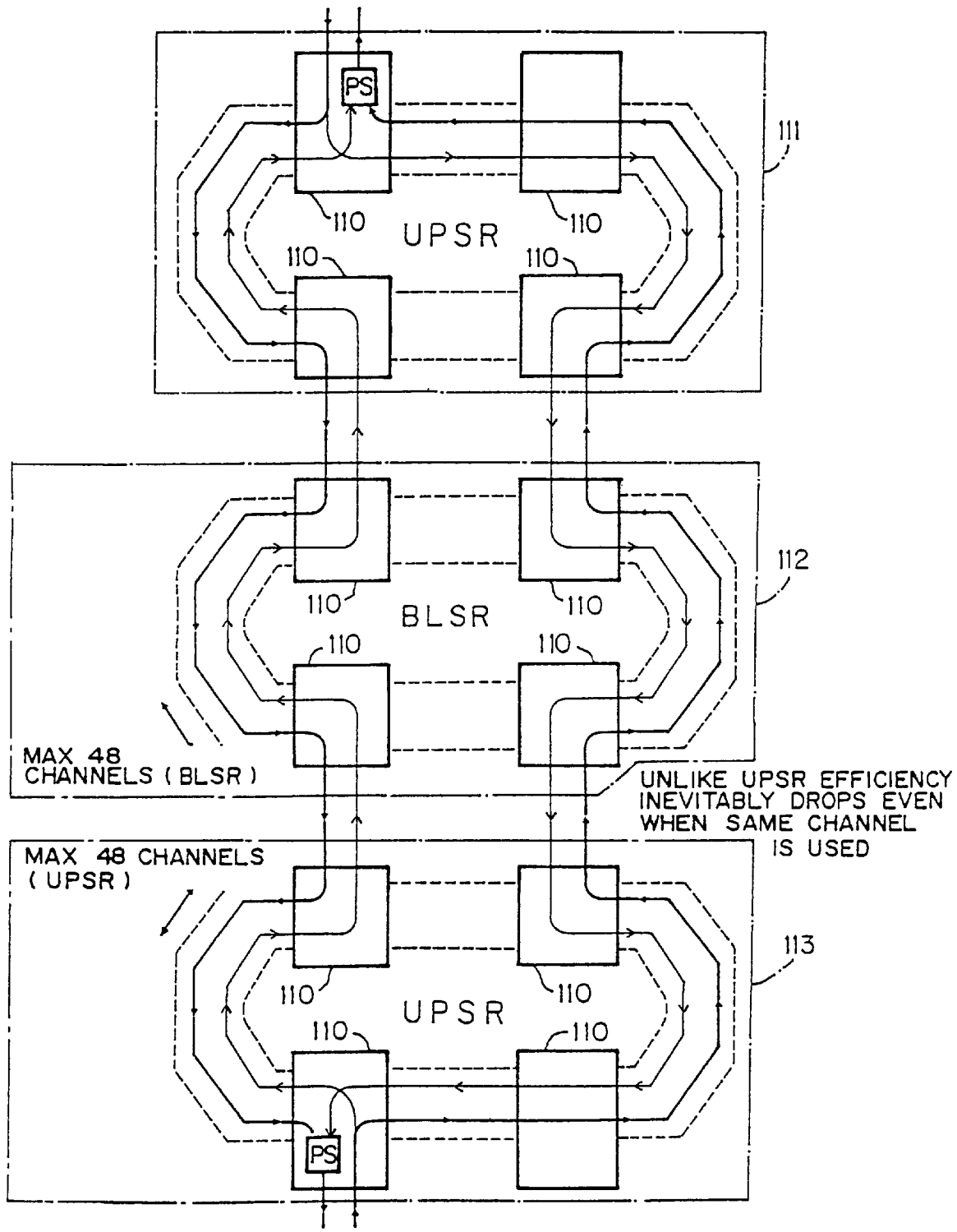
FIG. 40 is a block diagram showing a virtual ring constructed when ring networks having different transmission systems are connected together.

On the other hand, in the case where a fault occurs at the line 8 between the transmission apparatus 4 and 5, for example, the management complex 43 in the transmission apparatus 4 changes the settings of the above-mentioned switches 33-1, 33-2, 34-1, 34-2, 38-1, 38-2, 39-1, and 39-2, thereby switching the route of transmission signals as in the case of the transmission apparatus 103 shown in FIG. 39.

Specifically, as shown in FIG. 11, the ring-switching switches 34-1 in the branching and inserting circuit section 25-1 of the transmission apparatus 4 is changed over and set such that, without selecting the signals of work channels "1" to "24" in the transmission signals EW, the signals inputted through the protection channels "97" to "120" in the transmission signals WE as a long path are selected.

Consequently, the transmission signals to be transmitted from the transmission apparatus 5 to the transmission apparatus 4 are inputted from the transmission apparatus 3 through a long path, and the branching and inserting processing of necessary signals can be effected in the branching section 35-1 and inserting section 37-1.

Further, the ring-bridging switch 38-1 is changed over and set such that not the protection channels "97" to "120" in the transmission signals EW from the inserting section 37-1 but the work channels "1" to "24" in the transmission signals WE from the inserting section 37-2 are selected. As a result, the transmission signals to be transmitted to the transmission apparatus 5 can be bridge-processed so as to be transmitted through a long path.

Similarly, in the case where a fault occurs at the line 7 between the transmission apparatus 3 and 4, for example, the management complex 43 in the transmission apparatus 4 changes the settings of the above-mentioned switches 33-1, 33-2, 34-1, 34-2,38-1, 38-2, 39-1, and 39-2, thereby generating the switching processing and bridging processing in a basically similar manner as that in the above-mentioned case.

Specifically, as shown in FIG. 12, in the branching and inserting circuit section 25-1 of the transmission apparatus 4, the ring-switching switches 34-2 is changed over and set such that, without selecting the signals of work channels "1" to "24" in the transmission signals WE, the signals inputted through the protection channels "97" to "120" in the transmission signals EW as a long path are selected.

Consequently, the transmission signals to be transmitted from the transmission apparatus 3 to the transmission apparatus 4 are inputted from the transmission apparatus 5 through a long path, and the branching and inserting processing of necessary signals can be effected in the branching section 35-2 and inserting section 37-2.

Further, the ring-bridging switch 38-2 is changed over and set such that not the protection channels "97" to "120" in the transmission signals EW from the inserting section 37-2 but the work channels "1" to "24" in the transmission signals WE from the inserting section 37-1 are selected. As a result, the transmission signals to be transmitted to the transmission apparatus 5 can be bridge-processed so as to be transmitted through a long path.

Figure 13:
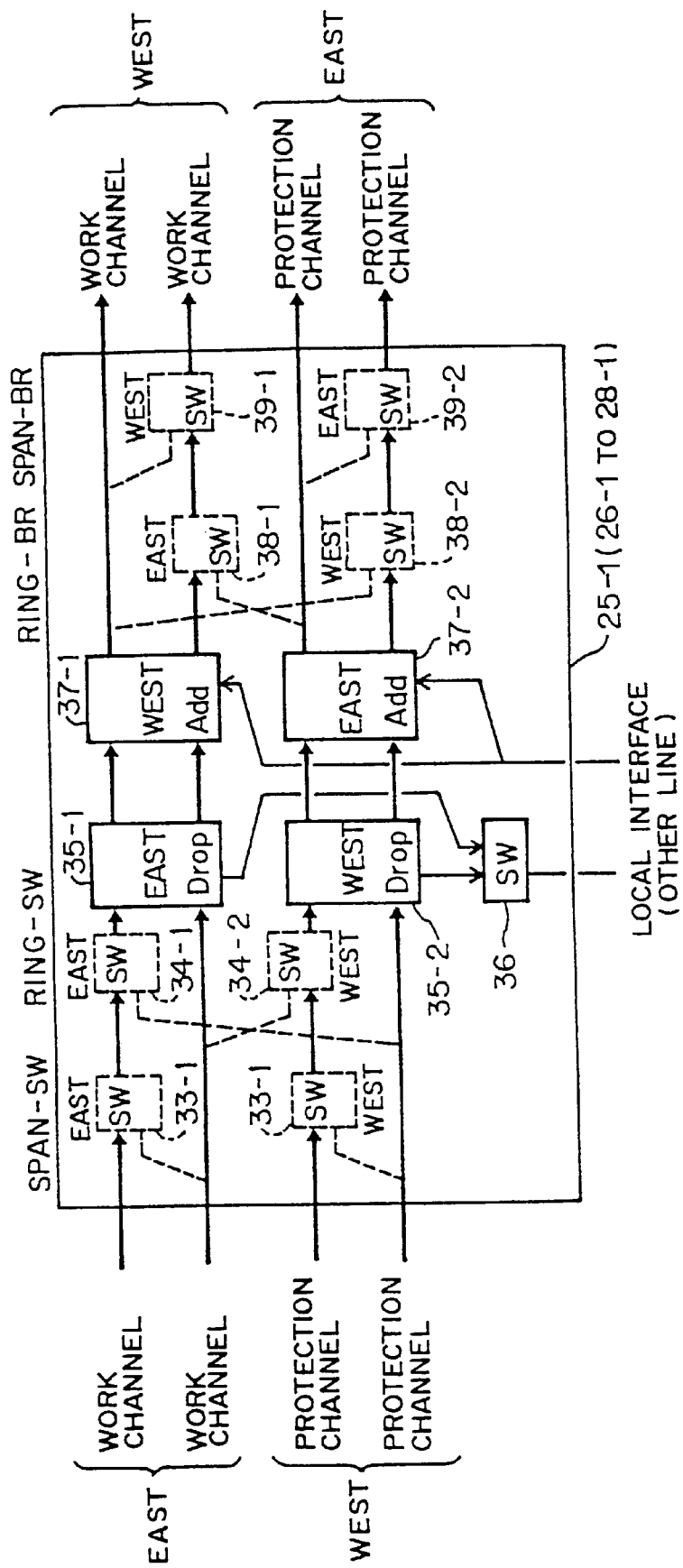
Figure 35A:
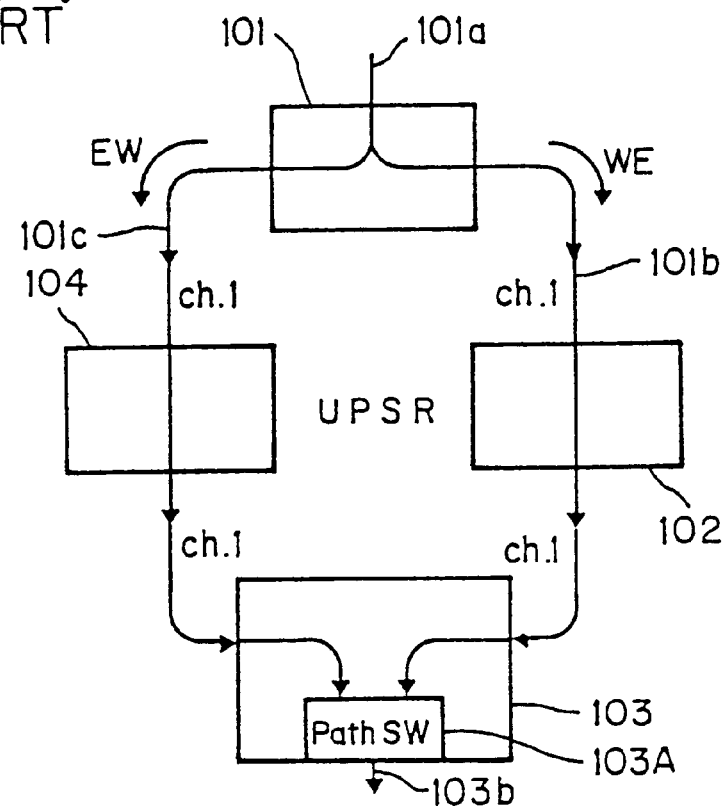
FIGS. 35(a) and 35(b) are block diagrams for explaining operations of the ring network based on the UPSR system.
Figure 35B:
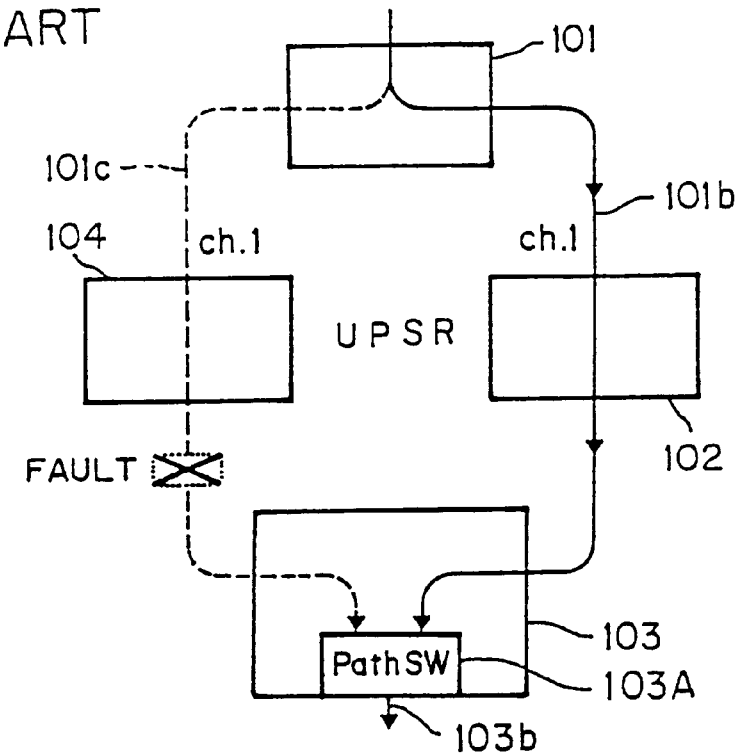
Figure 36:
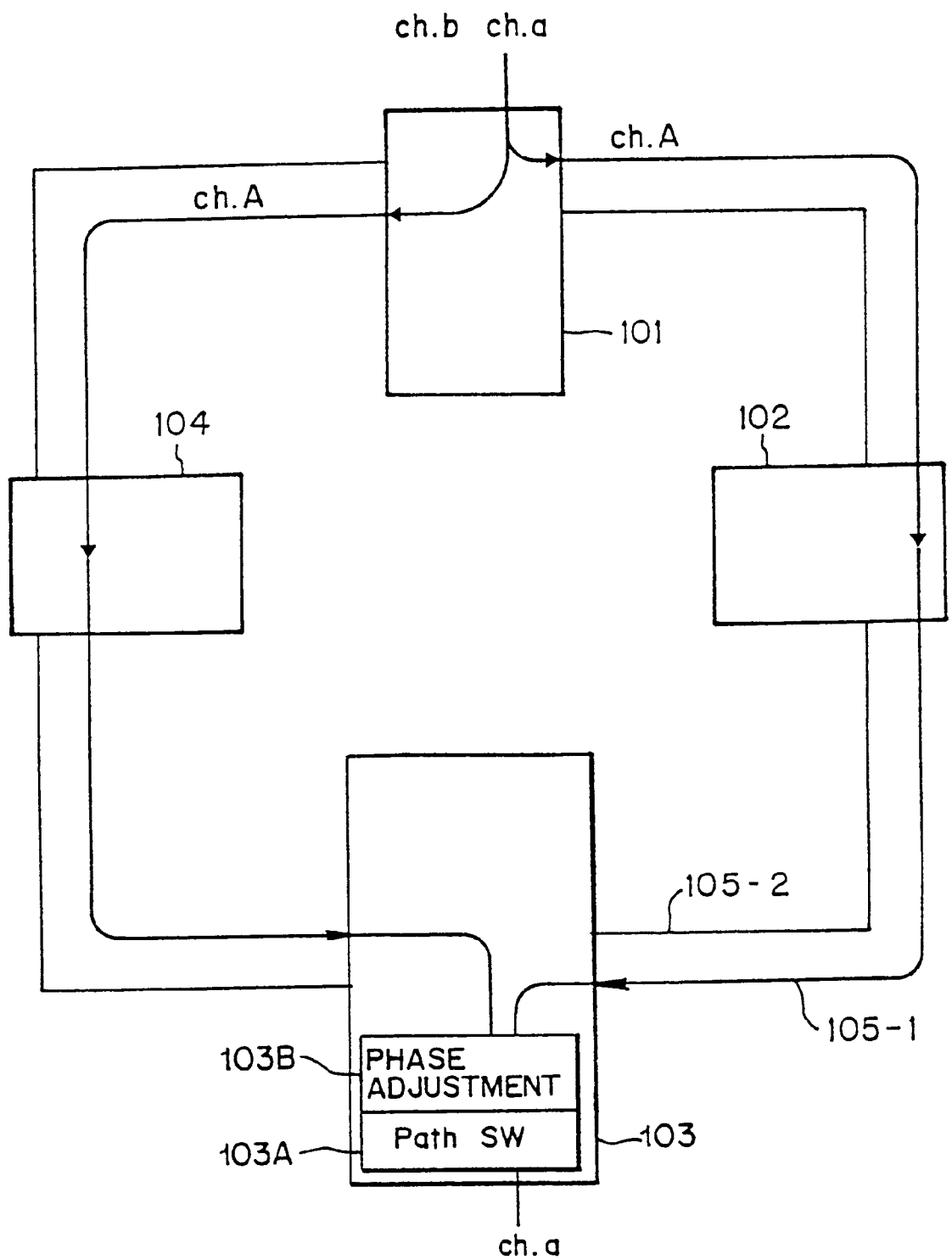
FIG. 36 is a block diagram showing a ring network based on the UPSR system constructed by means of a transmission apparatus equipped with a phase adjusting section.
Figure 37:
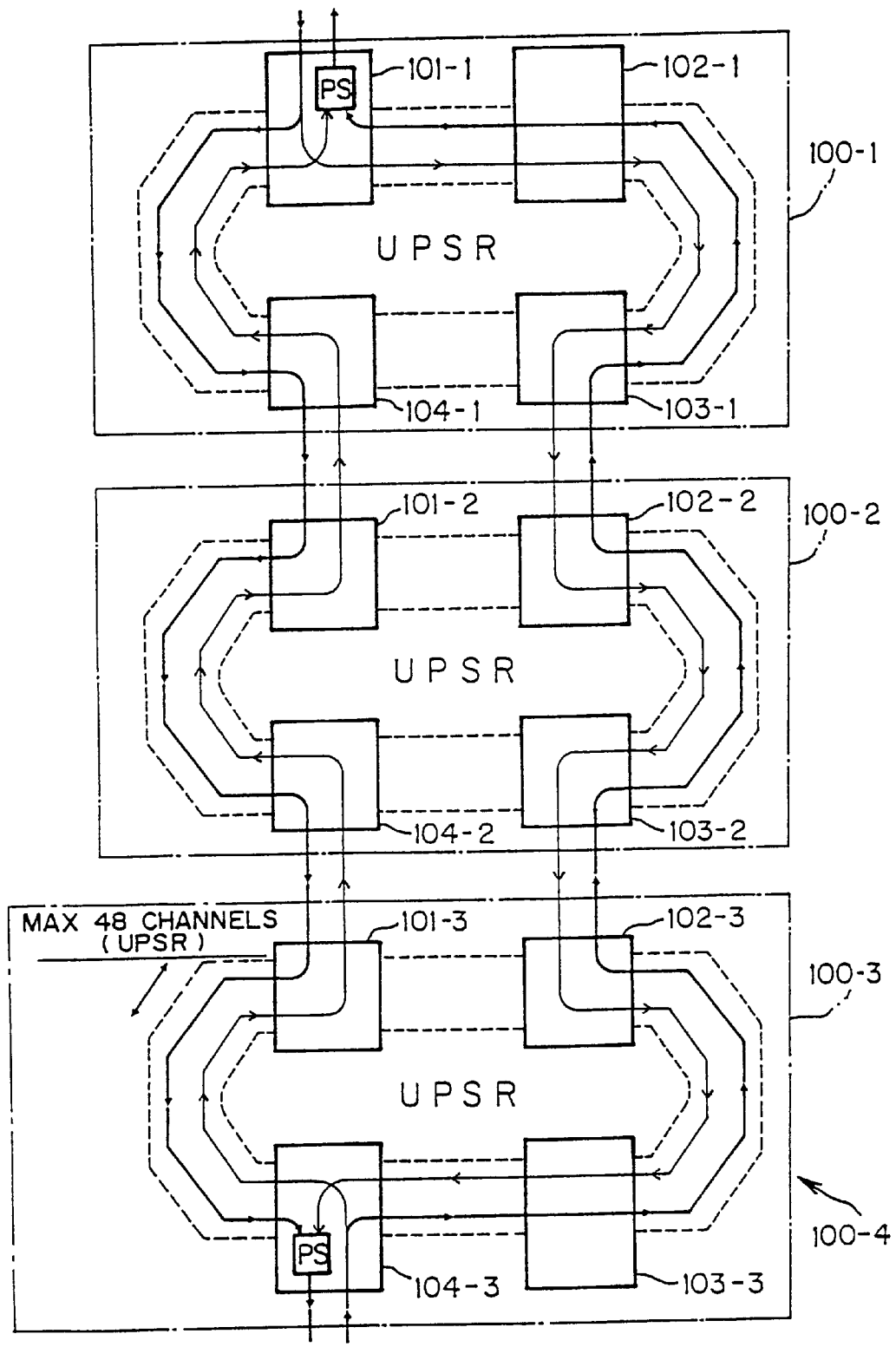
FIG. 37 is a block diagram showing a virtual ring based on the UPSR system.

Meanwhile, in the management complex 43 of each of the transmission apparatus 2 to 5, when the states of the individual switches 33-1, 33-2, 34-1, 34-2, 38-1, 38-2, 39-1, and 39-2 in the branching and inserting circuit sections 25-1 to 28-1 (or branching and inserting circuit sections 25-2 to 28-2) are controlled to set as shown in FIG. 13, transmission signals can be transmitted by a UPSR system such as that shown in FIG. 35(a) or 35(b).

Namely, in the case where the transmission apparatus 2 to 5 function as nodes in a full passthrough state, as the above-mentioned switches 33-1, 33-2, 34-1, 34-2, 36, 38-1, 38-2, 39-1, 39-2 are set in the management complex 43, signals of the channels assigned to the working branching and inserting circuit sections 25-1 to 28-1 are transmitted as they are through the branching sections 35-1 and 35-2 and inserting sections 37-1 and 37-2 as shown in FIG. 10.

On the other hand, for example, in the case where the transmission apparatus 4 functions as a node for transmitting transmission signals from another line 4a as a local interface to the transmission apparatus 1, the signals can be transmitted to the lines 7 and 8 through the same channel according to the settings of the inserting sections 37-1 and 37-2.

Also, in the case where the transmission apparatus 4 receives the signals of the same channel inputted through both lines 7 and 8 from the transmission apparatus 1 and functions as a node for branching the signals into another line 4a as a local interface, any higher-quality transmission signals can be selectively outputted to another line 4a according to the setting of the switch 36.

Consequently, according to the switch settings of the above-mentioned branching and inserting circuit sections 25-1 to 28-1, with respect to line faults occurring in the ring network 1, the transmission signals of each set mentioned above can be relieved by the line relief system corresponding to UPSR or BLSR.

Thus, in the transmission apparatus in the ring network in accordance with the first embodiment of the present invention, the switch/branching and inserting section 12 can set the transmission route of each of a plurality of demultiplexed sets of transmission signals so that they can be transmitted by one of a plurality of kinds of transmission systems. Consequently, while the same transmission apparatus 2 to 5 are used as constituents of the ring network, they can be set as those operable as UPSR, thereby constituting the UPSR ring network 1, or as those operable as 2F-BLSR, thereby constituting the 2F-BLSR ring network 1. Accordingly, it is advantageous in that the degree of freedom in design for constructing a ring network can be improved dramatically.

Figure 14:
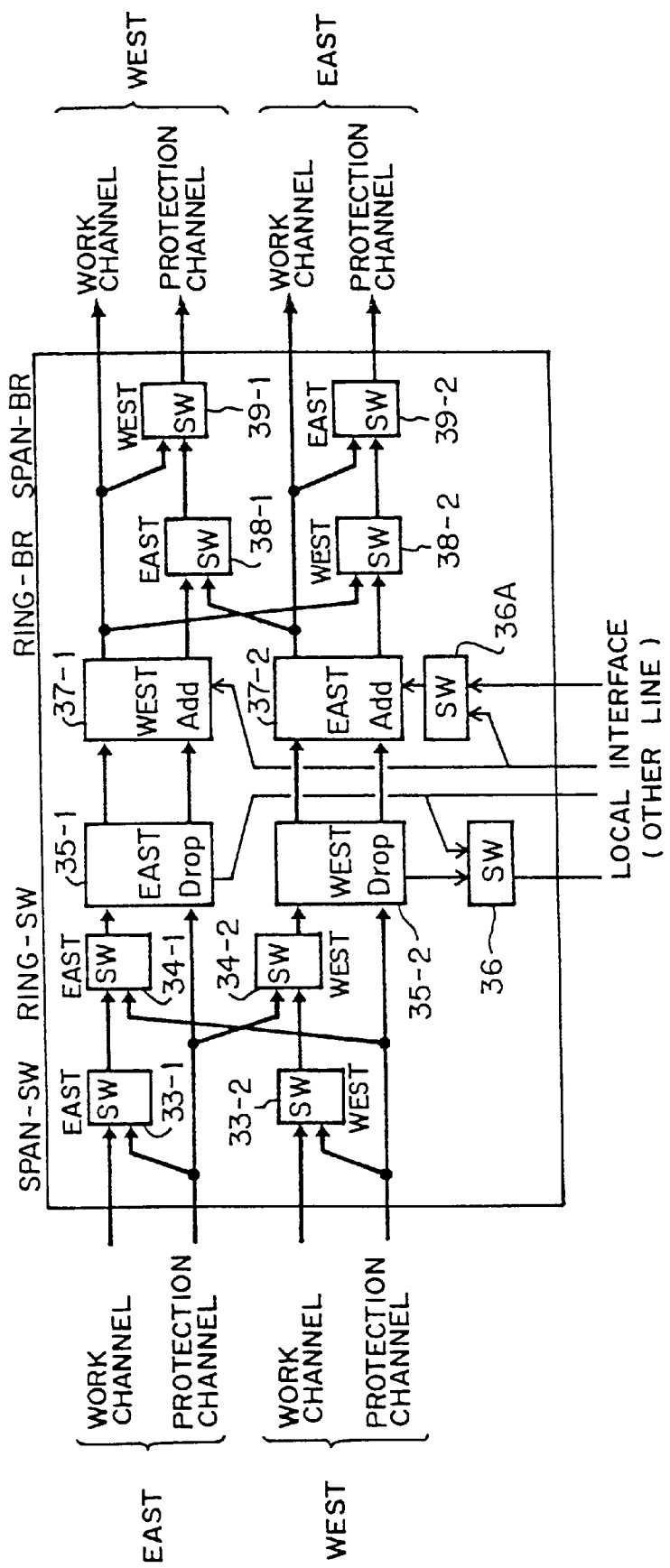
FIG. 14 is a block diagram showing the branching and inserting circuit section of the transmission apparatus in accordance with a modified example of the first embodiment.

Though each of the transmission apparatus 2 to 5 in the ring network 1 in accordance with the first embodiment employs those having a configuration shown in FIG. 7 as the branching and inserting circuit sections 25-1 to 28-1 (or branching and inserting circuit sections 25-2 to 28-2); for example, as shown in FIG. 14, a switch 36A may be provided between a line other than those constituting the ring network 1 as a local interface and the inserting sections 37-1 and 37-2, so that the branching and inserting operations are effected for all the protection channels as well as all the work channels when the ring network 1 is constructed as BLSR.

Also, though the plurality of branching and inserting circuit sections 25-1 to 28-1 realize a function as the switch/branching and inserting section 12 in the transmission apparatus 2-5 in the ring network 1 in accordance with the first embodiment; without being restricted thereto, a single circuit unit may also realize the function as the switch/branching and inserting section 12 such as that mentioned above.

(b) Explanation of Second Embodiment

Figure 15:
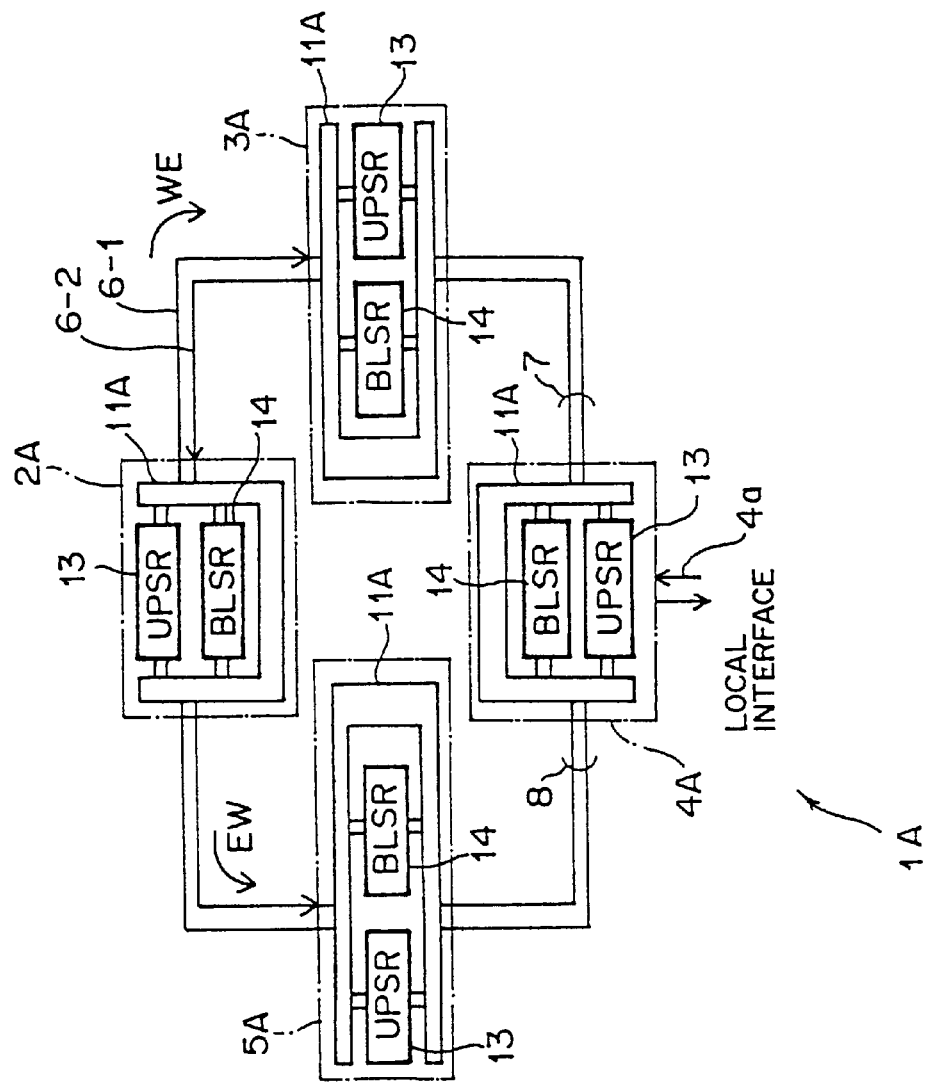
FIG. 15 is a block diagram showing a ring network in a second embodiment of the present invention.

FIG. 15 is a block diagram showing a ring network in a second embodiment of the present invention. In a ring network 1A shown in FIG. 15, as with the above-mentioned first embodiment, four transmission apparatus 2A to 5A each accommodating a line therein are connected together via two optical fibers 6-1 and 6-2, whereby a plurality of channels of signals can be transmitted between the transmission apparatus 2A to 5A as being multiplexed. For example, each of the transmission apparatus 2A to 5A accommodates 192 channels of lines therein.

Each of the transmission apparatus 2A to 5A shown in FIG. 15 differs from those in the first embodiment (see numerals 2 to 5) in that the two shelf structures 10 shown in FIG. 2 are connected to each other, whereby transmission signals can be transmitted while UPSR or BLSR is selected per channel as the transmission system.

Namely, each of the transmission apparatus 2A to 5A comprises not only a time-division multiplexing and demultiplexing section 11A for multiplexing and demultiplexing transmission signals, but also a UPSR branching and inserting section 13 and a BLSR branching and inserting section 14.

Figure 17:
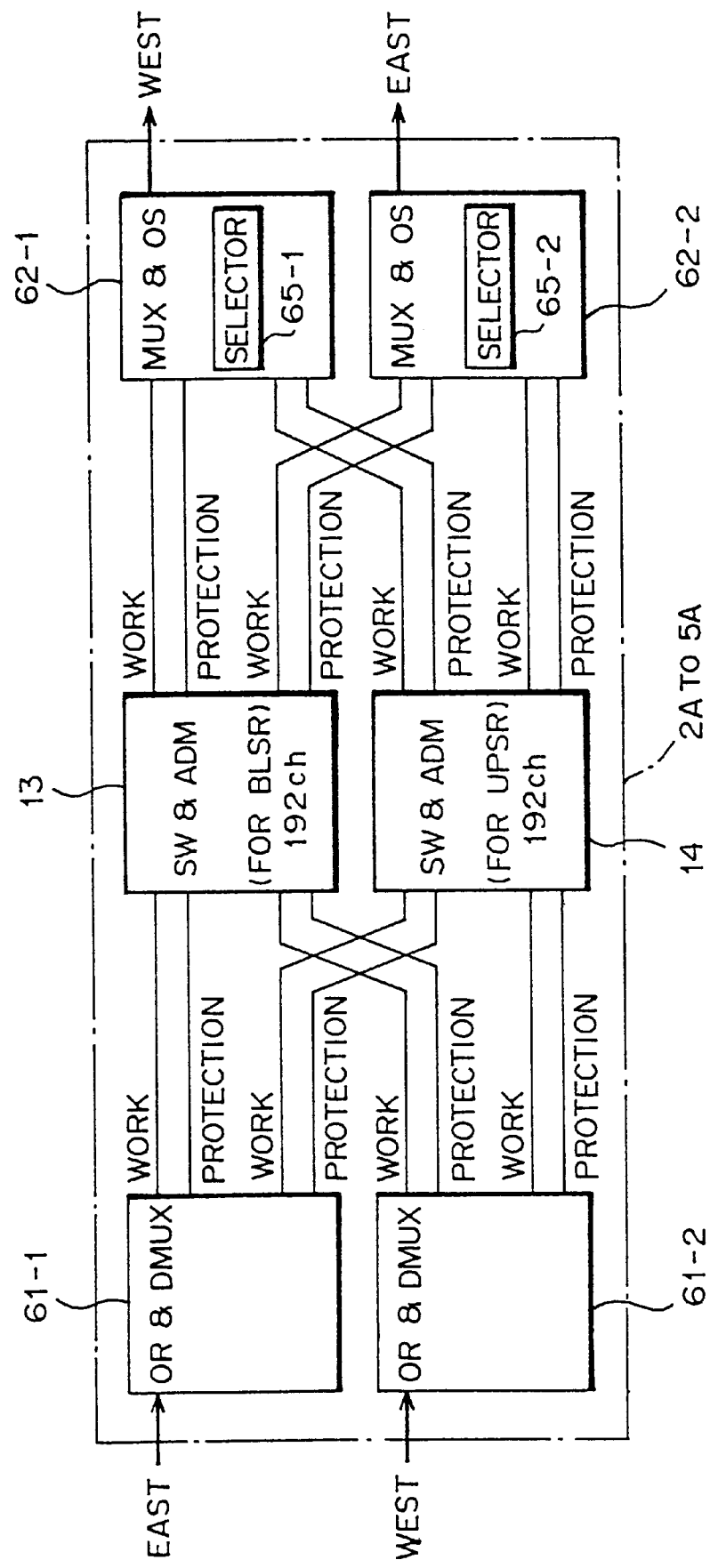
FIG. 17 is a block diagram showing a configuration of a major part of a transport complex in the transmission apparatus in accordance with the second embodiment.

For example, the time-division multiplexing and demultiplexing section 11A of the transmission apparatus 4A demultiplexes, for each channel signal in a time-division manner, multiplexed transmission signals from a line (first line) 7 between this transmission apparatus 4A and the transmission apparatus 3A constituting the ring network 1A and a line (second line) 8 between the transmission apparatus 4A and the transmission apparatus 5A; and multiplexes, for each channel signal in a time-division manner, transmission signals to be sent to the line 7 or line 8. More specifically, it is configured as shown in FIG. 17 explained later.

Further, the UPSR branching and inserting section 13 of the transmission apparatus 4A sets a transmission route for signals of a channel to be multiplex-transmitted by UPSR, and branches each transmission signal demultiplexed by the time-division multiplexing and demultiplexing section 11A into another line (e.g. local interface) accommodated in its own transmission apparatus, while inserting signals from another line into transmission signals to be transmitted through the lines connected to the ring network 1A.

The BLSR branching and inserting section 14 sets a transmission route for signals of a channel to be multiplex-transmitted by BLSR, and branches a part of each transmission signal demultiplexed by the time-division multiplexing and demultiplexing section 11A into another line accommodated in its own transmission apparatus, while inserting signals from another line into signals connected to the ring network 1A.

As a result, each of the transmission apparatus 2A to 5A constituting the ring network 1A can functionally transmit 192 channels of multiplexed transmission signals by any transmission system of BLSR or UPSR.

Figure 16:
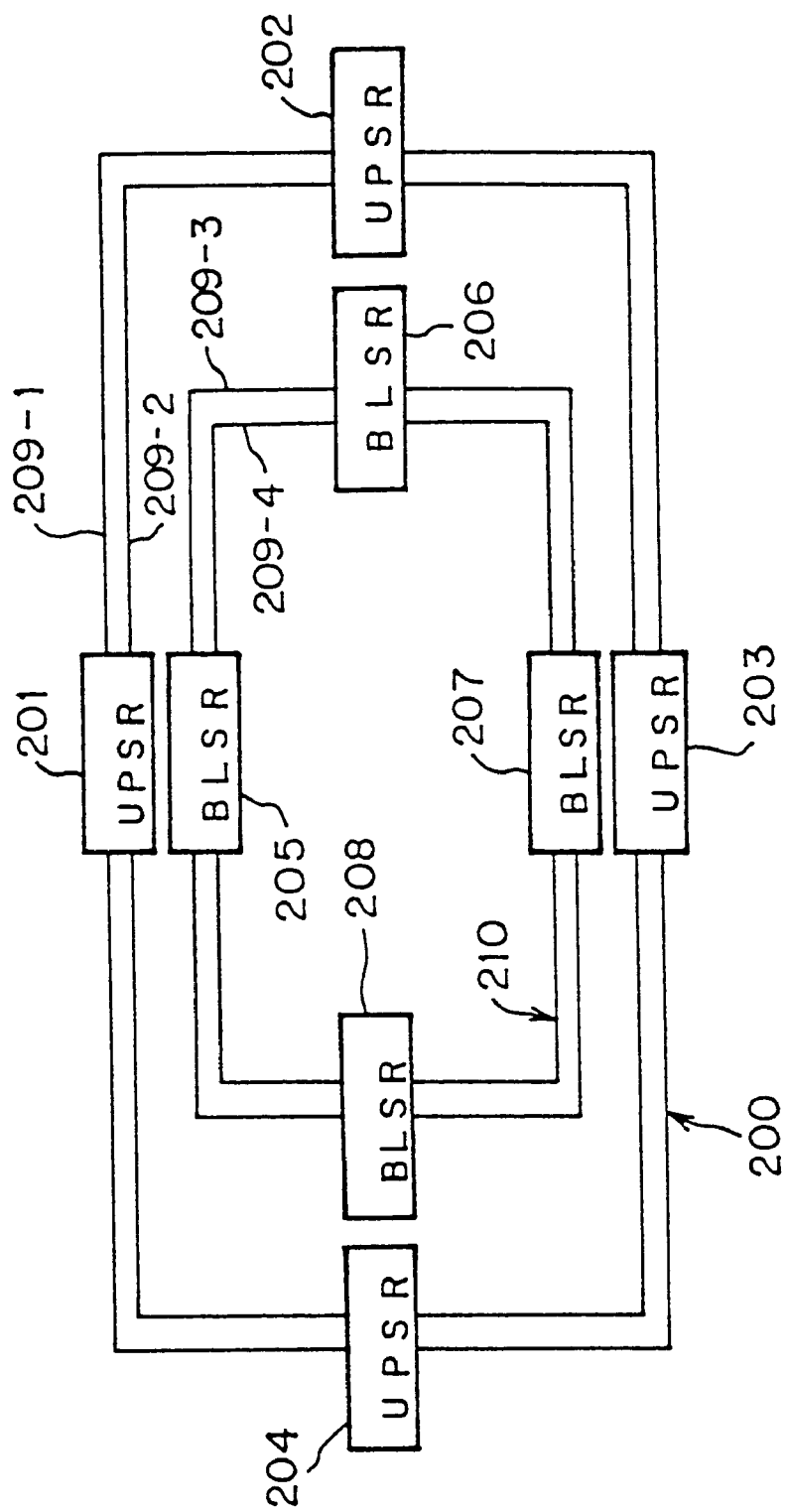
FIG. 16 is a view for explaining a function of the ring network in accordance with the second embodiment.

In other words, the ring network 1A shown in FIG. 15 has not only the function as a ring network 200 employing a UPSR transmission system but also as a ring network 210 employing a BLSR transmission system as shown in FIG. 16.

Here, in the ring network 200, four transmission apparatus 201 to 204 transmitting multiplexed transmission signals by UPSR are connected to each other like a ring via two optical fibers 209-1 and 209-2; whereas, in the ring network 210, four transmission apparatus 205 to 208 which can transmit multiplexed transmission signals by BLSR are connected to each other like a ring via two optical fibers 209-3 and 209-4.

Though each of the transmission apparatus 2A to 5A constituting the ring network 1A is equipped with functional parts as transport complex, synchronization complex, and management complex as with those in the first embodiment, the configuration of major part of the transport complex differs from that in the first embodiment in particular.

FIG. 17 is a block diagram showing the configuration of major part of the transport complex in the transmission apparatus 2A to 5A in accordance with the second embodiment. As shown in FIG. 17, each of the transmission apparatus 2A to 5A comprises, as functions of a system for processing main signals transmitted over the ring network 1A, receiving and demultiplexing sections (OR & DMUX) 61-1 and 61-2, a UPSR branching and inserting section (SW & ADM) 13, a BLSR branching and inserting section (SW & ADM) 14, and multiplexing and transmitting sections (MUX & OS) 62-1 and 62-2. In the following, the functions of the main signal processing system in the transmission apparatus 2A to 5A will be explained as being focused on the transmission apparatus 4A.

The receiving and demultiplexing section 61-1 receives optical signals as transmission signals WE from the line 7 via the optical fiber 6-1, converts thus received signals into electric signals, demultiplexes the resulting multiplexed transmission signals in a time-division manner, and outputs each of thus demultiplexed transmission signals to both of the UPSR branching and inserting section 13 and BLSR branching and inserting section 14.

On the other hand, the receiving and demultiplexing section 61-2 receives optical signals as transmission signals EW from the line 8 via the optical fiber 6-2, converts thus received signals into electric signals, demultiplexes the resulting multiplexed transmission signals in a time-division manner, and outputs each of thus demultiplexed transmission signals to both of the UPSR branching and inserting section 13 and BLSR branching and inserting section 14.

Namely, the above-mentioned receiving and demultiplexing sections 61-1 and 61-2 function as a demultiplexing section which demultiplexes the multiplexed transmission signals from the lines 7 and 8 constituting the ring network 1A and outputs a plurality of sets of transmission signals constituted by a plurality of channels of signals.

The UPSR branching and inserting section 13 comprises eight branching and inserting circuit sections 63-1 to 63-8 having configurations similar to those shown in FIG. 2 (see numerals 25-1 to 28-1 and 25-2 to 28-2) in detail, while being capable of causing the branching and inserting circuit sections 63-1 to 63-4 to operate as work systems, and the branching and inserting circuit sections 63-5 to 63-8 to operate as protection systems.

Also, as with the above-mentioned branching and inserting circuit sections 25-1 to 28-1 (25-2 to 28-2), 48 channels of signal sets are assigned to each of the branching and inserting circuit sections 63-1 to 63-4 (63-5 to 63-8), whereby the transmission route for transmission by UPSR is set by the non-depicted management complex.

Namely, signal sets of the channels "1" to "124" and "97" to "120" demultiplexed by both of the receiving and demultiplexing sections 61-1 and 61-2 are assigned to the branching and inserting circuit section 63-1, whereas signal sets of the channels "25" to "48" and "121" to "144" are assigned to the branching and inserting circuit section 63-2.

Similarly, signal sets of the channels "49" to "72" and "145" to "168" are assigned to the branching and inserting circuit section 63-3, whereas signal sets of the channels "73" to "96" and "169" to "192" are assigned to the branching and inserting circuit section 63-4.

On the other hand, the BLSR branching and inserting section 14 comprises eight branching and inserting circuit sections 64-1 to 64-8 having configurations similar to those shown in FIG. 2 (see numerals 25-1 to 28-1 and 25-2 to 28-2) in detail, while being capable of causing the branching and inserting circuit sections 64-1 to 64-4 to operate as work systems, and the branching and inserting circuit sections 64-5 to 64-8 to operate as protection systems.

Also, as with the above-mentioned branching and inserting circuit sections 25-1 to 28-1 (25-2 to 28-2), 48 channels of signal sets are assigned to each of the branching and inserting circuit sections 64-1 to 64-4 (64-5 to 64-8), whereby the transmission route for transmission by BLSR is set by the non-depicted management complex.

Namely, into the branching and inserting circuit section 64-1, signals of the channels "1" to "24" demultiplexed by both of the receiving and demultiplexing sections 61-1 and 61-2 are inputted as signals of work channels, whereas signals of the channels "97" to "120" are inputted as signals of protection channels. Similarly, in the branching and inserting circuit section 64-2, the channels "25" to "48" are set as work channels, whereas the channels "121" to "144" are set as protection channels.

Likewise, the channels "49" to "72" and the channels "145" to "168" are respectively set as work channels and protection channels in the branching and inserting circuit section 64-3, while the channels "73" to "96" and the channels "169" to "192" are respectively set as work channels and protection channels in the branching and inserting circuit section 64-4.

Meanwhile, the multiplexing and transmitting sections 62-1 and 62-2 are respectively equipped with selector sections 65-1 and 65-2 for receiving two transmission signals inputted for each channel which are demultiplexed at the receiving and demultiplexing sections 61-1 and 61-2 and are subjected to the signal branching and inserting processing at the UPSR branching and inserting section 13 and BLSR branching and inserting section 14, and selecting, of the two transmission signals per channel, one transmission signal per channel in response to a preset transmission system per channel.

Specifically, the selector section 65-1 of each multiplexing and transmitting section 62-1 receives transmission signals from the line 8 which are demultiplexed at the receiving and demultiplexing sections 61-1 and 61-2 and are subjected to the signal branching and inserting processing at the UPSR branching and inserting section 13 and BLSR branching and inserting section 14, and selectively outputs, according to the transmission system that is preset per channel, one of the signals from the UPSR branching and inserting section 13 and BLSR branching and inserting section 14. It may comprise non-depicted 2×1 selectors whose number corresponds to the number of channels.

Similarly, the selector section 65-2 of each multiplexing and transmitting section 62-2 receives transmission signals from the line 7 which are demultiplexed at the receiving and demultiplexing sections 61-1 and 61-2 and are subjected to the signal branching and inserting processing at the UPSR branching and inserting section 13 and BLSR branching and inserting section 14, and selectively outputs, according to the transmission system that is preset per channel, one of the signals from the UPSR branching and inserting section 13 and BLSR branching and inserting section 14. It may comprise non-depicted 2×1 selectors whose number corresponds to the number of channels.

The above-mentioned transmission system corresponding to each channel is set to one of UPSR and BLSR when the management complex (numeral 43 in FIG. 2) sets and controls the states of the respective selector sections 65-1 and 65-2.

In other words, by means of the multiplexing and transmitting sections 62-1 and 62-2, for example, in 192 channels of signals for each of the lines 7 and 8, one of UPSR and BLSR as the transmission system can be selectively set for at least two channels (e.g., channel "1" and channel "97") constituted by one of channels "1" to "96" and its corresponding one of channels "97" to "192" in signal sets (96 signal sets in this case).

The respective multiplexing and transmitting sections 62-1 and 62-2 multiplex each channel of signals for which one of UPSR and BLSR is selected as a transmission system at their selector sections 65-1 and 65-2 and convert thus selected signals into optical signals, which are then transmitted through the optical fibers 6-1 and 6-2 to the transmitting destination.

Namely, the above-mentioned multiplexing and transmitting sections 62-1 and 62-2 function as the time-division multiplexing and demultiplexing section 11A (see FIG. 15) for multiplexing and demultiplexing transmission signals, and as a multiplexing and transmitting section for multiplexing transmission signals from the UPSR branching and inserting section 13 and the BLSR branching and inserting section 14, and transmitting the signals as multiplexed transmission signals to the line 8 or line 7 that becomes the relaying destination.

Consequently, in the transmission apparatus 4A (similarly in the transmission apparatus 2A, 3A, and 5A), according to the setting of the selector section 65-1 in the multiplexing and transmitting section 62-1 and the selector section 65-2 in the multiplexing and transmitting section 62-2, the transmission signals in the ring network 1A can be transmitted by one of transmission system of BLSR or UPSR for each channel.

Each of the branching and inserting circuit sections 63-1 to 63-4 and 64-1 to 64-4 in the UPSR branching and inserting section 13 and BLSR branching and inserting section 14 branches, of the transmission signals (48 channels of signal sets) inputted therein as being demultiplexed by the receiving and demultiplexing sections 61-1 and 61-2, desired channels of signals into another line 4a and inserting the signals from another line 4a into the transmission signals, thus functioning as a branching and inserting section as well.

Namely, each of the branching and inserting circuit sections 63-1 to 63-4 and 64-1 to 64-4 is configured so as to be able to transmit pre-assigned channels of signals by one of a plurality of kinds (e.g., two kinds of UPSR and BLSR) of transmission systems, and can relieve a line failure occurring in the ring network 1A by a line relief system corresponding to the transmission system by which the above-mentioned channels of signals are transmitted.

As a result of the foregoing configuration, in the transmission apparatus 2A to 5A of the ring network 1A in accordance with the second embodiment of the present invention, while a multiplexed transmission signal in which 192 channels of transmission signals are multiplexed, for example, is transmitted as an optical signal through the optical fiber 6-1, one of UPSR and BLSR can be selectively set as a system for constituting the ring network per transmission signal for each channel constituting this multiplexed transmission signal.

Figure 18:
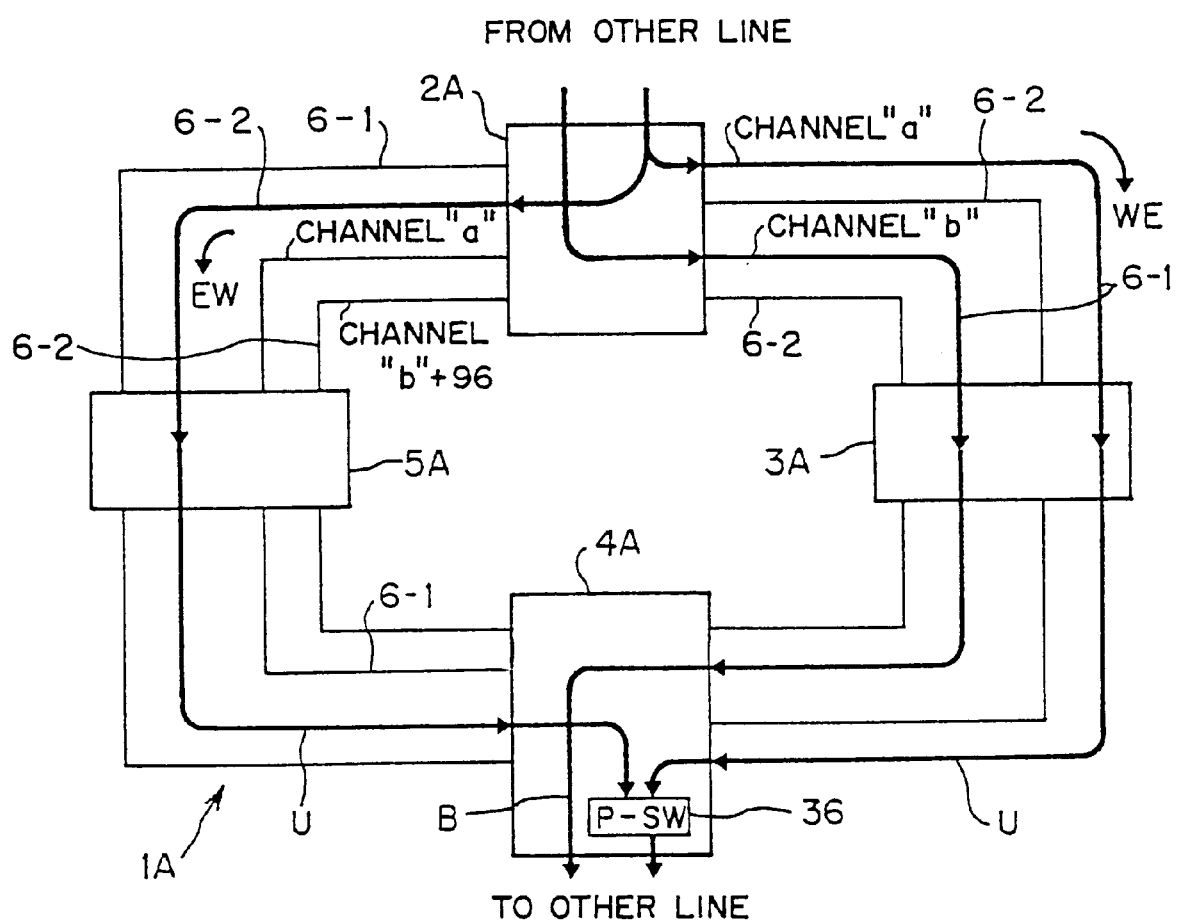
FIGS. 18 and 19 are views for explaining operations of a ring network constructed by means of the transmission apparatus in accordance with the second embodiment.

Specifically, as shown in FIG. 18, in the non-depicted management complex in each of the transmission apparatus 2A to 5A, by setting the states of the selector section 65-1 of the multiplexing and transmitting section 62-1 and the selector section 65-2 of the multiplexing and transmitting section 62-2, of the plurality of channels of transmission signals in the ring network 1A, for example, while channel "a" is transmitted by UPSR (see transmission signal U of channel "a" in FIG. 18), channel "b" can be transmitted by BLSR (see transmission signal B of channel "b" in FIG. 18).

Further, in the case where a fault occurs in one of the line 7 on the transmission apparatus 3A side or the line 8 on the transmission apparatus 5A side with respect to the transmission apparatus 4A, for example, as with the above-mentioned first embodiment, transmission signals can be transmitted by a line relief system corresponding to the transmission system for each channel.

Figure 19:
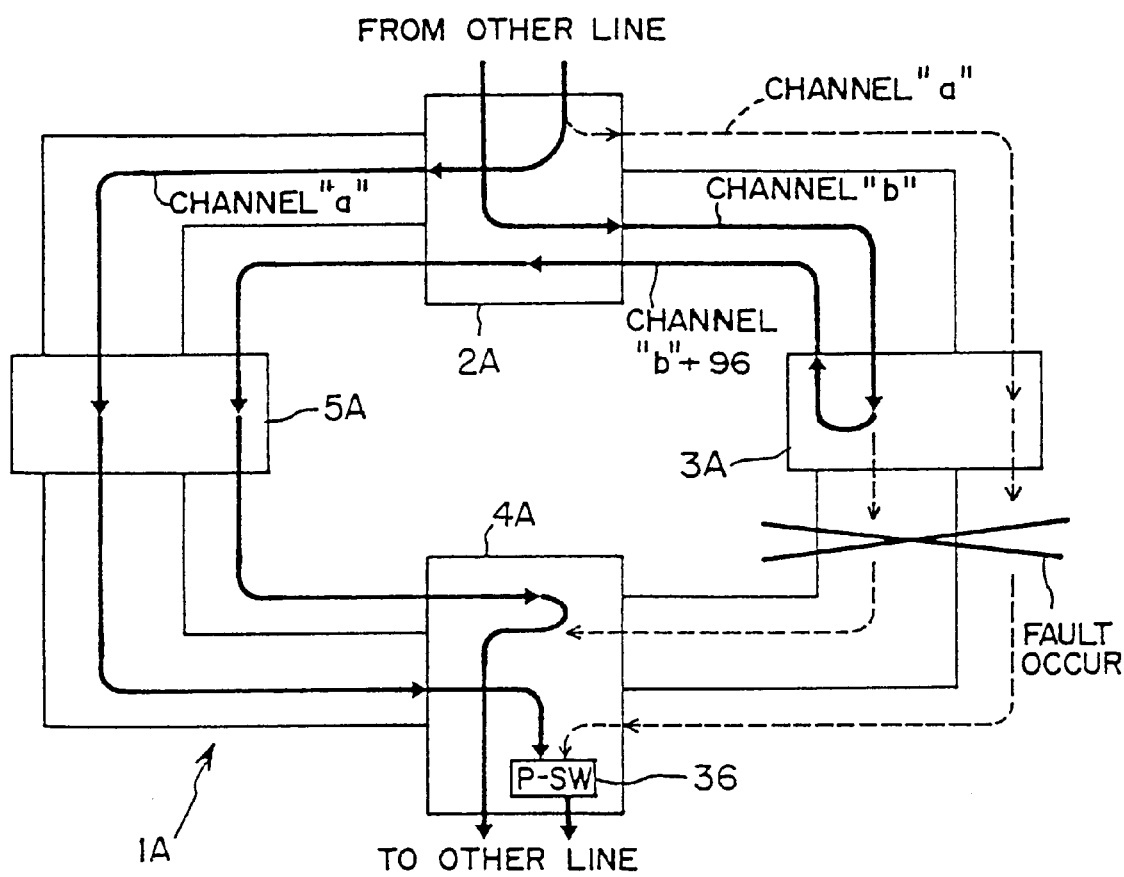

For example, as shown in FIG. 19, in the case where a fault occurs in the line 7 on the transmission apparatus 3A side, the transmission signals of channel "b" normally transmitted to the transmission apparatus 4A by BLSR from the transmission apparatus 2A to the transmission apparatus 3A is turned around and transmitted to a protection channel "b+96" for the channel "b" by the transmission apparatus 3A (bridging processing), thereby being transmitted to the transmission apparatus 4A through a long path (via the transmission apparatus 2A and transmission apparatus 5A).

On the other hand, in this case, of the transmission signal of channel "a" transmitted from the transmission apparatus 2A to the transmission apparatus 4A by UPSR, those transmitted through the transmission apparatus 5A in which no faults have occurred are selected by the path switch 36 of the transmission apparatus 4A so as to be transmitted to the desired line 4a.

Thus, in the transmission apparatus in the ring network in accordance with the second embodiment of the present invention, by the UPSR branching and inserting section 13 and the BLSR branching and inserting section 14, a transmission route of each demultiplexed set of transmission signals can be set such that a demultiplexed plurality of sets of transmission signals are transmitted by one of a plurality of kinds of transmission systems. Consequently, while the same transmission apparatus 2A to 5A are used as constituents of the ring network, they can be set as those operable as UPSR, thereby constituting the UPSR ring network 1A, or as those operable as 2F-BLSR, thereby constituting the 2F-BLSR ring network 1A. Accordingly, it is advantageous in that the degree of freedom in design for constructing a ring network can be improved dramatically.

(b1) Explanation of First Modified Example of Second Embodiment

Though the transmission apparatus in the ring network in accordance with the above-mentioned second embodiment comprises the discrete branching and inserting sections 13 and 14 according to the transmission systems so that a given transmission system can be selected for 192 channels of transmission signals in one direction; without being restricted thereto, two branching and inserting sections provided for the respective transmission systems can be configured so as to effect processing according to the number of channels to be applied.

Figure 20:
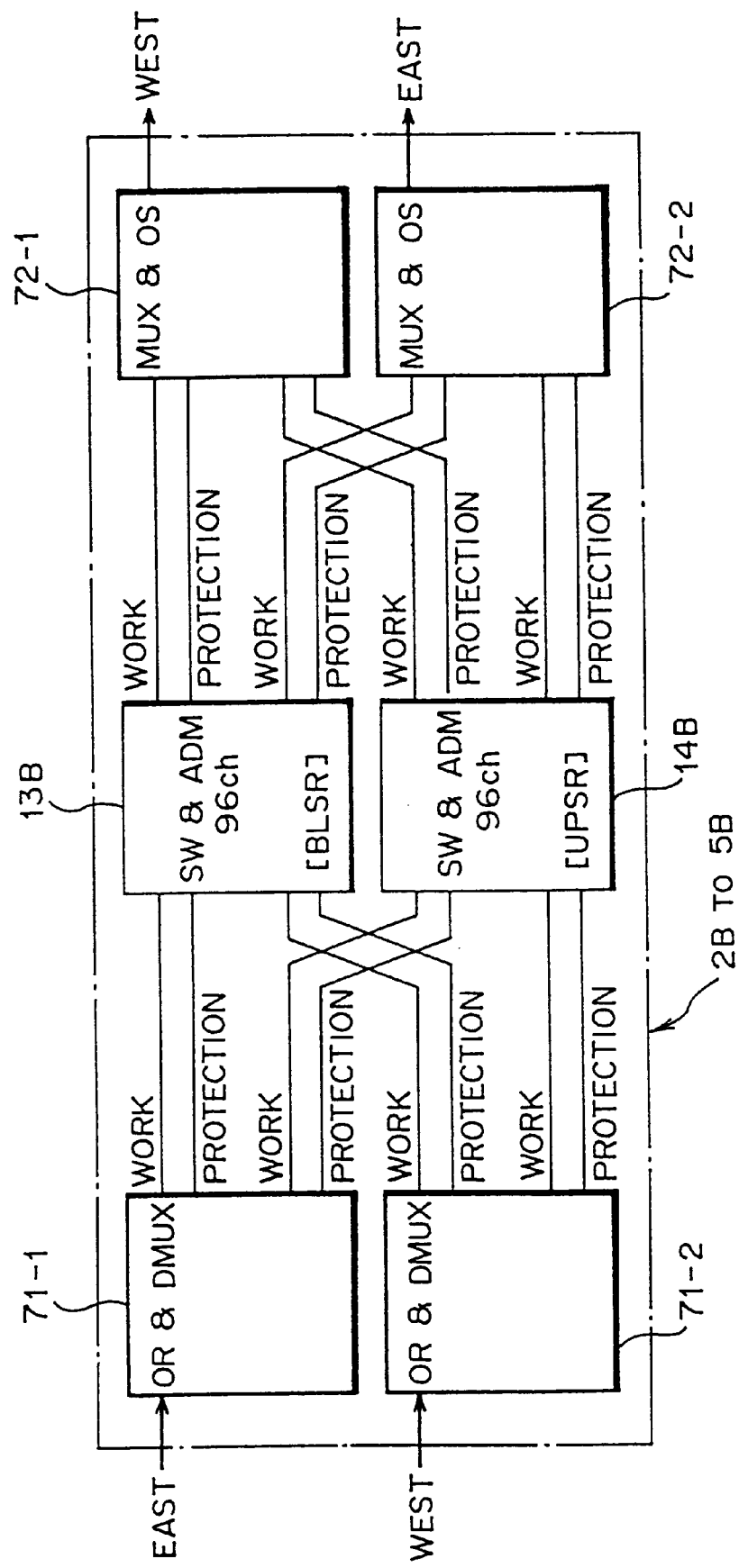
FIG. 20 is a block diagram showing a configuration of a major part of a transport complex in the transmission apparatus in accordance with a first modified example of the second embodiment.

For example, as shown in FIG. 20, of 192 channels which can be multiplex-transmitted per one direction of transmission signals, 96 channels of transmission signals can be assigned by a UPSR branching and inserting section 13B to be multiplex-transmitted by UPSR, whereas the remaining 96 channels of transmission signals can be assigned by a BLSR branching and inserting section 14B to be multiplex-transmitted by BLSR.

In this case, while each of the branching and inserting sections 13B and 14B has a configuration basically similar to that of the branching and inserting circuit sections 25-1 to 28-1 (25-2, 28-2) in the above-mentioned first embodiment, it is constituted by one circuit module for 96 channels of transmission signals by time-division multiplexing processing.

Namely, as the switches (see numerals 33-1, 33-2, 34-1, 34-2, 38-1, 38-2, 39-1, and 39-2) of each of the branching and inserting sections 13B and 14B are set by the non-depicted management complex, the transmission route by UPSR is set at the UPSR branching and inserting section 13B, while the transmission route by BLSR is set at the BLSR branching and inserting section 14B.

Here, in each of the receiving and demultiplexing sections 71-1 and 71-2, of the signals per channel demultiplexed in a time-division manner for the transmission signals WE or EW, those for the channel to which the transmission system to be applied is set as UPSR are outputted to the UPSR branching and inserting section 13B, whereas those for the channel to which the transmission system to be applied is set as BLSR are outputted to the BLSR branching and inserting section 14B.

Though each of the multiplexing and transmitting sections 72-1 and 72-2 multiplexes the transmission signals from each of the branching and inserting sections 13B and 14B, converts thus multiplexed signals into optical signals, and transmits the resulting signals toward other transmission apparatus; unlike the multiplexing and transmitting sections 62-1 and 62-2 in the above-mentioned second embodiment, it is unnecessary to provide the selector sections 65-1 and 65-2 that select, per channel, the transmission signals by UPSR or those by BLSR according to a transmission system which is preset per channel.

Accordingly, also in the first modified example of the second embodiment, by the UPSR branching and inserting section 13B and the BLSR branching and inserting section 14B, a transmission route of each demultiplexed set of transmission signals can be set such that a demultiplexed plurality of sets of transmission signals are transmitted by one of a plurality of kinds of transmission systems. Consequently, while the same transmission apparatus 2B to 5B are used as constituents of the ring network, they can be set as those operable as UPSR, thereby constituting a UPSR ring network 1B, or as those operable as 2F-BLSR, thereby constituting a 2F-BLSR ring network 1B. Accordingly, it is advantageous in that the degree of freedom in design for constructing a ring network can be improved dramatically.

(b2) Explanation of Second Modified Example of Second Embodiment

Though each of the branching and inserting sections 71-1 and 71-2 pre-assigns the transmission system for 192 channels each of the signals that can be multiplex-transmitted per one direction of transmission signals to 96 channels each of UPSR and BLSR; without being restricted thereto, the transmission system to be applied to 192 channels each of signals can be arbitrarily assigned to 96 channels each of UPSR and BLSR.

Figure 21:
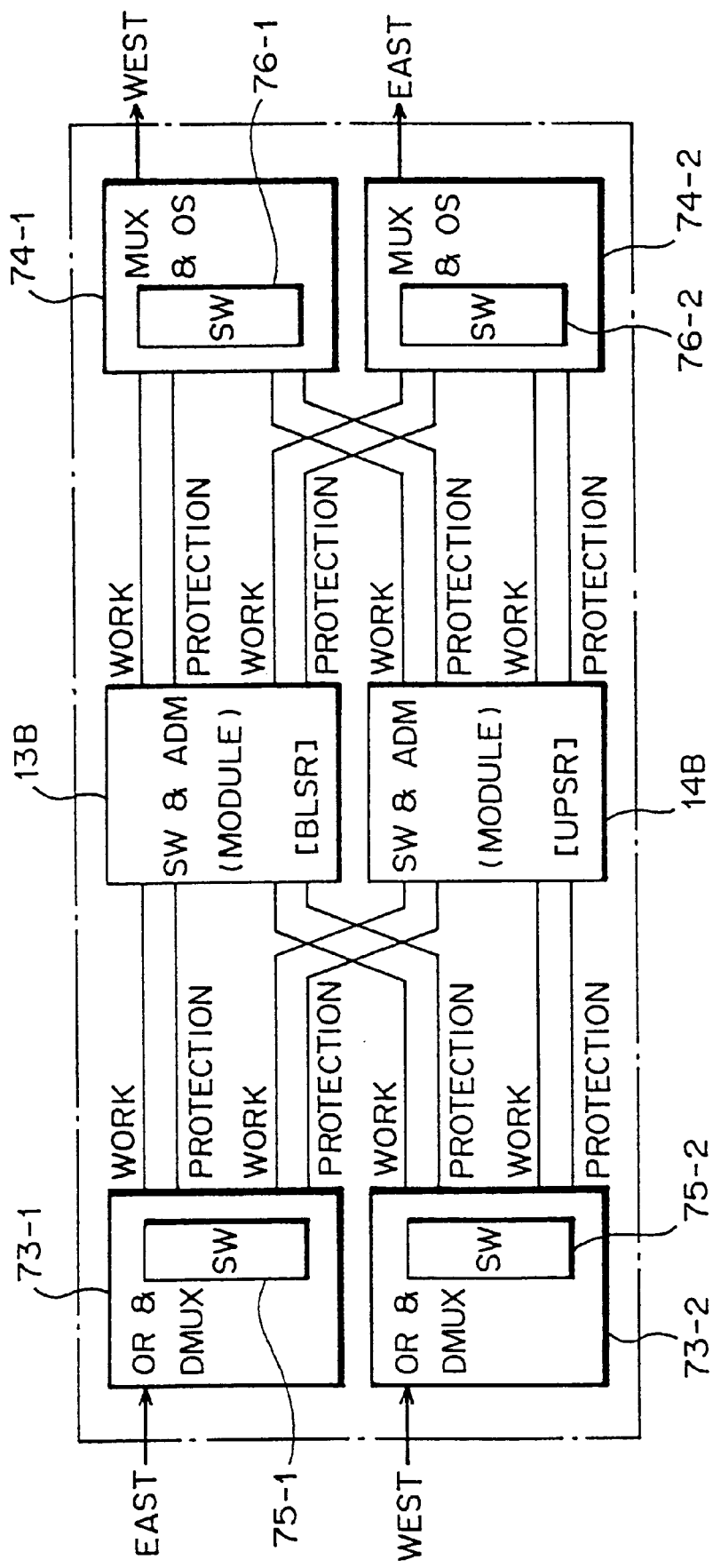
FIG. 21 is a block diagram showing a configuration of a major part of a transport complex in the transmission apparatus in accordance with a second modified example of the second embodiment.

In this case, as shown in FIG. 21, receiving and demultiplexing sections 73-1 and 73-2 are respectively equipped with cross-connecting switches 75-1 and 75-2 for reloading the channels of the 192 channels of signals that are demultiplexed in a time-division manner with respect to the transmission signals WE or EW, as in the case of the receiving and demultiplexing sections 71-1 and 71-2 in accordance with the first modified example of the above-mentioned second embodiment, according to whether their applied transmission system is UPSR or BLSR.

Further, multiplexing and transmitting sections 74-1 and 74-2 are respectively equipped with cross-connecting switches 76-1 and 76-2 for reloading 96 channels each of transmission signals, to which a predetermined transmission system is applied from the respective branching and inserting sections 13B and 14B, into the original channel signals.

In other words, the cross-connecting switches 75-1 and 75-2 function as a first channel-interchanging switch for interchanging channels of demultiplexed two sets of transmission signals, whereas the cross-connecting switches 76-1 and 76-2 function as a second channel-interchanging switch for interchanging, at a stage prior to multiplexing the channels of these two sets of transmission signals from the branching and inserting sections 13B and 14B, the channels of these two sets of transmission signals.

As the UPSR branching and inserting section 13B and the BLSR branching and inserting section 14B, the parts basically similar to those in the above-mentioned first modified example of the second embodiment can be used.

Consequently, in accordance with the second modified example of the second embodiment, by the cross-connecting switches 75-1, 75-2, 76-1, and 76-2, channels for functioning as the transmission apparatus 2B to 5B capable of transmitting signals by UPSR and channels for functioning as the transmission apparatus 2 to 5 capable of transmitting signals by BLSR can be set arbitrarily. As a result, the freedom in design for constructing a UPSR ring network or BLSR ring network can be improved further than in the case of each of the above-mentioned embodiments.

(b3) Explanation of Third Modified Example of Second Embodiment

Figure 22:
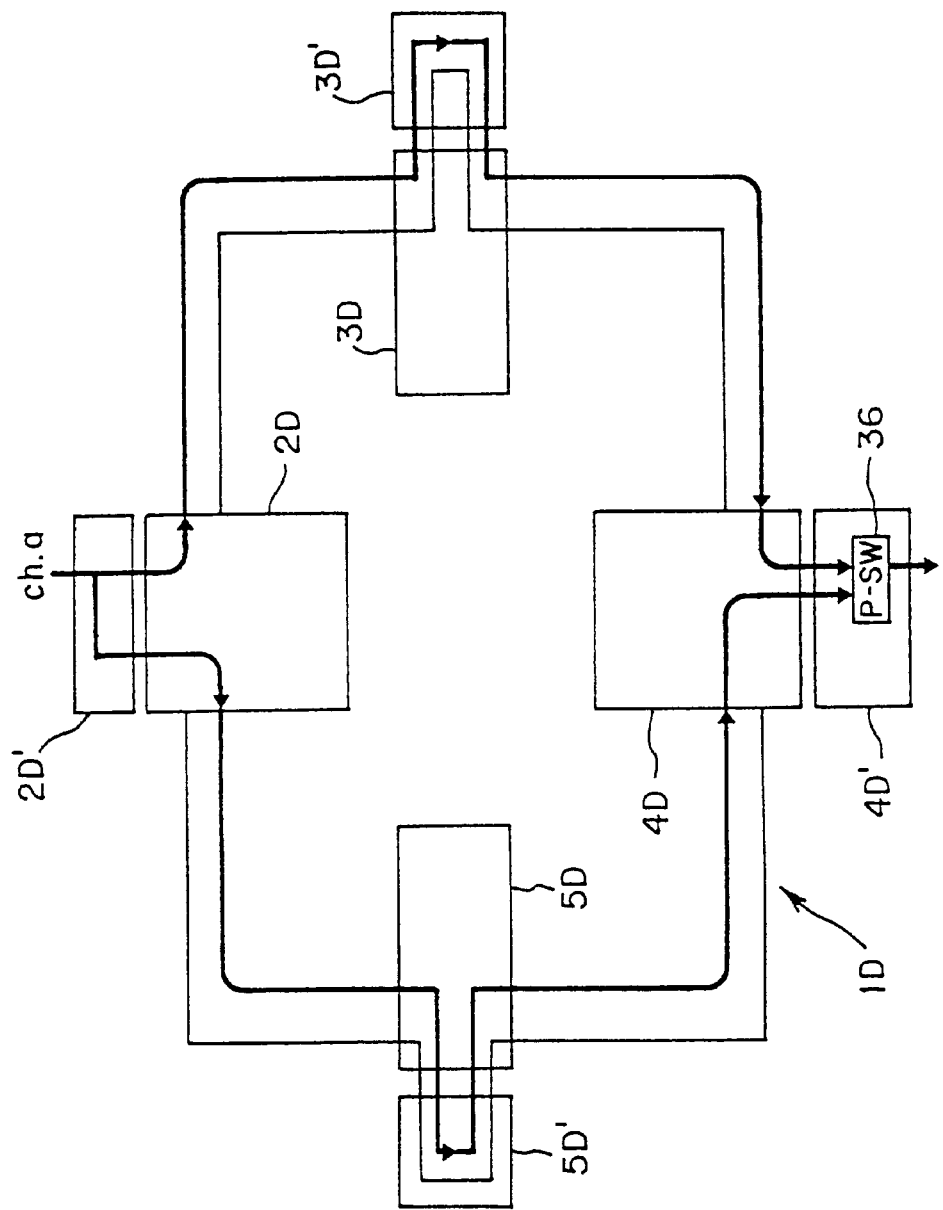
FIG. 22 is a block diagram showing a ring network in a third modified example of the second embodiment.

Though each of the transmission apparatus 2A to 5A in the ring network 1A in the above-mentioned second embodiment is configured such that signals of channels employing a transmission system by BLSR can be set together with the signals of channels employing a transmission system by UPSR; for example, as shown in FIG. 22, transmission apparatus 2D to 5D as upper apparatus may respectively accommodate, under their command, lower-layer multiplexing transmission apparatus 2D' to 5D' each of which can transmit, for example, by UPSR, transmission signals by a number of channels (e.g., 48 channels) not greater than the number of channels (e.g., 192 channels) that can be processed in its corresponding transmission apparatus 2D to 5D.

Consequently, also in the ring network 1D of the third example of the second embodiment, signals of the channels employing the transmission system by BLSR can be set together with signals of the channels employing the transmission system by UPSR (see channel "a" in FIG. 22), while they are allowed to exist concurrently.

Here, the multiplexing transmission apparatus 2D to 5D as upper apparatus not only have the configuration and signal processing function similar to those of the above-mentioned transmission apparatus 2 to 5 shown in FIG. 2, but also respectively accommodate under their command, via lines branched at the branching and inserting circuit sections 25-1 and 25-2, the lower-layer multiplexing transmission apparatus 2D' to 5D'.

Figure 23:
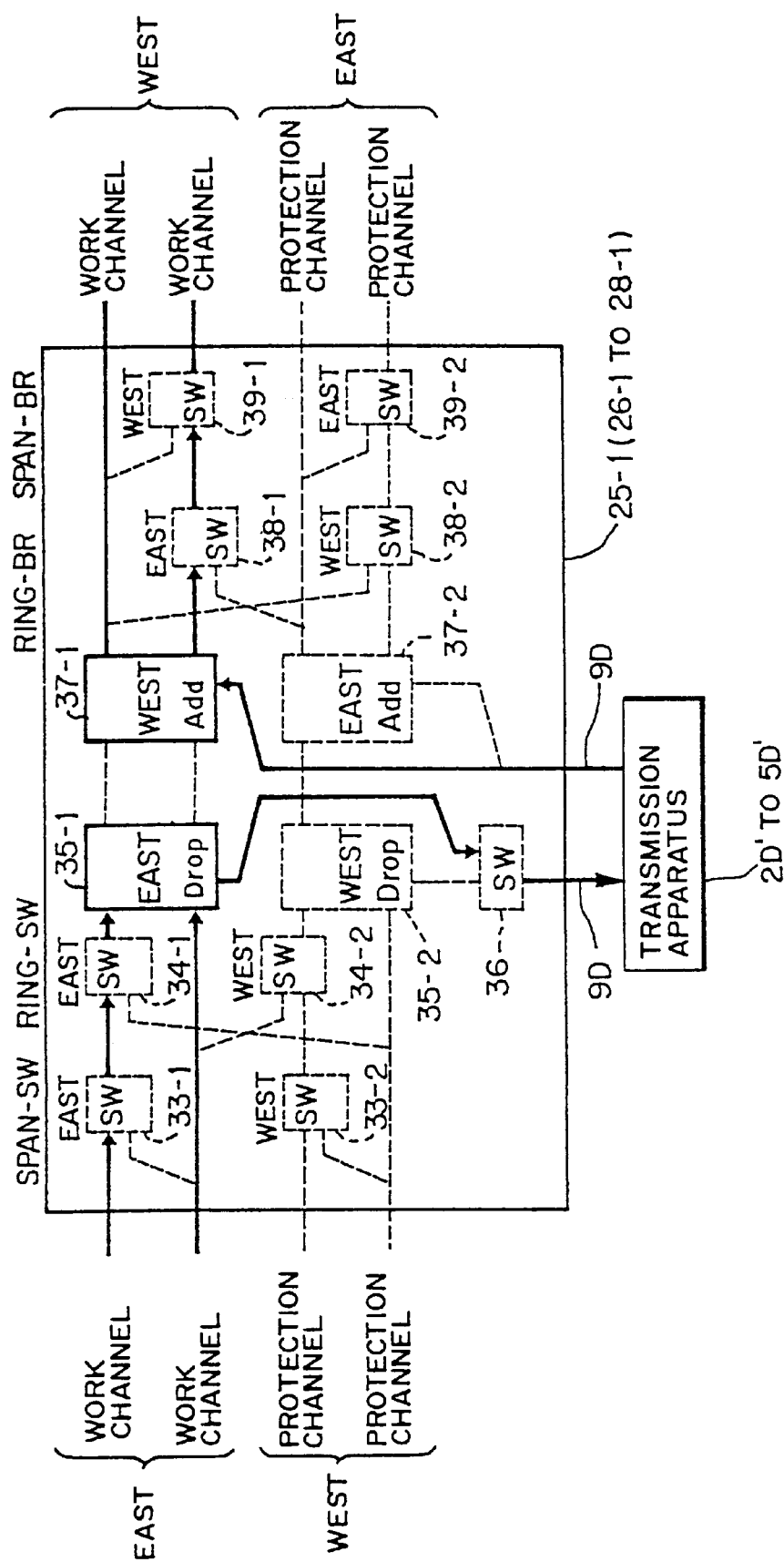
FIG. 23 is a block diagram showing a branching and inserting section of the transmission apparatus in accordance with the third modified example of the second embodiment.
Figure 25:
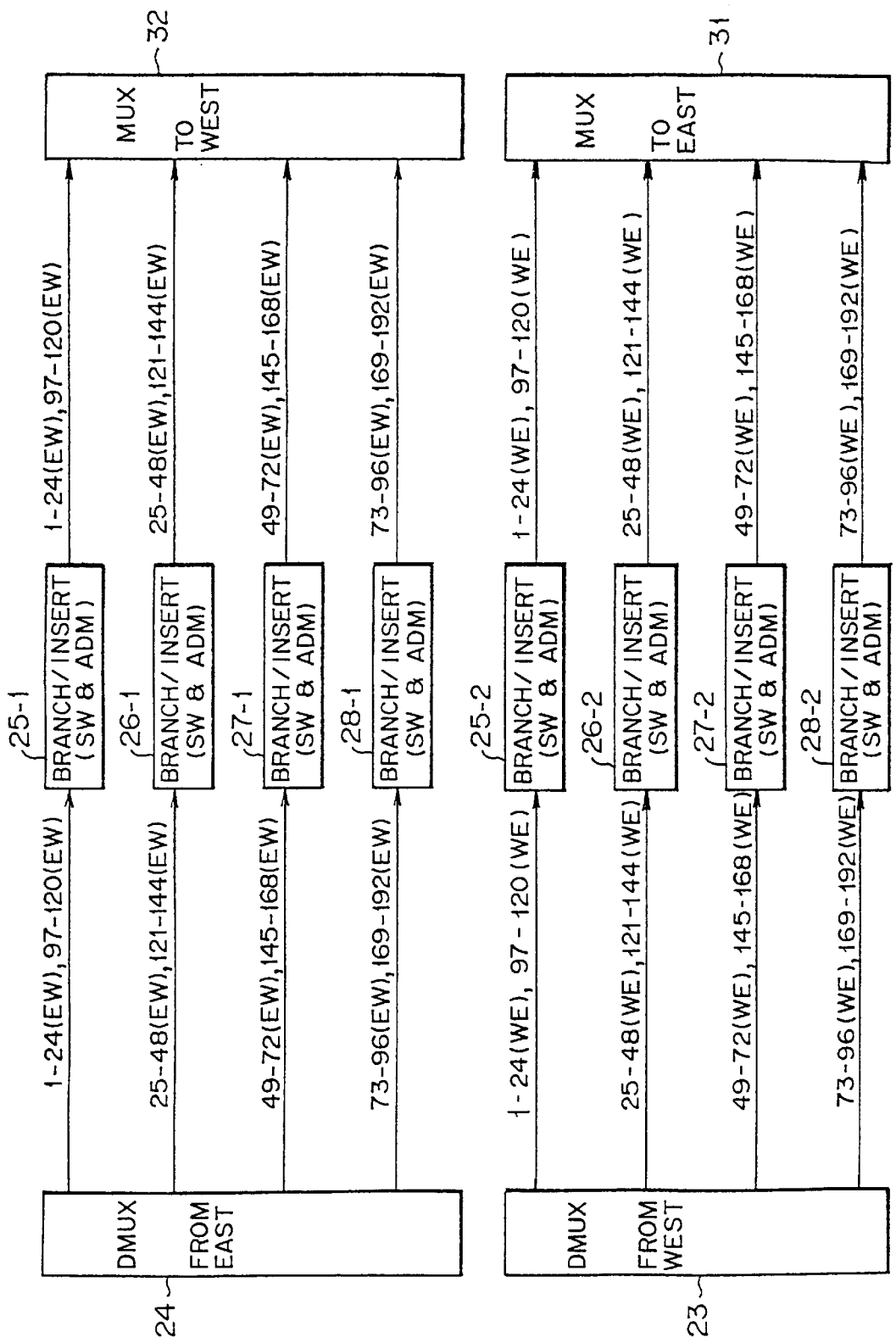
FIGS. 25 and 26 are block diagrams showing channel settings of the branching and inserting section in the transmission apparatus in accordance with the third modified example of the second embodiment.

Specifically, as shown in FIG. 23, in a branching section 35-1 of the branching and inserting circuit section 25-1 in each of the transmission apparatus 2D to 5D, all the signals of channels "1" to "24" and channels "97" to "120" in the transmission signals EW from the optical fiber 6-1 can be branched into its accommodating lower-layer multiplexing transmission apparatus 2D' to 5D', whereas signals from its corresponding lower-layer multiplexing transmission apparatus 2D' to 5D' can be transmitted as transmission signals for the channels "1" to "24" and channels "97" to "120" (see FIG. 25).

Figure 24:
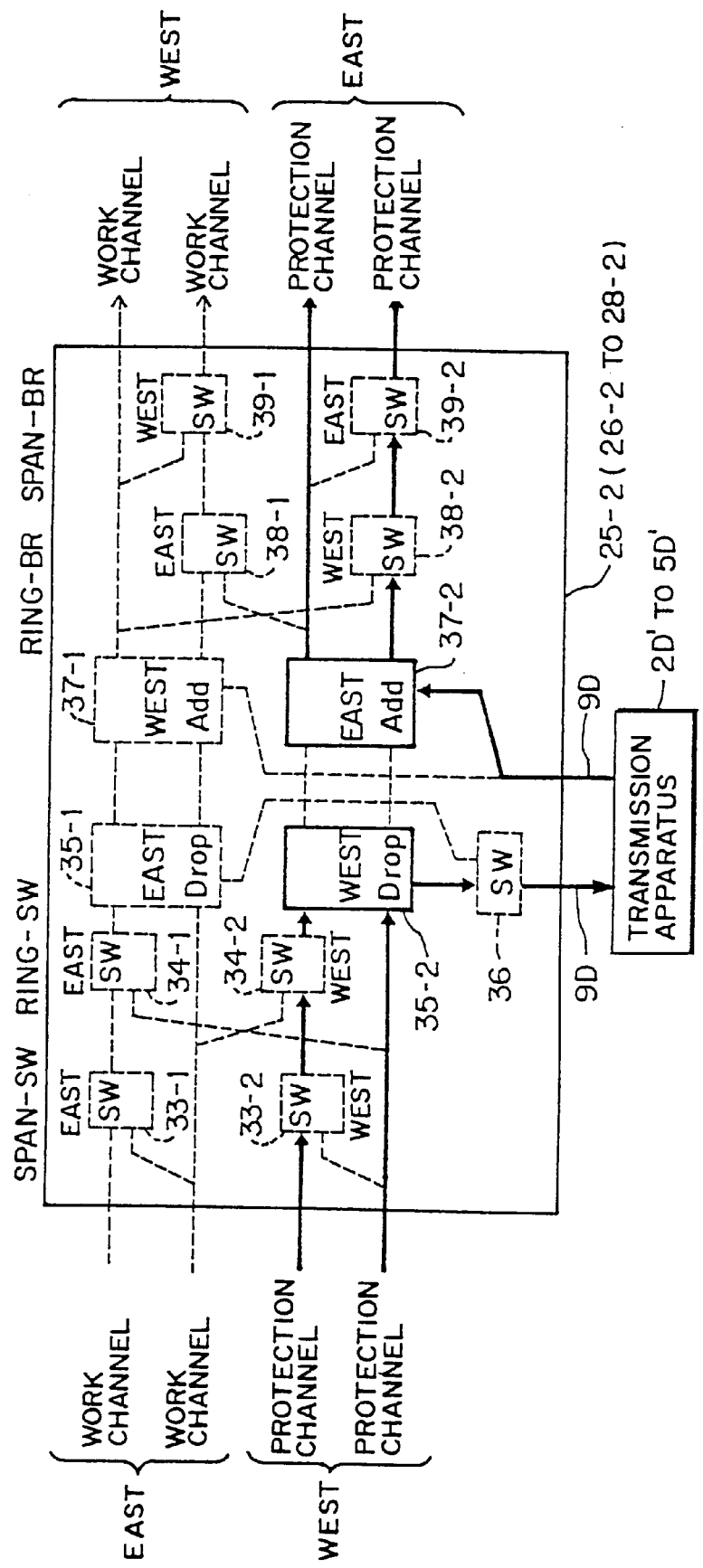
FIG. 24 is a block diagram for explaining an operation of the transmission apparatus in accordance with the third modified example of the second embodiment.

Similarly, as shown in FIG. 24, in a branching section 35-2 of the branching and inserting circuit section 25-2 in each of the transmission apparatus 2D to 5D, all the signals of channels "1" to "24" and channels "97" to "120" in the transmission signals WE from the optical fiber 6-2 can be branched into its accommodating subordinate lower-layer multiplexing transmission apparatus 2D' to 5D', whereas signals from its corresponding lower-layer multiplexing transmission apparatus 2D' to 5D' can be transmitted as transmission signals for the channels "1" to "24" and channels "97" to "120" (see FIG. 25).

Here, the subordinate lower-layer multiplexing transmission apparatus 2D' to 5D' may be accommodated via a line 9D branched by other branching and inserting circuit sections 26-1 to 28-1 and 26-2 to 28-2. In this manner, signals can be exchanged with the lower-layer multiplexing transmission apparatus 2D' to 5D' by use of 48 channels each of the signals assigned by the individual branching and inserting circuit sections 26-1 to 28-1 and 26-2 to 28-2 as in the case of the branching and inserting circuit sections 25-1 and 25-2.

Figure 26:
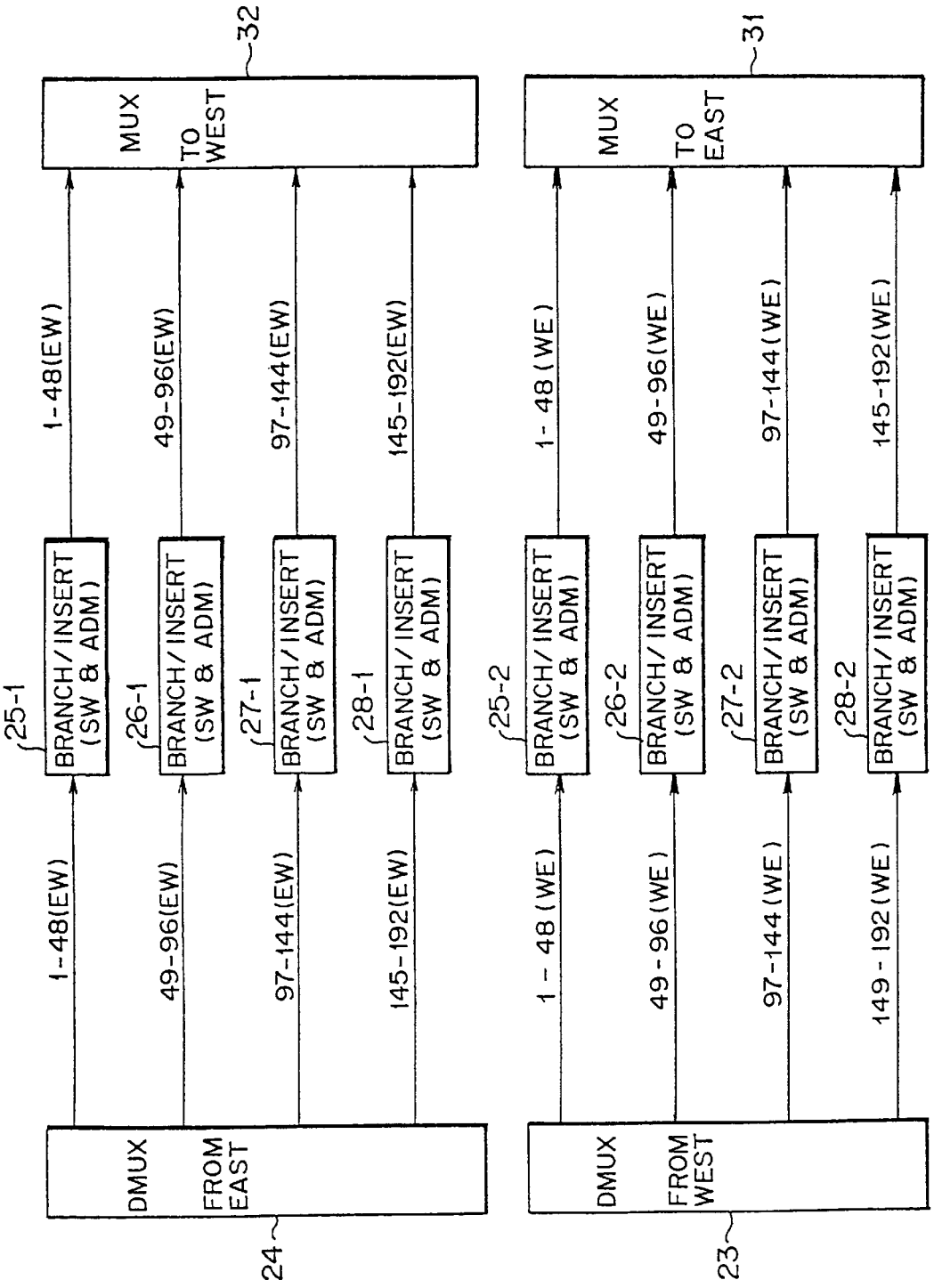

Thus, in the case where transmission signals are transmitted by UPSR in one of the branching and inserting circuit sections 25-1 to 28-1 and 25-2 to 28-2, when not the channel assignation shown in FIG. 26 but the channel assignation shown in FIG. 25 is employed, the individual branching and inserting circuit sections 25-1 to 28-1 can assign channels in common with the above-mentioned case of transmission by BLSR.

Consequently, in accordance with the third modified example of the second embodiment, since the lower-layer multiplexing transmission apparatus 2D' to 5D', which can multiplex-transmit the transmission signals having a preset channel by one of the above-mentioned plurality of transmission systems, are accommodated subordinately, the transmission apparatus can function as transmission apparatus 2B to 5B which can transmit signals by UPSR-UPG, thereby constructing a UPSR ring network 1B, or as transmission apparatus 2 to 5 which can transmit signals by BLSR, thereby constructing a BLSR ring network 1B. Accordingly, this case is also advantageous in that the degree of freedom in design for constructing a ring network can be improved dramatically.

(c) Explanation of Third Embodiment

Figure 27:
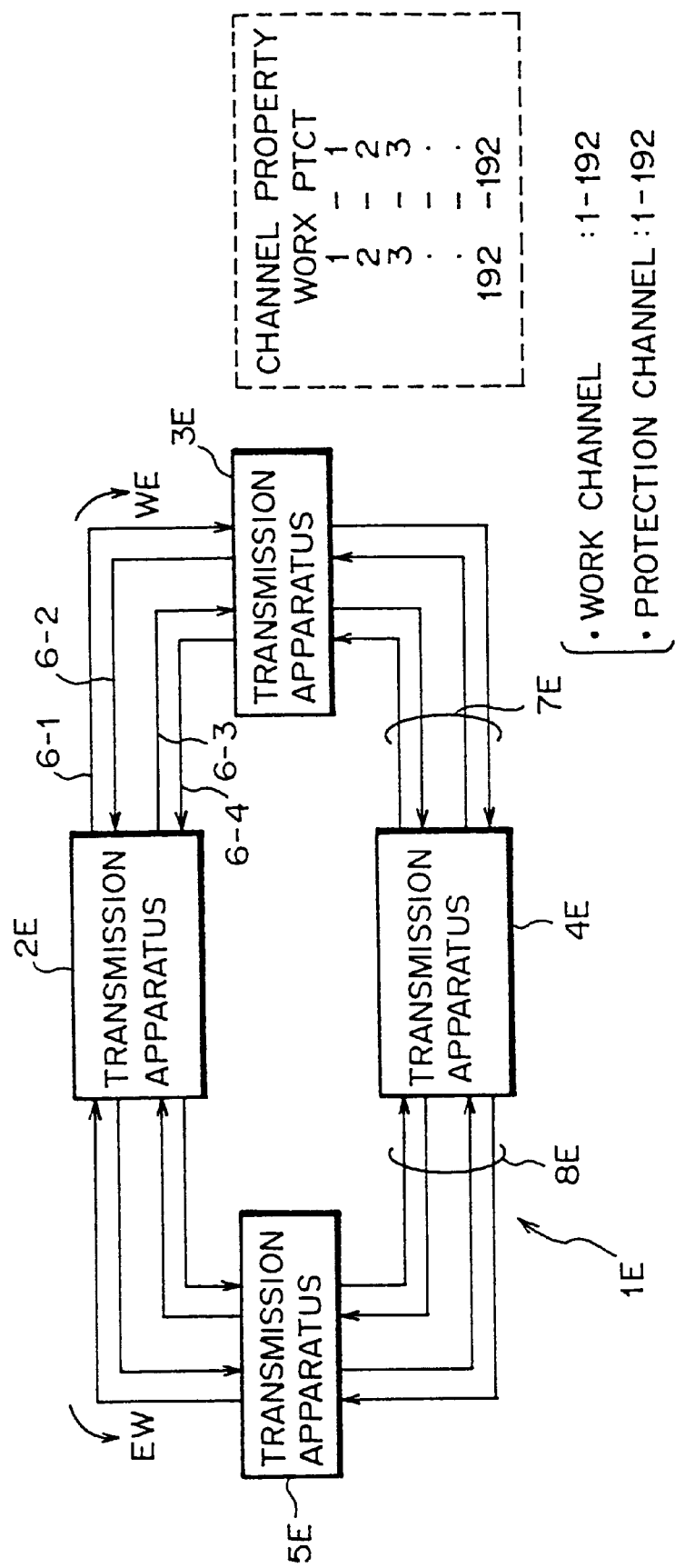
FIG. 27 is a block diagram showing a ring network in a third embodiment of the present invention.

FIG. 27 is a block diagram showing a ring network in a third embodiment of the present invention. A ring network 1E shown in this drawing differs from the ring network (see numeral 1) in the first embodiment in that four transmission apparatus 2E to 5E each accommodating lines therein are connected to each other via four optical fibers 6-1 to 6-4.

Namely, of the four optical fibers connecting the individual transmission apparatus 2E to 5E to each other, two optical fibers 6-1 and 6-3 are used as work lines for transmitting transmission signals WE, and two optical fibers 6-2 and 6-4 are used as protection lines for transmitting transmission signals EW, while each of the optical fibers 6-1 to 6-4 can be configured so as to be capable of processing 192 channels of signals.

As a result, a transmission capacity twice as much as that of the first or the second embodiment can be secured for transmission signals which can be transmitted between the individual optical fibers 6-1 to 6-4. Accordingly, in order to be able to process this doubled transmission capacity of transmission signals, two shelves each constituting the transmission apparatus 2 to 5 in accordance with the first embodiment are connected to each other in the transmission apparatus 2E to 5E, so that the doubled fiber transmission capacity of transmission signals for the two optical fibers can be processed.

Meanwhile, as with those in the above-mentioned first embodiment, each of the transmission apparatus 2E to 5E constituting the ring network 1E is equipped with functional parts as transport complex, synchronization complex, and management complex.

Figure 28:
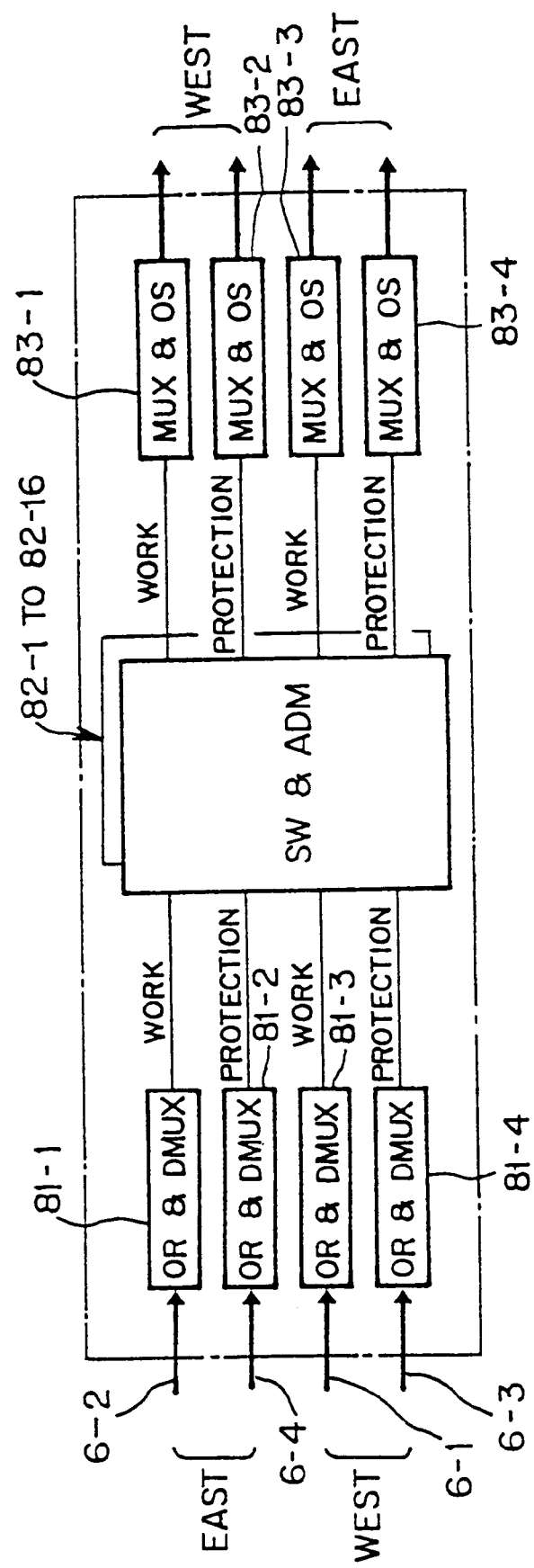
FIG. 28 is a block diagram showing a configuration of a major part of a transport complex in the transmission apparatus in accordance with the third embodiment.

FIG. 28 is a block diagram showing the configuration of major part of the transport complex in the transmission apparatus 2E to 5E. As shown in this drawing, each of the transmission apparatus 2E to 5E comprises, as functions of a system for processing main signals transmitted over the ring network 1E, receiving and demultiplexing sections (OR & DMUX) 81-1 to 81-4, branching and inserting circuit sections (SW & ADM) 82-1 to 82-16, and multiplexing and transmitting sections (MUX & OS) 83-1 to 83-4.

Here, the individual receiving and demultiplexing sections 81-1 to 81-4 receive optical signals as transmission signals respectively through the optical fibers 6-2, 6-4, 6-1, and 6-3, convert them into electric signals, demultiplex thus converted multiplexed transmission signals in a time-division manner, and output thus demultiplexed transmission signals to the discrete branching and inserting circuit sections 82-1 to 82-8 per 24-channel signal unit.

The branching and inserting circuit sections 82-1 to 82-8 can branch, of the transmission signals demultiplexed by the receiving and demultiplexing sections 81-1 to 81-4 and inputted therein (signal sets of 48 channels for each direction), a desired channel of transmission signals into another line, while being capable of inserting signals from another line as transmission signals of thus branched channel. They have a configuration basically similar to that of the branching and inserting circuit sections 25-1 to 28-1 in the first embodiment except for their channel assignment.

On the other hand, the multiplexing and transmitting sections 83-1 to 83-4 multiplex signals which are demultiplexed by the receiving and demultiplexing sections 81-1 to 81-4 and then are subjected to signal branching and inserting processing at the branching and inserting circuit sections 82-1 to 82-8, convert these signals into optical signals, and then transmit thus converted signals through their corresponding optical fibers 6-2, 6-4, 6-1, and 6-3.

As with the first embodiment, according to the settings of the branching and inserting circuit sections 82-1 to 82-8, the transmission apparatus 2E to 5E in accordance with the third embodiment can transmit transmission signals by a transmission system of BLSR (4F-BLSR) or a transmission system of UPSR.

Figure 29:
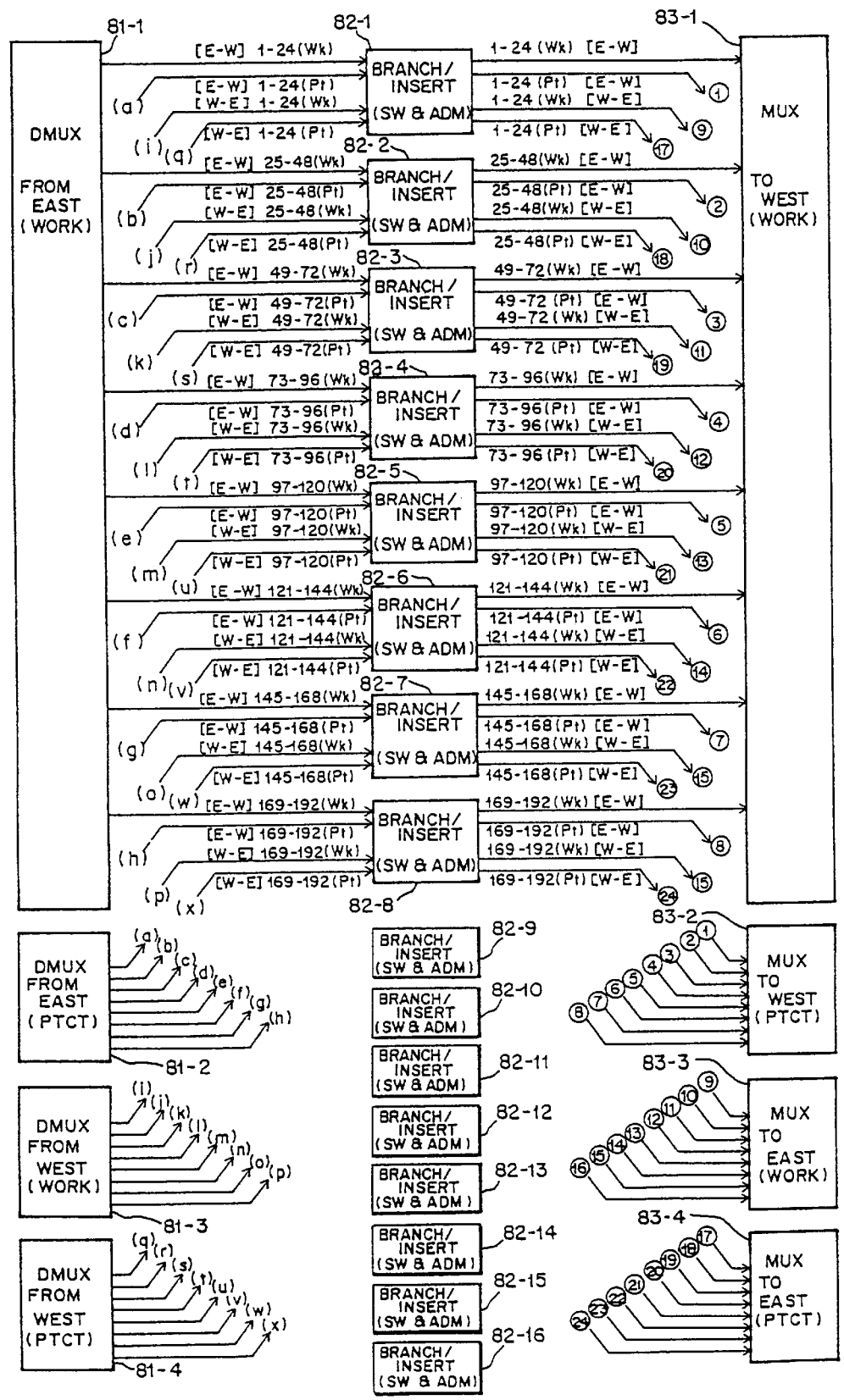
FIG. 29 is a view for explaining a channel setting of a branching and inserting circuit section in the transmission apparatus in accordance with the third embodiment.

Namely, in the case where the transmission signals are transmitted by BLSR, according to the settings of the branching and inserting circuit sections 82-1 to 82-8, as shown in FIG. 29, they are set as work channels ("Wk" in the drawing) or protection channels ("Pt" in the drawing).

Here, since the number of channels per optical fiber can be set to 192 for 10-Gb/s signals such as those of STS-192, in a transmission system by BLSR, in view of the fact that two optical fibers are allocated for each direction, 192 channels of signals can be set as protection channels while 192 channels are used as work channels.

For example, in the case where transmission signals are transmitted through the branching and inserting circuit section 82-1 by a transmission system of BLSR, channels "1" to "24" from both of the optical fibers 6-1 and 6-2 are set to work channels, whereas channels "1" to "24" from both of the optical fibers 6-3 and 6-4 are set to protection channels.

With respect to the signals assigned to the other branching and inserting circuits 82-2 to 82-8 as work channels, as with the above-mentioned branching and inserting circuit section 82-1, 24 channels each of work channels are set for the transmission signals from both of the optical fibers 6-1 and 6-2, whereas 24 channels each of protection channels are set for the transmission signals from both of the optical fibers 6-3 and 6-4.

Also, in the case where the transmission signals are transmitted by UPSR, channels of the transmission signals to be transmitted are assigned in the individual branching and inserting circuit sections 82-1 to 82-8 as shown in FIG. 29.

For example, in the case where transmission signals are transmitted through the branching and inserting circuit section 82-1 by a transmission system of UPSR, together with signals of channels "1" to "24" from the optical fibers 6-1 and 6-3 as transmission signals WE, channels "1" to "24" from the optical fibers 6-2 and 6-4 as transmission signals EW are assigned thereto. Also, in the other branching and inserting circuit sections 82-2 to 82-8, channels are assigned similarly to the branching and inserting circuit section 82-1.

On the other hand, the branching and inserting circuit sections 82-9 to 82-16 in the protection system switch to the work system respectively when faults occur in the branching and inserting circuit sections 82-1 to 82-8, thereby performing branching and inserting processing for signal sets of channels similar to those of the branching and inserting circuit sections 82-1 to 82-8.

As a result of the foregoing configuration, in the transmission apparatus 2E to 5E of the ring network 1E in accordance with the third embodiment of the present invention, in a manner basically similar to the above-mentioned first embodiment, according to the settings of the branching and inserting circuit sections 82-1 to 82-8, transmission signals can be transmitted by a transmission system of BLSR or a transmission system of UPSR.

Also, in the case where a fault occurs only in a work line at a specific section on a line constituting the four-fiber ring network 1E, the transmission apparatus 2E to 5E can perform span-switching processing.

Figure 30:
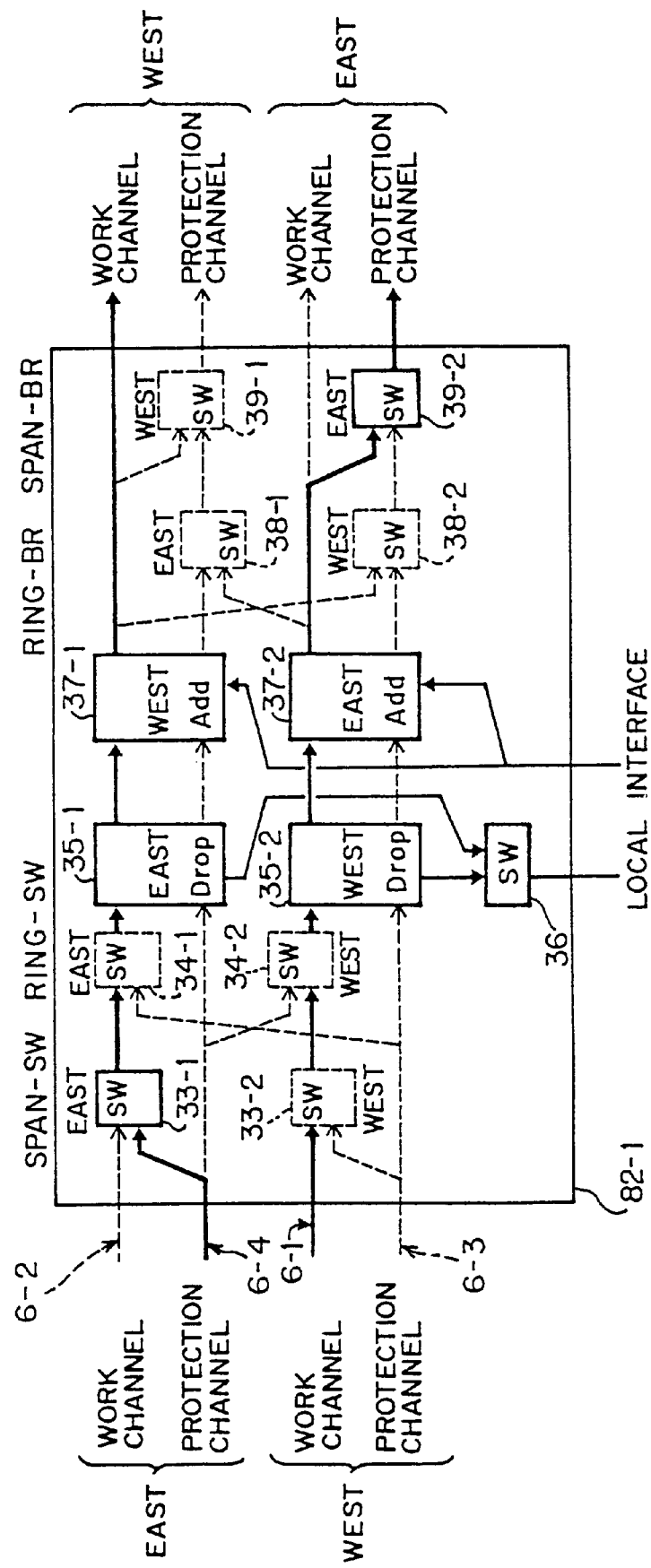
FIGS. 30 and 31 are block diagrams for explaining switch settings of the branching and inserting circuit section in the transmission apparatus when a ring network is constructed in the third embodiment.
Figure 31:
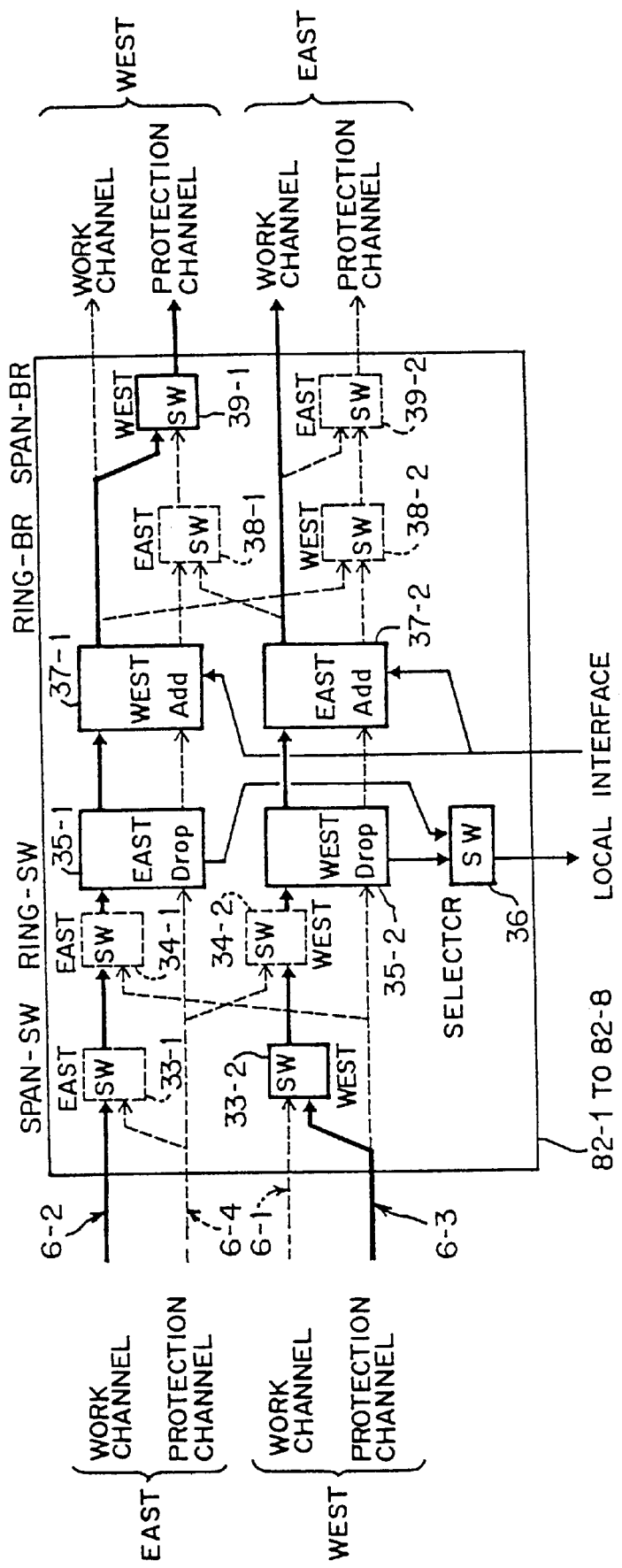

For example, in the case where a fault occurs in a work line of a line 8E between the transmission apparatus 5E and the transmission apparatus 4E or in a work line of a line 7E between the transmission apparatus 3E and the transmission apparatus 4E, as shown in FIG. 30 or 31, transmission signals are transmitted by use of a protection line, thus avoiding the work line in which the fault is generated, and branching/inserting processing of a desired signal is performed with respect to the signals inputted through the protection line in order to avoid the fault.

Namely, in the case where a fault occurs in the optical fiber 6-2 as a work line for the line 8E, as shown in FIG. 30, a span-switching switch 33-1 of each of the branching and inserting circuit sections 82-1 to 82-8 of the transmission apparatus 4E is changed over and set such that, of the transmission signals EW, the signals inputted through the protection channel from the optical fiber 6-4 are selected without choosing the work channel signals from the optical fiber 6-2.

Consequently, in the transmission apparatus 5E, transmission signals inputted through the switched protection channel of the optical fiber 6-4 are inputted, whereby necessary signal branching and inserting processing can be performed at its branching section 35-1 and inserting section 37-1.

Further, a span-switching switch 39-2 is changed over and set such that the transmission signals WE are transmitted not through the work channel from the optical fiber 6-1 but through the protection channel from the optical fiber 6-3.

Consequently, in the case where a fault occurs in the optical fiber 6-1 as the work line for the line 8E, the optical fiber 6-3 as the protection line is used, thereby allowing transmission signals to be transmitted while avoiding the fault.

Similarly, in the case where a fault occurs in the optical fiber 6-1 as a work line for the line 7E, as shown in FIG. 31, for example, a span-switching switch 33-2 of each of the branching and inserting circuit sections 82-1 to 82-8 is changed over and set such that, of the transmission signals WE, the signals inputted through the optical fiber 6-3 as the protection channel are selected without choosing the work channel signals from the optical fiber 6-1.

Consequently, in the transmission apparatus 3E, transmission signals inputted through the switched protection channel of the optical fiber 6-3 are inputted, whereby necessary signal branching and inserting processing can be performed at its branching section 35-2 and inserting section 37-2.

Further, the span-switching switch 39-1 is changed over and set such that the transmission signals EW are transmitted not through the work channel from the optical fiber 6-2 but through the protection channel from the optical fiber 6-4.

Consequently, in the case where a fault occurs in the optical fiber 6-2 as the work line for the line 7E, the optical fiber 6-4 as the protection line is used, thereby allowing transmission signals to be transmitted while avoiding the fault.

Thus, in the transmission apparatus in the ring network in accordance with the third embodiment of the present invention, by the branching and inserting circuit sections 82-1 to 82-16, a transmission route of each demultiplexed set of transmission signals can be set such that a plurality of sets of transmission signals demultiplexed by the receiving and demultiplexing sections 81-1 to 81-4 are transmitted by one of a plurality of kinds of transmission systems. Consequently, while the same transmission apparatus 2E to 5E are used as constituents of the ring network 1E, they can be set as those operable as UPSR, thereby constituting the UPSR ring network 1E, or as those operable as 4F-BLSR, thereby constituting the 4F-BLSR ring network 1E. Accordingly, it is advantageous in that the degree of freedom in design for constructing a ring network can be improved dramatically.

(c1) Explanation of Modified Example of Third Embodiment

Figure 32:
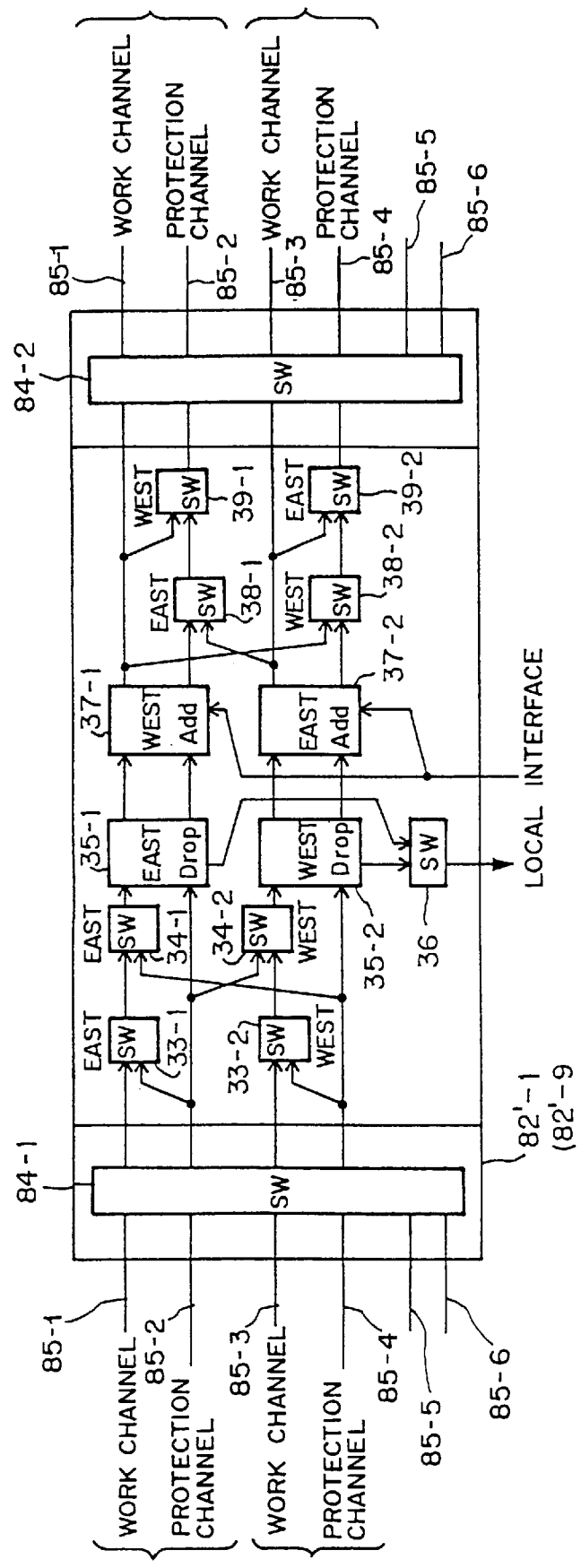
FIG. 32 is a block diagram showing the branching and inserting circuit section of the transmission apparatus in accordance with a modified example of the third embodiment.

Though the transmission apparatus 2E to 5E in the third embodiment are connected together in a ring-like form via four optical fibers 6-1 to 6-4, thus allowing the ring network 1E of 4F-BLSR or UPSR to be constructed; in order for same transmission apparatus to be able to set 2F-BLSR as well, branching and inserting circuit sections 82'-1 to 82'-8 such as those shown in FIG. 32 are disposed, and protection-system branching and inserting circuit sections 82'-9 to 82'-16 may also be provided in addition.

Namely, as shown in FIG. 32, each of the branching and inserting circuit sections 82'-1 to 82'-8 comprises, in addition to normal four sets of I/O ports 85-1 to 85-4 into which demultiplexed signals are inputted by 24-channel unit, two sets of additional I/O ports 85-5 and 85-6, as well as switches 84-1 and 84-2 for setting a route of transmission signals inputted from these I/O ports 85-1 to 85-6 in terms of work and protection.

Namely, the switches 84-1 and 84-2 can set a transmission route such that signals can be transmitted by one of transmission systems of 2F-BLSR and 4F-BLSR which can transmit a plurality of channels of signals via different numbers of optical fibers.

Consequently, in the case where a ring network by use of 2F-BLSR, 4F-BLSR, UPSR, or the like as its transmission system is constructed, physical arrangement (wiring) can be changed over by the switches 84-1 and 84-2 of each of the branching and inserting circuit sections 82'-1 to 82'-8 according to differences in operation between the individual transmission systems, whereby transmission apparatus with a common hardware specification can be used for constructing ring networks of UPSR, 2F-BLSR, 4F-BLSR, and the like.

Accordingly, as the switches 84-1 and 84-2 of the branching and inserting circuit sections 82'-1 to 82'-8 are provided, not only the advantages similar to those in the third embodiment are obtained, but also the transmission apparatus with a common hardware specification can be used for constructing ring networks of UPSR, 2F-BLSR, 4F-BLSR, and the like.

(d) Explanation of Fourth Embodiment

Figure 33:
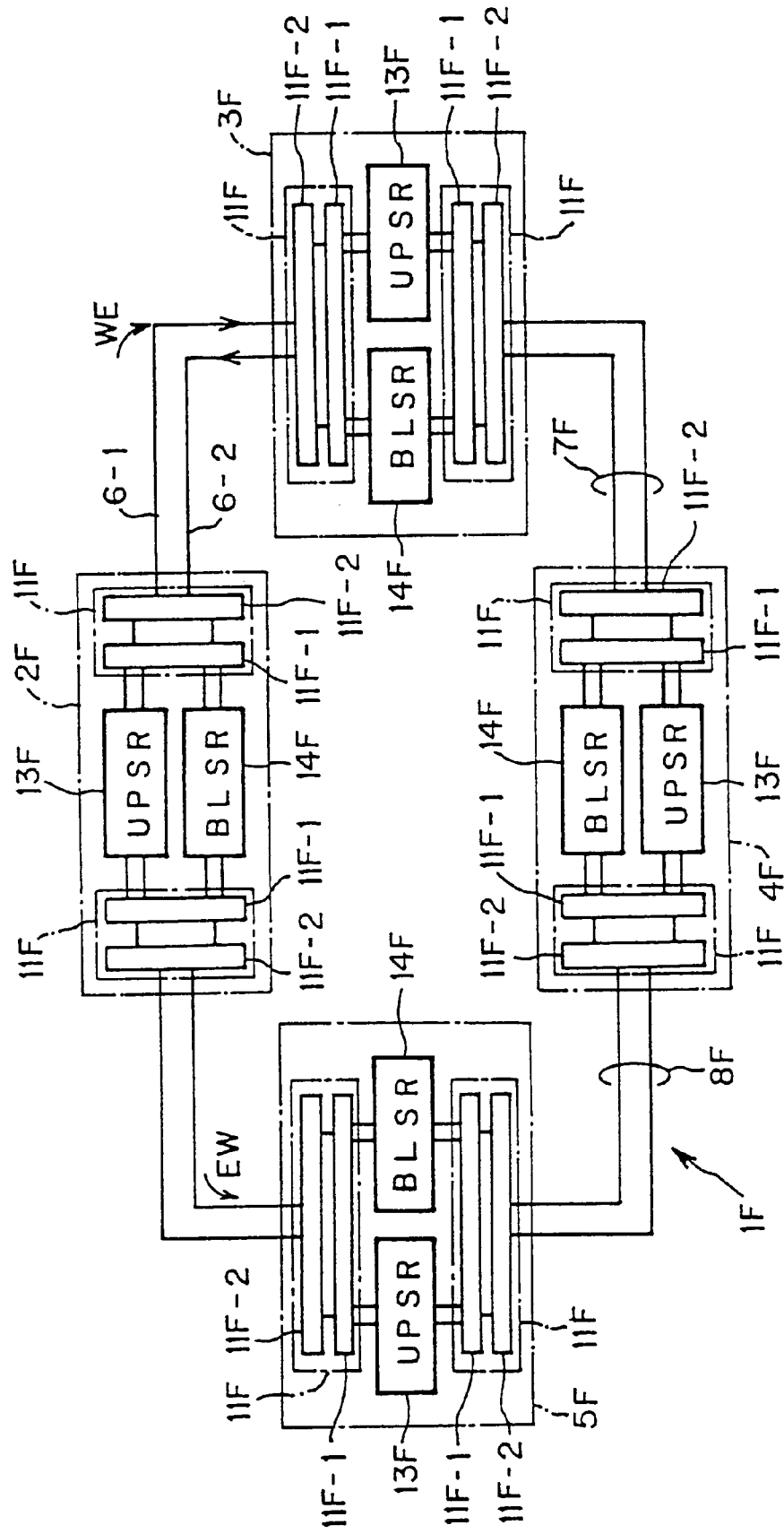
FIG. 33 is a block diagram showing a ring network in a fourth embodiment of the present invention.
Figure 34:
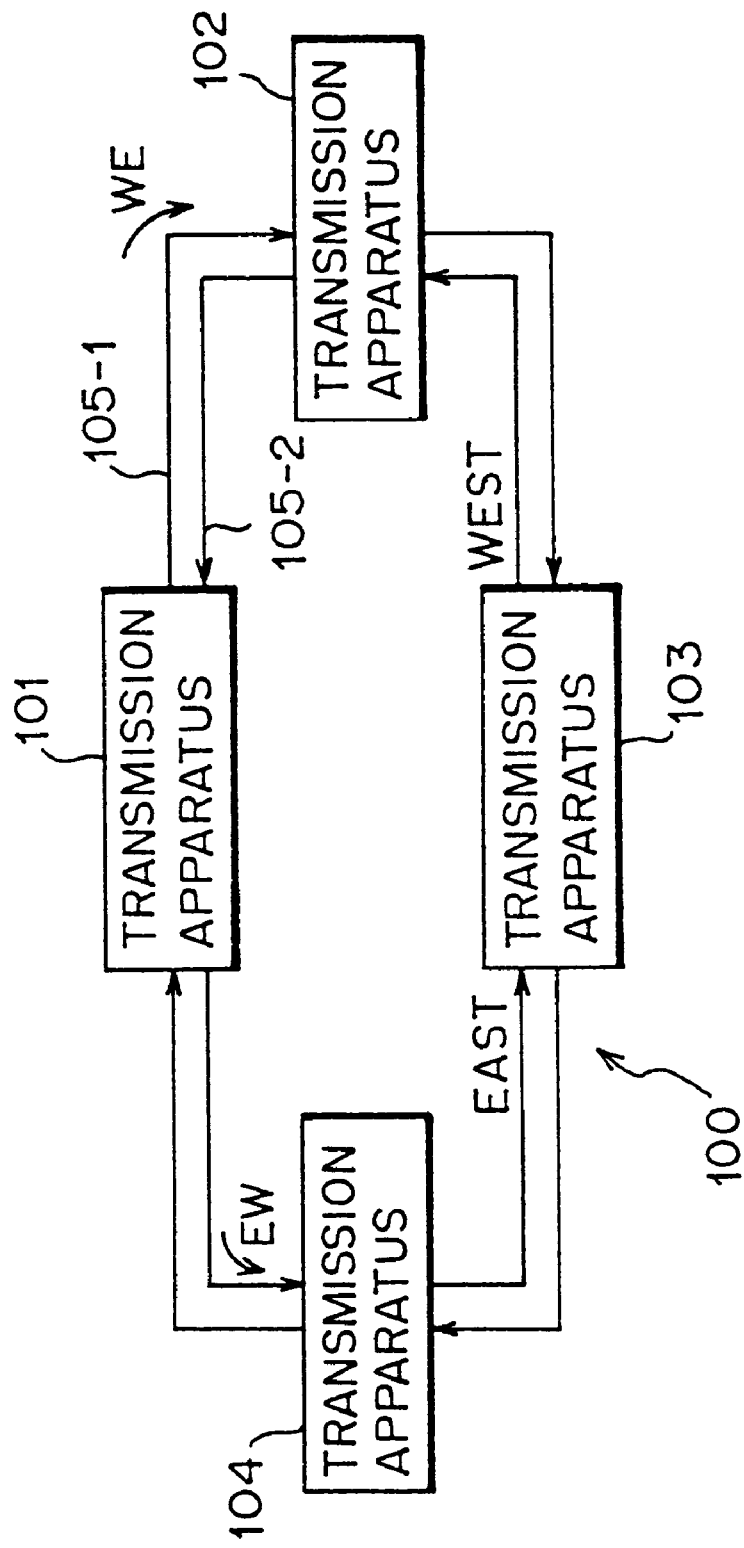
FIG. 34 is a block diagram showing a ring network based on a UPSR system.

FIG. 33 is a block diagram for showing a ring network in a fourth embodiment of the present invention. In a ring network 1F shown in this drawing, as with the ring network in the first embodiment (see numeral 1), four transmission apparatus 2F to 5F, each accommodating lines therein, are connected together via two optical fibers 6-1 and 6-2.

The transmission apparatus 2F to 5F in the ring network 1F in accordance with the fourth embodiment is basically the same in configuration as those of the second embodiment except that, when a plurality channels of signals (e.g., 192 channels of signals) are multiplex-transmitted through the optical fiber 6-1 or 6-2 between the transmission apparatus 2F to 5F, wavelength division multiplexing (WDM) is employed instead of time-division multiplexing.

Therefore, each of the transmission apparatus 2F to 5F in accordance with the fourth embodiment comprises a UPSR branching and inserting section 13F and a BLSR branching and inserting section 14F which are similar to those in the first modified example of the second embodiment, and two optical-wavelength-division multiplexing and transmitting sections 11F for connecting the UPSR branching and inserting section 13F and BLSR branching and inserting section 14F to lines constituting the ring network 1F.

For example, the transmission apparatus 4F comprises an optical-wavelength-division multiplexing and transmitting section 11F for connecting a line 7F, which connects the transmission apparatus 4F and the transmission apparatus 3F to each other, to the UPSR branching and inserting section 13F and the BLSR branching and inserting section 14F; and an optical-wavelength-division multiplexing and transmitting section 11F for connecting a line 8F, which connects the transmission apparatus 4F and the transmission apparatus 5F to each other, to the UPSR branching and inserting section 13F and the BLSR branching and inserting section 14F.

Here, the UPSR branching and inserting section 13F of the transmission apparatus 4F sets a transmission route for signals of a channel to be multiplex-transmitted by UPSR, branches a part of each transmission signal demultiplexed by the optical-wavelength-division multiplexing and transmitting section 11F into another line (e.g., local interface) accommodated in its own transmission apparatus, and inserts signals from another line into transmission signals to be transmitted through the lines 7F and 8F connected to the ring network 1F.

The BLSR branching and inserting section 14F of the transmission apparatus 4F sets a transmission route for signals of a channel to be multiplex-transmitted by BLSR, branches a part of each transmission signal demultiplexed by the optical-wavelength-division multiplexing and transmitting section 11F into another line accommodated in its own transmission apparatus, and inserts signals from another line into transmission signals to be transmitted through the lines 7F and 8F connected to the ring network 1F.

Accordingly, the UPSR branching and inserting section 13F and BLSR branching and inserting section 14F function as transmitting sections which can exchange transmission signals by transmission systems different from each other.

The optical-wavelength-division multiplexing and transmitting section 11F of each of the transmission apparatus 2F to 5F comprises a transmission signal/wavelength-division multiplexing optical signal interface section 11F-1 and a wavelength-division multiplexing and demultiplexing section 11F-2. Though functions of the optical-wavelength-division multiplexing and transmitting section 11F on the line 7F side in the transmission apparatus 4F will be explained in detail in the following, the other wavelength-division multiplexing and demultiplexing sections 11F constituting the ring network 1F have basically the same functions as well.

Namely, the transmission signal/wavelength-division multiplexing optical signal interface section 11F-1 of the optical-wavelength-division multiplexing and transmitting section 11F disposed on the line 7F side in the transmission apparatus 4F interfaces transmission signals to be transmitted from the UPSR branching and inserting section 13F and BLSR branching and inserting section 14F toward the line 7F with optical signals having an optical wavelength for wavelength division multiplexing which is set for each transmission signal in the UPSR branching and inserting section 13F and BLSR branching and inserting section 14F.

Further, the wavelength-division multiplexing and demultiplexing section 11F-2 in the optical-wavelength-division multiplexing and transmitting section 11F on the line 7F side multiplexes, in an optical wavelength division manner, optical signals corresponding to the transmission signals to be transmitted from the UPSR branching and inserting section 13F and BLSR branching and inserting section 14F toward the line 7F from the transmission signal/wavelength-multiplexing optical signal interface section 11F-1, thereby transmitting thus multiplexed signals through the optical fiber 6-2, and demultiplexes, in an optical wavelength division manner, optical signals transmitted through the optical fiber 6-1 into optical signals having an optical wavelength set for each transmission signal in the UPSR branching and inserting section 13F and BLSR branching and inserting section 14F.

Specifically, in the transmission signal/wavelength-multiplexing optical signal interface section 11F-1, the transmission signals from the UPSR branching and inserting section 13F are converted into optical signals having a preset optical wavelength $\lambda U$ for optical wavelength division multiplexing, while the transmission signals from the BLSR branching and inserting section 14F are converted into optical signals having a preset optical wavelength $\lambda B$ for optical wavelength division multiplexing (which is different from the optical wavelength $\lambda U$ into which the transmission signals from the UPSR branching and inserting section 13F are converted).

Consequently, the optical-wavelength-division multiplexing and demultiplexing section 11F-2 multiplexes, in an optical wavelength division manner, the respective transmission signals from the branching and inserting sections 13F and 14F that are converted into optical signals by the transmission signal/wavelength-multiplexing optical signal interface section 11F-1, thereby being capable of optical-wavelength-division multiplexing and transmitting through the optical fiber 6-2 the transmission signals from the UPSR branching and inserting section 13F and BLSR branching and inserting section 14F.

On the other hand, the optical signals transmitted through the optical fiber 6-1 are demultiplexed, in an optical wavelength division manner, into optical signals having the optical wavelengths $\lambda U$ and $\lambda B$ set per transmission signal in the UPSR branching and inserting section 13F and BLSR branching and inserting section 14F, and then are outputted to the transmission signal/wavelength-division multiplexing optical signal interface section 11F-1.

In the transmission signal/wavelength-multiplexing optical signal interface section 11F-1, the optical signals having a wavelength of $\lambda U$ are converted into transmission signals to the UPSR branching and inserting section 13F, while the optical signals having a wavelength of $\lambda B$ are converted into transmission signals to the BLSR branching and inserting section 14F. Consequently, the UPSR branching and inserting section 13F and the BLSR branching and inserting section 14F can receive the transmission signals transmitted via the optical fiber 6-1 by wavelength division multiplexing and perform the branching and inserting processing similar to that in the second embodiment.

As a result of the foregoing configuration, in each of the transmission apparatus 2F to 5F in the ring network 1F in accordance with the fourth embodiment of the present invention, as the optical-wavelength-division multiplexing and transmitting section 11F multiplexes, in an optical wavelength division manner, the transmission signals by UPSR and BLSR, transmission signals by different transmission systems can be multiplex-transmitted through the common optical fibers 6-1 and 6-2.

In other words, as with the second embodiment, the ring network 1F shown in FIG. 33 functions, for example, not only as the ring network 200 shown in FIG. 16 employing a transmission system of UPSR, but also as the ring network 210 employing a transmission system of BLSR.

Thus, in the transmission apparatus in the ring network in accordance with the fourth embodiment of the present invention, since the UPSR branching and inserting section 13F, the BLSR branching and inserting section 14F, the transmission signal/wavelength-multiplexing optical signal interface section 11F-1, and the optical-wavelength-division multiplexing and demultiplexing section 11F-2 are provided, a ring network can be constructed by a combination of BLSR and UPSR according to optical wavelength division multiplexing. Consequently, as with each of the above-mentioned embodiments, it is advantageous in that the degree of freedom for constructing a ring network can be dramatically improved.

(e) Etc

In the present invention, various modifications may be effected in the transmission apparatus in accordance with each of the above-mentioned embodiments so as to construct a ring network. Advantages similar to those in each of the above-mentioned embodiments can also be obtained in this manner.

What is claimed is:

1. A transmission apparatus in a ring network in which a plurality of transmission apparatus each accommodating therein a line are connected together like a ring, allowing a plurality of channels of signals to be transmitted between said transmission apparatus as being multiplexed, said transmission apparatus comprising:

a demultiplexing section for demultiplexing multiplexed transmission signals from first and second lines constituting said ring network and outputting a plurality of sets of transmission signals constituted by signals of a plurality of channels;

a branching and inserting section adapted to cause, of said plurality of sets of transmission signals demultiplexed by said demultiplexing section, a transmission signal of a desired channel to branch out into another line and insert a signal from another line as a transmission signal into the channel from which said transmission signal branches out; and a multiplexing and transmitting section for multiplexing said plurality of sets of transmission signals from said branching and inserting section and transmitting thus multiplexed signal as a multiplexed transmission signal to said first or second line becoming a relaying destination of transmission;

wherein said branching and inserting section comprises a transmission route setting mechanism for setting a transmission route of each of said sets of transmission signals such that each set of said transmission signals are transmitted by one of a plurality of kinds of transmission systems.

2. The transmission apparatus in a ring network of claim 1, wherein said transmission route setting mechanism comprises a plurality of route setting switches which set, according to the transmission system to be employed, a route of each set of said transmission signals demultiplexed by said demultiplexing section.

3. The transmission apparatus in a ring network of claim 2, wherein said transmission route setting mechanism comprises a switch setting section for setting states of said plurality of route setting switches such that each set of said transmission signals are transmitted by a desired transmission system in said plurality of kinds of transmission systems.

4. The transmission apparatus in a ring network of claim 1, wherein said transmission route setting mechanism is configured such that each set of said transmission signals is relieved from a line fault occurring in said ring network by a line relief system corresponding to the transmission system employed for transmitting said transmission signals.

5. The transmission apparatus in a ring network of claim 1, wherein said transmission route setting mechanism is configured so as to set said transmission route such that said plurality of sets of transmission signals are transmitted by means of one of a transmission system based on a uni-directional path switched ring and a transmission system based on a bi-directional line switched ring.

6. The transmission apparatus in a ring network of claim 1, wherein said transmission apparatus is connected through n optical fibers to another transmission apparatus constituting said ring network, and wherein said transmission route setting mechanism is configured so as to set said transmission route such that at least one set of said plurality of sets of transmission signals can be transmitted by a transmission system in which a plurality of channels of signals can be transmitted through said n optical fibers.

7. The transmission apparatus in a ring network of claim 1, wherein said transmission apparatus accommodates, under command thereof, a lower-layer multiplexing transmission apparatus for enabling multiplex transmission of a transmission signal having a preset channel in one of said plurality of transmission systems.

8. The transmission apparatus in a ring network of claim 1, wherein said demultiplexing section is configured so as to demultiplex, in a time-division manner, a multiplexed transmission signal from said first or second line, and wherein said multiplexing and transmitting section is configured to perform time-division multiplex transmission of a transmission signal to be transmitted to said second or first line.

9. The transmission apparatus in a ring network of claim 1, wherein said demultiplexing section comprises a first channel-interchanging switch for interchanging channels of said plurality of sets of demultiplexed transmission signals, and wherein said multiplexing and transmitting section comprises, at a stage prior to multiplexing channels of a plurality of sets of transmission signals from said branching and inserting section, a second channel-interchanging switch for interchanging the channels of said plurality of sets of demultiplexed transmission signal.

10. The transmission apparatus in a ring network of claim 1, wherein said transmission route setting mechanism is configured so as to set said transmission route such that said transmission signals are transmitted by one of transmission systems capable of transmitting a plurality of channels of signals through numbers of optical fibers different from each other.

11. A transmission apparatus in a ring network in which a plurality of transmission apparatus are connected together like a ring through an optical fiber, said transmission apparatus comprising:

a plurality of transmitting sections adapted to send and receive a transmission signal according to transmission systems different from each other;

a transmission signal/wavelength-division multiplexing optical signal interface section for interfacing the transmission signal in each transmitting section with an optical signal having a light wavelength for wavelength-multiplexed transmission set for each transmission signal in each of said transmitting sections; and a wavelength-division multiplexing and demultiplexing section for transmitting through said optical fiber the optical signal corresponding to the transmission signal in each transmitting section from said transmission signal/wavelength-division multiplexing optical signal interface section by multiplexing the optical signal in a light wavelength division manner and demultiplexing, in a light wavelength division manner, said optical signal transmitted through said optical fiber into optical signals having respective light wavelengths which are set for the respective transmission signals in said transmitting sections.

* * * * *